United States Patent
Wilcox et al.

(10) Patent No.: US 12,524,475 B2
(45) Date of Patent: Jan. 13, 2026

(54) CONCEPTUAL CALCULATOR SYSTEM AND METHOD

(71) Applicant: Seshet Technologies, Inc., San Francisco, CA (US)

(72) Inventors: Kian Wilcox, San Francisco, CA (US); Ariane Blank, San Francisco, CA (US); Maclen Marvit, San Francisco, CA (US)

(73) Assignee: Seshet Technologies, Inc., San Francisco, CA (US)

( * ) Notice: Subject to any disclaimer, the term of this patent is extended or adjusted under 35 U.S.C. 154(b) by 0 days.

(21) Appl. No.: 19/054,190

(22) Filed: Feb. 14, 2025

(65) Prior Publication Data

US 2025/0258875 A1 Aug. 14, 2025

Related U.S. Application Data

(60) Provisional application No. 63/553,566, filed on Feb. 14, 2024.

(51) Int. Cl.
*G06F 16/93* (2019.01)
*G06F 16/31* (2019.01)
*G06F 16/955* (2019.01)
*G06F 40/169* (2020.01)

(52) U.S. Cl.
CPC ............ *G06F 16/93* (2019.01); *G06F 16/322* (2019.01); *G06F 16/955* (2019.01); *G06F 40/169* (2020.01)

(58) Field of Classification Search
CPC .................................................... G06F 16/322
See application file for complete search history.

(56) References Cited

U.S. PATENT DOCUMENTS

| | | | |
|---|---|---|---|
| 7,174,343 B2 * | 2/2007 | Campos ............ | G06F 18/23213 |
| | | | 707/999.102 |
| 2016/0337297 A1 | 11/2016 | Rakshit | |
| 2022/0383084 A1 | 12/2022 | Lamy-Poirier | |
| 2023/0135179 A1 | 5/2023 | Mielke et al. | |
| 2023/0140125 A1 | 5/2023 | Giesinger et al. | |
| 2024/0086647 A1 * | 3/2024 | Ramanujam ......... | G06F 40/103 |
| 2025/0061291 A1 * | 2/2025 | Gardner ................. | G06F 40/56 |
| 2025/0086735 A1 * | 3/2025 | Vedula ................... | G06Q 50/18 |

FOREIGN PATENT DOCUMENTS

JP 2008-171302 A 7/2008

OTHER PUBLICATIONS

Ferreira, Rafael, et al. "A four dimension graph model for automatic text summarization." 2013 IEEE/WIC/ACM International Joint Conferences on Web Intelligence (WI) and Intelligent Agent Technologies (IAT). vol. 1. IEEE, 2013.

(Continued)

*Primary Examiner* — Brittany N Allen
(74) *Attorney, Agent, or Firm* — Manatt, Phelps & Phillips, LLP

(57) ABSTRACT

A conceptual calculator system and method have a plurality of elements/processes that overcome and address the issues/limitations of the known techniques. In one example, the conceptual calculator may be used for research, but has a plurality of different use cases.

22 Claims, 45 Drawing Sheets

(56) References Cited

OTHER PUBLICATIONS

Mridha, Muhammad F., et al. "A survey of automatic text summarization: Progress, process and challenges." IEEE Access 9 (2021): 156043-156070.
Akhmetov, Iskander, et al. "A Comprehensive Review on Automatic Text Summarization." Computacion y Sistemas 27.4 (2023).
Elfayoumy, Sherif, and Jenny Thoppil. "A survey of unstructured text summarization techniques." International Journal of Advanced Computer Science and Applications 5.4 (2014).
Yang, Min, et al. "Plausibility-promoting generative adversarial network for abstractive text summarization with multi-task constraint." Information Sciences 521 (2020): 46-61.
Ziheng, Lin. "Graph-based methods for automatic text summarization." School of Computing, National University of Singapore (2007).
Dong, Yue, et al. "Multi-fact correction in abstractive text summarization." arXiv preprint arXiv:2010.02443 (2020).
Salton, Gerard, et al. "Automatic text structuring and summarization." Information processing & management 33.2 (1997): 193-207.
Avinesh, P. V. S., et al. "Sherlock: A System for Interactive Summarization of Large Text Collections." Proc. VLDB Endow. 11.12 (2018): 1902-1905.
Wen, Yuhao, et al. "Interactive summarization and exploration of top aggregate query answers." Proceedings of the VLDB Endowment. International Conference on Very Large Data Bases. vol. 11. No. 13. NIH Public Access, 2018.
Shapira, Ori, et al. "Evaluating interactive summarization: an expansion-based framework." arXiv preprint arXiv:2009.08380 (2020).
Liu, Shixia, et al. "Tiara: Interactive, topic-based visual text summarization and analysis." ACM Transactions on Intelligent Systems and Technology (TIST) 3.2 (2012): 1-28.
Shapira, Ori, et al. "Extending multi-document summarization evaluation to the interactive setting." Proceedings of the 2021 conference of the North American Chapter of the Association for Computational Linguistics: human language technologies. 2021.
He, Junxian, et al. "Ctrlsum: Towards generic controllable text summarization." arXiv preprint arXiv:2012.04281 (2020).
Jin, Hangi, Tianming Wang, and Xiaojun Wan. "Multi-granularity interaction network for extractive and abstractive multi-document summarization." Proceedings of the 58th annual meeting of the association for computational linguistics. 2020.
Han, Chi, et al. "Lm-infinite: Simple on-the-fly length generalization for large language models." arXiv preprint arXiv:2308.16137 (2023).
Munkhdalai, Tsendsuren, Manaal Faruqui, and Siddharth Gopal. "Leave No Context Behind: Efficient Infinite Context Transformers with Infini-attention." arXiv preprint arXiv:2404.07143 (2024).
Ding, Yiran, et al. "LongRoPE: Extending LLM Context Window Beyond 2 Million Tokens." arXiv preprint arXiv:2402.13753 (2024).
Huang, Yuxuan. "LLM-ARK: Knowledge Graph Reasoning Using Large Language Models via Deep Reinforcement Learning." arXiv preprint arXiv:2312.11282 (2023).
Martins et al., "former: Infinite Memory Transformer", Instituto de Telecomunicacoes, DeepMind, Institute of Systems and Robotics, LUMLIS (Lisbon ELLIS Unit), Instituto Superior Tecnico, Unbabel Lisbon, Portugal, arXiv:2109.00301v3 [cs.CL] Mar. 25, 2022, 18 pages.
Chang, Yapei, et al. "BooookScore: A systematic exploration of book-length summarization in the era of LLMs." arXiv preprint arXiv:2310.00785 (2023).
Pu, Xiao, Mingqi Gao, and Xiaojun Wan. "Summarization is (almost) dead." arXiv preprint arXiv:2309.09558 (2023).
Keswani, Gunjan, et al. "Abstractive Long Text Summarization Using Large Language Models." International Journal of Intelligent Systems and Applications in Engineering 12.12s (2024): 160-168.
Liu, Yiheng, et al. "Summary of chatgpt-related research and perspective towards the future of large language models." Meta-Radiology (2023): 100017.
Gupta, Puneet, Swati Raturi, and P. Venkateswarlu. "Chatgpt for designing course outlines: A boon or bane to modern technology." Available at SSRN 4386113 (2023).
Vassiliou, Giannis, Nikolaos Papadakis, and Haridimos Kondylakis. "SummaryGPT: Leveraging ChatGPT for summarizing knowledge graphs." European Semantic Web Conference. Cham: Springer Nature Switzerland, 2023.
Chu, Zhixuan, et al. "Llm-guided multi-view hypergraph learning for human-centric explainable recommendation. " arXiv preprint arXiv:2401.08217 (2024).
Raman, Natraj, and Sameena Shah. "Synthetic Text Generation using Hypergraph Representations." arXiv preprint arXiv:2309.06550 (2023).
Bazaga, Adrian, Pietro Lio, and Gos Micklem. "HyperBERT: Mixing Hypergraph-Aware Layers with Language Models for Node Classification on Text-Attributed Hypergraphs." arXiv preprint arXiv:2402.07309 (2024).
Pan, Shirui, Yizhen Zheng, and Yixin Liu. "Integrating graphs with large language models: Methods and prospects." IEEE Intelligent Systems 39.1 (2024): 64-68.
Liang, Xinnian, et al. "Unleashing infinite-length input capacity for large-scale language models with self-controlled memory system." arXiv preprint arXiv:2304.13343 (2023).
Hatalis, Kostas, et al. "Memory Matters: The Need to Improve Long-Term Memory in LLM-Agents." Proceedings of the AAAI Symposium Series. vol. 2. No. 1. 2023.
Hron, et al., "Infinite attention: NNGP and NTK for deep attention networks", Proceedings of the 37th International Conference on Machine Learning, Online, PMLR 119, 2020, 11 pages.
Curtain, Ruth F., and Hans Zwart. An introduction to infinite-dimensional linear systems theory. vol. 21. Springer Science & Business Media, 2012, (Part 1 pp. 1-494).
Curtain, Ruth F., and Hans Zwart. An introduction to infinite-dimensional linear systems theory. vol. 21. Springer Science & Business Media, 2012, (Part 2 pp. 495-698).
Gao, Yunfan et al., "Retrieval-Augmented Generation for Large Language Models: A Survey" arXiv:2312.10997v1 [cs.CL] Dec. 18, 2023, 26 pages.

* cited by examiner

Raw Outline Texts of Horizontal Sub-Slices

Sub-Slice 1

I) Structural Aspects of the Cytoskeleton (S: Essentials Of Biology.15)
  A) The three main structural components are
     (S: Essentials Of Biology.16, L: I) A))
     i) microtubules (S: Essentials Of Biology.16, L: I) A)i) )
     ii) actin (S: Essentials Of Biology.16, L: I) A)ii) )
     iii) myosin (S: Essentials Of Biology.16, L: I) A)iii) )
     iv) These are all filamentous proteins which (S: Essentials Of Biology.16, L: I) A)iv) )
        a) provide structural support (S: Essentials Of Biology.16, L: I)A)iv)a) )
        b) change the shape of the cell (S: Essentials Of Biology.16, L: I)A)iv)b) )
        c) act as a transportation network (S: Essentials Of Biology.16, L: I)A)iv)c) )
  B) actin (S: Essentials Of Biology.17, L: I)B)
     i) thin filaments (S: Essentials Of Biology.17, L: I)B)i) )
     ii) contracts (S: Essentials Of Biology.17, L: I)B)ii) )
     iii) essential to cell division (S: Essentials Of Biology.18, L: I)B)iii) )
  C) myosin (S: Essentials Of Biology.19)
     i) dense filaments (S: Essentials Of Biology.20, L: I)C)i) )
     ii) contracts (S: Essentials Of Biology.20, L: I)C)ii) )

Sub-Slice 2

A) The three main structural components are
   (S: Essentials Of Biology.16, L: I) A))
   i) microtubules (S: Essentials Of Biology.16, L: I) A)i) )
   ii) actin (S: Essentials Of Biology.16, L: I) A)ii) )
   iii) myosin (S: Essentials Of Biology.16, L: I) A)iii) )
   iv) These are all filamentous proteins which (S: Essentials Of Biology.16, L: I) A)iv) )
      a) provide structural support (S: Essentials Of Biology.16, L: I)A)iv)a) )
      b) change the shape of the cell (S: Essentials Of Biology.16, L: I)A)iv)b) )
      c) act as a transportation network (S: Essentials Of Biology.16, L: I)A)iv)c) )

257f

FROM FIG. 14B

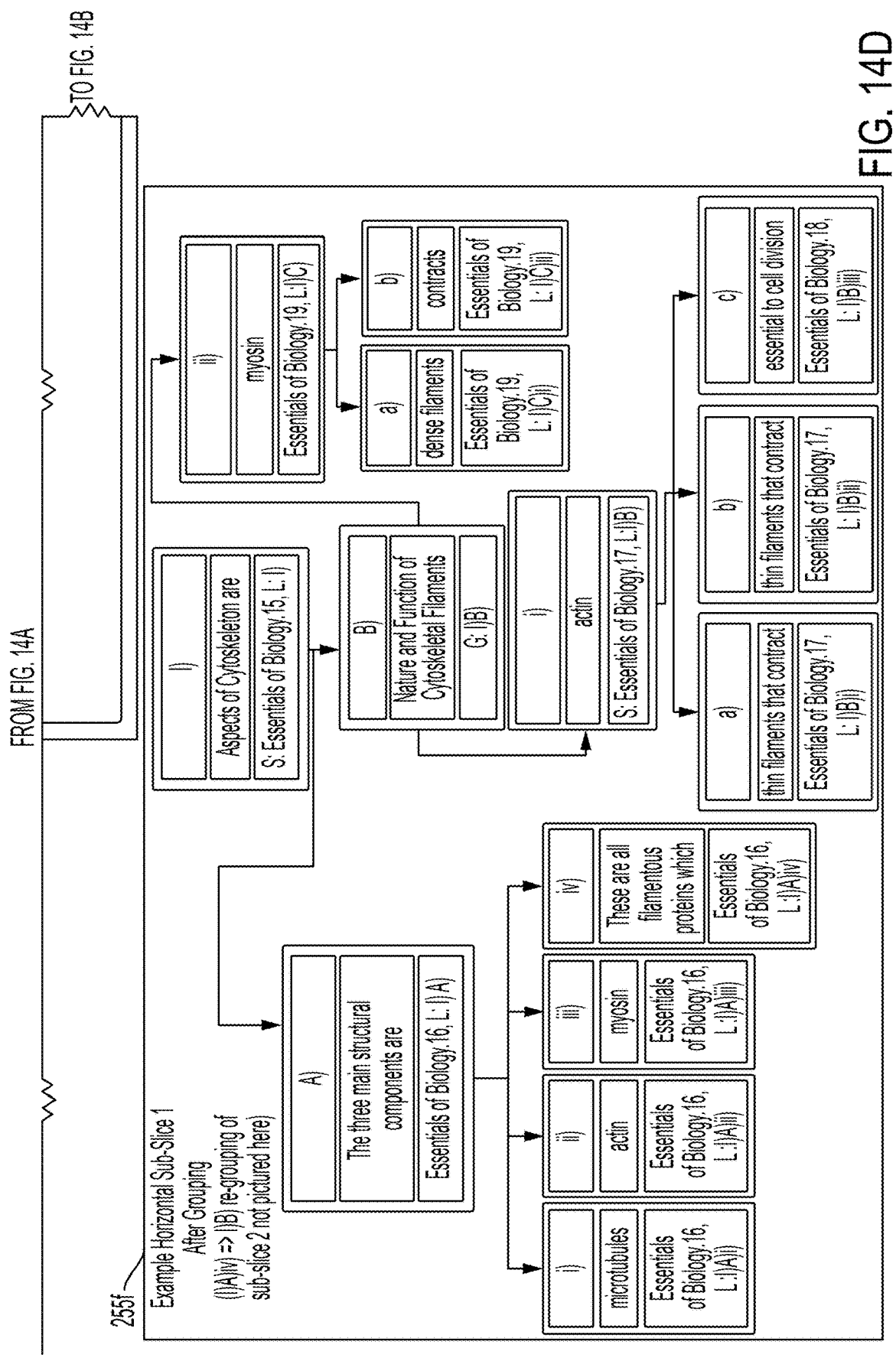

FROM FIG. 14C

260f — Raw Outline Text After (re-)Grouping and Re-Attaching

I) Structural Aspects of the Cytoskeleton (S: Essentials Of Biology,15)
  A) The three main structural components are (S: Essentials Of Biology,16, L: I)A)
    i) microtubules (S: Essentials Of Biology,16, L: I)A))
    ii) actin (S: Essentials Of Biology,16, L: I)A))
    iii) myosin (S: Essentials Of Biology,16, L: I)A))
  B) These are all filamentous proteins which (S: Essentials Of Biology,16, L: I)A)))
    i) provide structural support (S: Essentials Of Biology,16, L: I)A)))
    ii) change the shape of the cell (S: Essentials Of Biology,16, L: I)A)))
    iii) act as a transportation network (S: Essentials Of Biology,16, L: I)A)))
  C) Nature and Function of Cytoskeletal Filaments (G: I)C)
    i) actin (S: Essentials Of Biology,17)
      a) thin filament (S: Essentials Of Biology,17)
      b) contracts (S: Essentials Of Biology,17)
      c) essential to cell division (S: Essentials Of Biology,18)
    ii) myosin (S: Essentials Of Biology,19)
      a) dense filament (S: Essentials Of Biology,20)
      b) contracts (S: Essentials Of Biology,20)

---

258f — (re-)Group Sub-Slices (regrouping is moving sub-trees, grouping is inserting a new node between nodes to create a subtree)

↓

259f — re-attach sub-slices from the bottom up using current and original location annotations, replacing grouped nodes as necessary

↓

256 — Convert to Raw Outline Text, keeping annotations

FIG. 14E

CONCEPTUAL CALCULATOR SYSTEM AND METHOD

PRIORITY CLAIMS/RELATED APPLICATIONS

This utility patent application claims the benefit under 35 USC 119(e) to U.S. Provisional Patent Application Ser. No. 63/553,566, filed Feb. 14, 2024, the entirety of which is incorporated herein by reference.

FIELD

The disclosure related to artificial intelligence and a system and method for accelerating and automating reading and research using artificial intelligence.

BACKGROUND

In the past, efforts to accelerate and (partially) automate intellectual work through knowledge indexing, retrieval, (re-)organization, and synthesis have faced a number of challenges that yield subpar performance or the inability to do so at all. Attempts to convert information, data, or intellectual workflows from human-readable to machine-usable format and back again for use by either humans or machines querying for research and problem-solving has been fraught with complications, whether using traditional indexing, machine learning, artificial intelligence, large language models and their multi-modal counterparts, or vector-embedding and vector search techniques.

Each of these known techniques have limitations and complications that prevent the desired conversion of human readable workflows to machine usable format and back again. The complications and limitations with known techniques include failing to return sections of documents that are relevant to answering the query even when they are present in the database, "hallucinating" answers (making up information), failing to answer questions whose answer is spread across multiple documents or document slices, failing to cite sources for answers, returning incorrect information, failing to return answers that do not exactly match or nearly match the query, and failing to be able to fulfill requests properly due to limitations in context windows and/or storage and/or processing and/or human reading and processing speed of returned results in one or more of the necessary inputs, intermediate results, and outputs. A context window is the input and output space of the LLM itself. Table 1 below provides a summary of the known techniques and the complications that limit each different known technique.

TABLE 1

Limitations and Complication Summary of Known Techniques

| Deficiencies and Issues | Traditional Indexing | Artificial Intelligence (GOFAI) | Machine Learning | Large Language Models and Multi-Modal Models | Vector-Embeddings and RAG |
|---|---|---|---|---|---|
| failure to return relevant documents | ✓ | ✓ | ✓ | ✓ | ✓ |
| "Hallucinating" incorrect answers | x | x | ✓ | ✓ | ✓ |
| failing to cite sources for answers | x | x | ✓ | ✓ | X |
| failure to answer when answer is spread across multiple documents | ✓ | ✓ | ✓ | ✓ | X |
| failure to return answers that do not exactly match or nearly match the query | ✓ | ✓ | ✓ | ✓ | ✓ |
| Inability to understand semantic relationships | ✓ | ✓ | ✓ | x | ✓ |
| limited ability to capture complex relationships | ✓ | ✓ | ✓ | x | ✓ |
| failure to fulfill requests properly due to limitations in context windows | N/A | N/A | N/A | ✓ | ✓ |
| difficulty handling unstructured data | ✓ | ✓ | ✓ | x | X |
| lack of adaptability to new or evolving information | x | ✓ | ✓ | ✓ | x |
| Sensitivity to input phrasing changes | ✓ | ✓ | ✓ | x | ✓ |
| Dependence on large amounts of labeled data | x | x | ✓ | x | x |
| black-box nature causing trust issues | x | x | ✓ | ✓ | ✓ |
| reduced performance on | ✓ | x | ✓ | x | |

TABLE 1-continued

Limitations and Complication Summary of Known Techniques

| Deficiencies and Issues | Traditional Indexing | Artificial Intelligence (GOFAI) | Machine Learning | Large Language Models and Multi-Modal Models | Vector-Embeddings and RAG |
|---|---|---|---|---|---|
| rare or unseen cases | | | | | |
| challenges in interpretability and explainability | x | x | ✓ | ✓ | ✓ |
| challenges in generalization across different domains | ✓ | ✓ | ✓ | x | x |
| difficulty in controlling the model's behavior | x | x | ✓ | ✓ | ✓ |
| Returning incorrect information | x | x | ✓ | ✓ | ✓ |
| Loss of semantic information during dimensionality reduction | x | x | ✓ | X | ✓ |
| difficulty in handling dynamic or evolving data | x | x | ✓ | ✓ | x |
| Difficulty handling knowledge synthesis at scale | ✓ | ✓ | ✓ | ✓ | ✓ |

As shown in Table 1, each known technique suffers from complications and limitations that limit the effectiveness of the attempt to convert human readable workflows into computer readable process and back and thus it is desirable to provide a conceptual calculator system and method that does not suffer from the complications and limitations of the known techniques and it is to this end that the disclosure is directed.

DETAILED DESCRIPTION OF ONE OR MORE EMBODIMENTS

Figure 1:
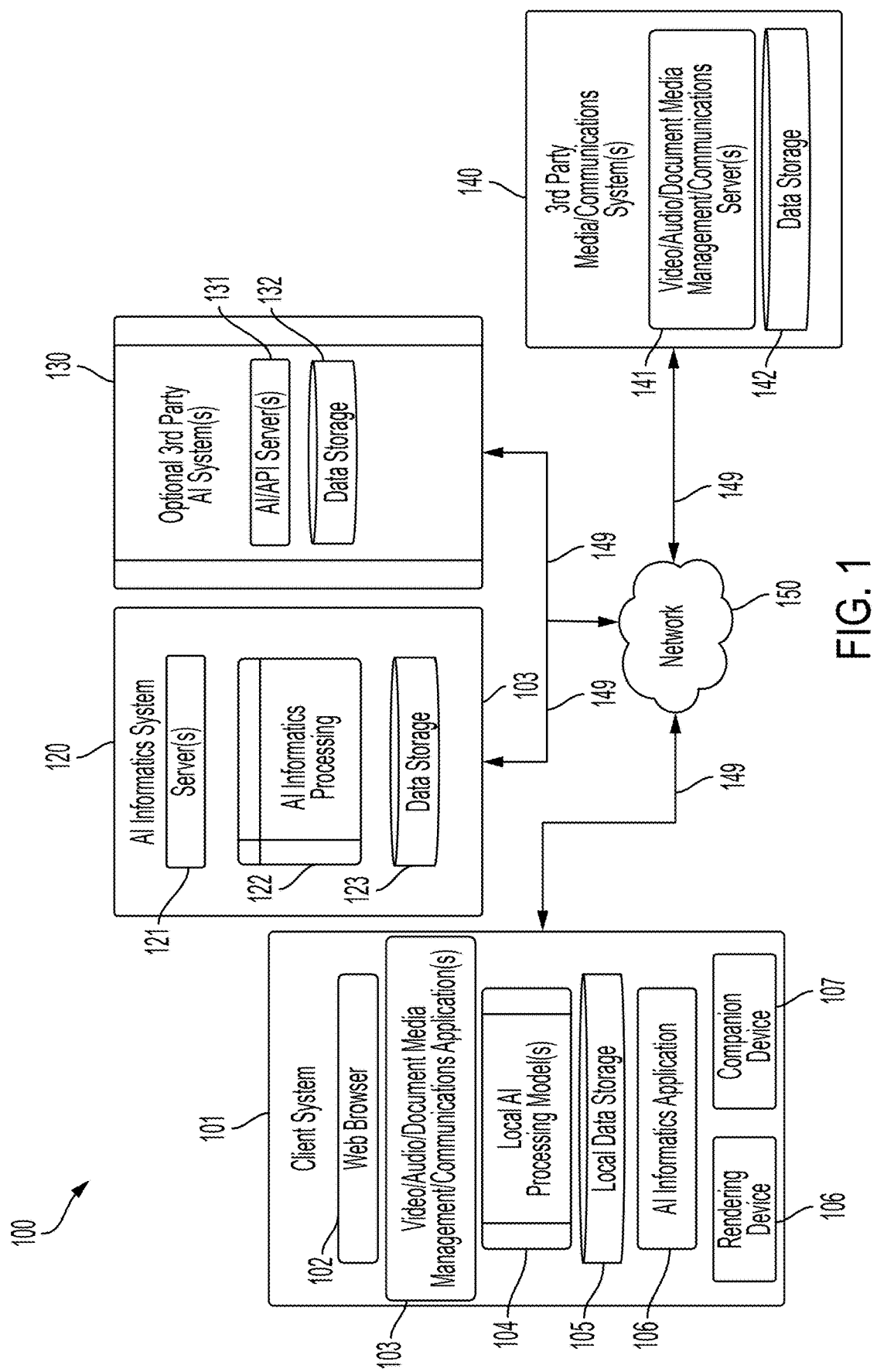
FIG. 1 illustrates an example network environment system that may include a novel artificial intelligence (AI) informatics system.

The disclosure is particularly applicable to a conceptual calculator which accelerates and automates intellectual work with a novel scheme for knowledge indexing, retrieval, (re-)organization, and synthesis implemented using the exemplary system shown in FIG. 1 and it is in this context that the disclosure will be described. It will be appreciated, however, that the conceptual calculator system and method has greater utility since it may be implemented other manners that are within the scope of the disclosure. Furthermore, the disclosure uses a particular use case (a research use case) to describe and illustrate the processes and system but the conceptual calculator system and method may be used for a plurality of different use cases in which the conceptual calculator accelerates and automates in the manner discussed below for the research use case.

While knowledge indexing, knowledge retrieval, and information organization and reorganization are not themselves novel, all previous attempts at each have had significant weaknesses individually as discussed above in the background, and these weaknesses also prevent these known techniques from being combined into a calculator for concepts, as discussed above. The above techniques and their shortcomings will be tackled individually within this section. Additionally, there are several novel elements within this disclosure that achieve proper functioning in the context of a calculator for concepts, as will be explained below. When a combination of elements within the disclosure are combined into a system for conceptual calculation, they overcome all of the weaknesses and issues of known and conventional techniques within a single coherent system. Additionally, there are several novel elements within this disclosure that are critical for proper functioning in the context of a calculator for concepts. The novel elements may include, but not limited to, a Content-Handling and Extraction Workflow (CHEW) process/element, a Verified Referenced Encoder (VRE, which is a special subset of CHEW) element/process, a Directed Retrieval-Augmented Generation (DRAG) process/element, a Directed Recursive Organizing Placement (DROP) process/element, a Document Interpolation from Graphs by Extracting Structured Text (DIGEST) process/element, and a Reassembling Unified Manuscripts from Information Nodes for AI Training and Education (RUMINATE) process/element. Table 2 below summarizes the difficulty/limitations/issues with the conventional/known techniques discussed above and the element(s)/process(es) of the conceptual calculator that address and overcome each of the above difficulty/limitations/issues with the conventional/known techniques discussed above.

TABLE 2

| Difficulty or Issue | Conceptual Calculator Element(s)/Process(es) |
| --- | --- |
| failure to return relevant documents | DRAG, DROP |
| "Hallucinating" incorrect answers | CHEW, VRE, DRAG, DROP |
| failing to cite sources for answers | VRE, DRAG, DROP |
| failure to answer when answer is spread across multiple documents | CHEW, DRAG, DROP |
| failure to return answers that do not exactly or nearly match the query | DRAG, DROP |
| Inability to understand semantic relationships | DRAG, DROP |
| limited ability to capture complex relationships | DRAG, DROP |
| failure to fulfill requests properly due to limitations in context windows | CHEW, DRAG, DROP, RUMINATE |
| difficulty handling unstructured data | CHEW, DRAG, DROP |
| lack of adaptability to new or evolving information | CHEW, DROP, DIGEST, RUMINATE |
| Sensitivity to input phrasing changes | DRAG, DROP |
| Dependence on large amounts of labeled data | CHEW, DRAG, DROP |
| black-box nature causing trust issues | VRE, DRAG |
| reduced performance on rare or unseen cases | DRAG, DROP |
| challenges in interpretability and explainability | VRE, DRAG, DROP |
| challenges in generalization across different domains | DRAG, DROP, RUMINATE |
| difficulty in controlling the model's behavior | DRAG, DROP |
| Returning incorrect information | CHEW, VRE, DRAG, DROP |
| Loss of semantic information during dimensionality reduction | CHEW, VRE, DRAG, DROP, DIGEST |
| difficulty in handling dynamic or evolving data | CHEW, VRE, RUMINATE |
| Difficulty handling knowledge synthesis at scale | CHEW, VRE, DRAG, DROP, DIGEST, RUMINATE |

Each of the processes shown in Table 2 (CHEW, VRE, DRAG, DROP, DIGEST and RUMINATE) is novel and overcomes some of the limitations of the existing systems and techniques. The details of each of the novel processes are provided below along with the benefits and outputs of each process. Although the processes are described below, for illustration purposes, in the context of a research use case, each process may have unique properties and benefits that are particular suited to particular other use cases. Each of the combination of processes shown in Table 2 above is a novel process to resolve the difficulty or issue with known and conventional systems. For example, as shown in Table 2 above, the combination of the CHEW, VRE, DRAG, DROP and DIGEST processes may together form a unique process to overcome the loss of semantic information during dimensionality reduction that is known to occur in known AI/LLM systems and technique. As another example, the known issue of hallucination of incorrect answers by AI/LLM system and techniques may be addressed and overcome by the novel combination of the CHEW, VRE, DRAG and DROP processes.

DRAG and DROP consider the contents of every document within the CHEW'd contents of the document database that it is desired to look through, which allows for the relevant content to make its way into the final answer even if the majority of the content from that document is completely unrelated. CHEWing with the VRE provides sentence-level references for every piece of information within the input documents, which are then maintained during DRAG and DROP allowing the citation of sources for every aspect of an answer or document produced. This also prevents the hallucination of answers because every aspect of the answer must have a chain of custody to an original sourcing document or it will be rejected by the process.

CHEWing up documents (and the VRE subroutine thereof) allows for the information to be broken down and separated from the original documents while keeping reference to their source. DRAG and DROP then effectively allow the combination of data from multiple documents by taking each piece of data and using the structure of the outline-so-far to traverse each piece of information to its appropriate final location.

DRAG and DROP allow the full power of the LLM to be used at each step of the query-answering or document-production process, avoiding reliance on vector techniques which cannot handle anything that does not exactly or nearly exactly match the query. DRAG and DROP allow the combination of data within a complex structure to capture complex semantic relationships in answers and new documents.

Context window limits in typical systems and techniques can be completely avoided by breaking down the input documents in pieces using CHEW to keep track of where the information from those inputs came from, and then DRAG and DROP both induce a traversable structure which does not care for the context window size due to the fractal descriptive nature of an outline. These outlines can then be broken into subtrees that fit within the context window to DIGEST them into text that is vastly in excess of the original context window size, which can then be used to provide more training data to RUMINATE upon should the actual LLM context window itself need fine-tuning.

Difficulties in handling unstructured data can be handled by providing a structuring to the data through the use of CHEW and its VRE to obtain labeled, sourced information, and then structuring the answers via DRAG and DROP. A sensitivity to input phrasing changes is characteristic of vector-embedded RAG, but by using the full power of the LLM at every step during DRAG and DROP we can entirely avoid this issue for answering queries and producing documents.

Challenges in interpretability and explainability go away when the VRE ensures that every piece of information entering the system can be systematically traced back to its origin, which DRAG and DROP then ensure does not get lost during answering and document skeleton production so that every part of the response is explainable in terms of the location within the sources of the inputs to the system. This cracks open the black box, allowing for trustability in the outputs of the AI informatics system.

Challenges in generalization across a variety of domains can be tackled via the DRAG and DROP processes, which allow for verified query answering no matter the domain and verified document creation. After DIGESTing, these verified documents can then be RUMINATEd upon, allowing for sufficient synthetic data to allow models that would otherwise not have sufficient data to reach generalization to generalize. This also protects against reduced performance on rare or unseen cases.

Difficulty in controlling model behavior is overcome via explicitly defining the structure of the output and ensuring that the final results conform to that structure, and that the structure itself has only been populated by information from valid sources that have been CHEWed and passed through the VRE.

Traditional LLMs have a significant problem with hallucination (the returning of incorrect information) because they do not have a chain of custody of facts that they can automatically verify the integrity of. The CHEW workflow, using VRE, maintains this chain of custody during input, and DRAG and DROP maintain it during output, which allows for us to automatically verify the validity and source of every piece of information produced by our AI informatics process.

Traditional Vector-Embedded RAG throws away semantic information during dimensionality reduction. By avoiding dimensionality reduction and using this alternative method based around CHEWing up data with the use of a VRE, and answering queries via DRAG and/or using DROP and DIGEST to generate new text, we can avoid the loss of semantic information.

By using the VRE within the CHEW workflow to label the source of information, it becomes possible to selectively de-activate or flag pieces of knowledge from sources as they evolve, change, or become stale. These can then be traced to the outlines used to produce content via DIGEST, where they can be updated and then re-DIGESTed. These DIGESTed materials may then be RUMINATEd upon to re-train the AI with the new knowledge, enabling it to stay up to date with as many synthetic examples as it needs to overcome its previous training. This provides a workaround for a lack of adaptability to new or evolving information.

Knowledge synthesis at scale is difficult because LLMs are unable to produce text with large-scale coherence that can be confirmed to lack hallucinations of facts. By using CHEW to break down a corpus of known quality information (including the VRE step, which labels each fact back to its original source sentence), we can produce a knowledge base of known quality information that can be cited and referenced. We can then use DROP to re-organize that knowledge into as many different forms as we would like, optionally including the use of DRAG to answer questions and synthesize knowledge within the new outline. Finally, we may DIGEST this outline and produce final texts which may be used to RUMINATE upon for further training of AI processes with synthetic knowledge.

System Overview

Now, a system and network environment in which the conceptual calculator have the elements/processes described above may be implemented is described with reference to FIG. 1. FIG. 1 illustrates an example network environment 100 associated with an AI Informatics System. The network environment 100 includes a Client System 101, an AI Informatics System 120, 3rd Party Media Storage/Publishing/Communications System(s) 140, and optional 3rd Party AI System(s) 130 connected via a Network 150. It should be noted that, in this disclosure, each and every artificial intelligence (AI) process or element may be individually user configured and/or augmented to modify the behavior(s) of the AI processes for a specific use case domain that are within the scope of the disclosure. Furthermore, each and every AI process/element also may be fine-tuned using real world input/output pairs.

Although FIG. 1 illustrates a particular arrangement of the Client System 101, the AI Informatics System 120, 3rd Party Media Storage/Publishing/Communications System(s) 140, and optional 3rd Party AI System(s) 130 connected via a Network 150, this disclosure contemplates any suitable arrangement of the Client System 101, the AI Informatics System 120, the 3rd Party Media Storage/Publishing/Communications System(s) 140, and the optional 3rd Party AI System(s) 130 connected via the Network 150. As an example and not by way of limitation, two or more of the Client System 101, the AI Informatics System 120, the 3rd Party Media Storage/Publishing/Communications System(s) 140, and the optional 3rd Party AI System(s) 130 may be connected directly, bypassing Network 150. As another example, two or more of the Client System 101, the AI Informatics System 120, the 3rd Party Media Storage/Publishing/Communications System(s) 140, and the optional 3rd Party AI System(s) 130 may be physically or logically co-located with each other in whole or in part. Moreover, although FIG. 1 illustrates a particular number of the Client Systems 101, the AI Informatics Systems 120, the 3rd Party Media Storage/Publishing/Communications System(s) 140, and the optional 3rd Party AI System(s) 130, this disclosure contemplates any number of Client Systems 101, AI Informatics Systems 120, 3rd Party Media Storage/Publishing/Communications System(s) 140, and optional 3rd Party AI System(s) 130. As an example and not by way of limitation, Network Environment 100 may include multiple of the Client Systems 101, the AI Informatics Systems 120, the 3rd Party Media Storage/Publishing/Communications System(s) 140, and the optional 3rd Party AI System(s) 130, and Networks 150.

In addition to the implementation shown in FIG. 1, the system may be implemented as a software as a service (SAAS) architecture in which a user/third party may submit data, queries, etc. and the system may return results that overcome the known issues/problems with known AI/MML systems that may be used by the user or third party AI/MML systems or the system may include its own AI/MML system implemented using the various novel processes described below and return results to queries lodged by the user or third party. The results returned by the system may be, in some embodiments, returned using application programming interfaces (APIs).

The network environment and system may be implemented using any suitable Network 150. As an example and not by way of limitation, one or more portions of the network 150 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular technology-based network, a satellite communications technology-based network, another Network 150, or any combination of two or more such networks 150.

As shown in FIG. 1, each of the portions/elements of the system 101, 120, 130 and 140 may be connected to the network 150 by one or more links 149 or connected to each other. This disclosure contemplates any suitable links 149. For example, in particular embodiments, the one or more links 149 may include one or more wirelines (such as for example a Digital Subscriber Line (DSL) or Data Over Cable Service Interface (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH) links. In particular embodiments, the one or more links 149 each include an ad-hoc network, an intranet, an extranet, a VPN, a LAN, a WLAN, a WAN, a WWAN, a MAN, a portion of the internet, a portion of the PSTN, a cellular technology-based network, a satellite communications technology-based network, another link 149, or a combination of two or more such links 149. Links 149 need not necessarily be the same throughout a network environment 100. One or more first links 149. Computing Infrastructure may differ in one or more respects from one or more second links 149.

In particular embodiments, the client system 101 may be any suitable electronic device including hardware, software, or embedded logic components, or a combination of two or more such components, and may be capable of carrying out the functionalities implemented or supported by the client system 101. As an example and not by way of limitation, the client system 130 may include a computer system such as a desktop computer, notebook or laptop computer, netbook, a smartphone, a tablet computer, e-book reader, GPS device, camera, personal digital assistant (PDA), handheld electronic device, cellular telephone, smartphone, smart speaker, smart watch, smart glasses, augmented-reality (AR) glasses, virtual reality (VR) headset, other suitable electronic device, or any suitable combination thereof. This disclosure contemplates any suitable client system 101 may be used as part of the system 100 and the system may have a plurality of client devices 101 that each exchange data and interact with the rest of the system as described below. In particular embodiments, client system 101 may enable a network user at a client system 101 to access the network 150. The client system 101 may also enable the user to communicate with other users at other client systems 101.

In particular embodiments, each of the one or more client systems 101 may include a web browser 102, and may have one or more add-ons, plug-ins, or other extensions. A user at client system 101 may enter a Uniform Resource Locator (URL) or other address directing a web browser 102 to a particular server (such as server 121, or a server associated with a 3rd party system 140 such as 141), and the web browser 102 may generate a Hyper Text Transfer Protocol (HTTP) request and communicate the HTTP request to the server. The server may accept the HTTP request and communicate to a client system 101 one or more Hyper Text Markup Language (HTML) files responsive to the HTTP request. The client system 101 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, Extensible Hyper Markup Language (XML) files, JavaScript Object Notation (JSON) files, or Yet Another Markup Language (YAML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, a client system 101 may include a video/audio/document Media Storage/Publishing/Communications application 103. A user at a client system 101 may use the video/audio/document Media Storage/Publishing/Communications application 103 to access an online video/audio/document Media Storage/Publishing/Communications network. The user at the client system 101 may use the video/audio/document Media Storage/Publishing/Communications application to access media such as videos, audio, and text documents with or without images (e.g., posts, news articles, scientific articles, etc.). The user at the client system 101 may also use the video/audio/document Media Storage/Publishing/Communications application 103 to chat with other users (using any combination of text, audio, images, and video, whether synchronous or asynchronous). As an example and not by way of limitations, the user may browse trending topics and breaking news and/or books and papers from a content library using the video/audio/document Media Storage/Publishing/Communications application 103. The user at client system 101 may access and/or view local data and/or private files stored offline on local data storage 105 via the video/audio/document Media Storage/Publishing/Communications application 103. As an example and not by way of limitation, the user may browse personal files stored on the client system 101 that may include, for example, relevant files for a legal case.

In particular embodiments, a client system 101 may include an AI Informatics Application 106. A user at a client system 101 may use the AI Informatics Application 106 to interact with the AI Informatics System 120. In particular embodiments, the AI Informatics Application 106 may include a local chatbot functionality as a front-end interface for interacting with the user of the client system 101, including receiving user inputs and presenting outputs. In particular embodiments, the AI Informatics Application 106 may comprise a stand-alone application. In particular embodiments, the AI Informatics Application 106 may provide a client for interacting and integrating with a video/audio/document Media Storage/Publishing/Communications system 103 or another suitable application. In particular embodiments, the AI Informatics Application 106 may be integrated into the client system 101, an AI Informatics hardware device, or any other suitable hardware devices. In particular embodiments, the AI Informatics application 106 may be also part of the AI Informatics System 120. In particular embodiments, the AI Informatics Application 106 may be accessed via the web browser 102. In particular embodiments, the user may interact with the AI Informatics System 120 by providing user input to the AI Informatics Application 106 via various modalities (e.g., audio, voice, text, vision, image, video, gesture, motion, activity, location, orientation). The AI Informatics Application 106 may communicate the user input to the AI Informatics Application 120 (e.g., via the local chatbot or client). Based on the user input, the AI Informatics System 120 may generate responses. The AI Informatics System 120 may send the generated responses to the assistant application 106. The AI Informatics Application 106 may then present the responses to the user at the client system 101 via various modalities (e.g., audio, text, image, and video). As an example and not by way of limitation, the user may interact with the AI Informatics System 120 by providing a user input (e.g., a verbal request for information regarding the contents of a document) to the AI informatics chatbot or client via a microphone of the client system 101. The AI Informatics Application 106 may then communicate the user input to the AI Informatics System 120 over network 150. The AI Informatics System 120 may accordingly analyze the user input, generate a response based on the analysis of the user input (e.g., a query for information requested from a document obtained from a third-party media storage/publishing/communications system 140), and communicate the generated response back to the AI Informatics Application 106. The AI Informatics Application 106 may then present the generated response to the user in any suitable manner (e.g., displaying a text-based push notification or an image displaying the relationships requested by the query on a display of the client system 101. The AI Informatics System 120 may also have an AI informatics processing 122 that is discussed below in more detail.

In particular embodiments, a client system 101 may implement wake-word detection techniques to allow users to conveniently activate the AI Informatics System 120 using one or more wake-words associated with AI Informatics System 120. As an example and not by way of limitation, a system audio API on client system 101 may continuously monitor user input comprising audio data (e.g., frames of voice data) received at the client system 101. In this example, a wake-word associated with the AI Informatics System 120 may be the voice phrase "study this." In this example, when the system audio API on client system 101 detects the voice phrase "study this" in the monitored audio data, the assistant system 120 may be activated for subsequent interaction with the user (e.g., automated ingestion of the currently viewed document, preparation for answering questions relating to the document, etc.). In alternative embodiments, similar detection techniques may be implemented to activate the AI Informatics System 120 using particular non-audio user inputs associated with the AI Informatics System 120. For example, the non-audio user inputs may be specific visual signals detected by a low-power sensor (e.g., camera) of client system 101. As an example and not by way of limitation, the visual signals may be a position of the user (e.g., the user's gaze towards the client system 101), a user motion (e.g., the user making a specific gesture), or any other suitable visual signal. As another example and not by way of limitations, the non-audio user input may be a keyboard shortcut or any other suitable non-audio user input of client system 101.

In particular embodiments, a client system 101 may include local AI Processing Models 104 and optionally Local Data Storage 105 for analyzing locally stored files. As an example and not by way of limitation, the user at client system 101 may wish to analyze private or sensitive files using AI Processing Models 104 so that the files are not sent to AI Informatics System 120 and can instead be processed and stored and rendered by the AI Informatics Application 106 on client system 101 without sending them across network 150. In alternative embodiments, the user of client system 101 may wish to train and use their own Local AI Processing Model(s) 104, rather than using the options available via AI Informatics Application System 120.

In particular embodiments, a client system 101 may include a rendering device 107 and, optionally, a companion device 108. The rendering device 107 may be configured to render outputs generated by the AI Informatics System 120 to the user. The companion device 108 may be configured to perform computations associated with particular tasks (e.g., running AI Processing Models or communications with the assistant system 120, etc.) locally (i.e. on-device) on the companion device 108 in particular circumstances (e.g. when the rendering device 107 is unable to perform said computations). In particular embodiments, the client system 101, the rendering device 107, and/or the companion device 108 may each be a suitable electronic device including hardware, software, or embedded logic components, or a combination of two or more such components, and may be capable of carrying out, individually or cooperatively, the functionalities implemented or supported by the client system 101 described herein. As an example and not by way of limitation, the client system 101, the rendering device 107, and/or the companion device 138 may each include a computer system such as a desktop computer, notebook or laptop computer, netbook, a tablet computer, e-book reader, GPS device, camera, personal digital assistant (PDA), handheld electronic device, cellular telephone, smartphone, smart speaker, virtual reality (VR) headset, augmented-reality (AR) smart glasses, other suitable electronic device, or any suitable combination thereof. In particular embodiments, one or more of the client system 101, the rendering device 107, and the companion device 108 may operate as an AI Informatics device. As an example and not by way of limitation, the rendering device 107 may comprise smart glasses and the companion device 108 may comprise a smart phone. As another example and not by way of limitation, the rendering device 107 may comprise a smart phone and the companion device 108 may comprise a desktop computer. As yet another example and not by way of limitation, the rendering device 107 may comprise smart glasses and the companion device 108 may comprise a smart remote for the smart glasses. As yet another example and not by way of limitation, the rendering device 107 may comprise a VR/AR headset and the companion device 108 may comprise a smart phone.

In particular embodiments, a user may interact with the AI Informatics System 120 using the rendering device 107 or the companion device 108, individually or in combination. In particular embodiments, one or more of the client system 101, the rendering device 107, and the companion device 108 may implement a multi-stage wake-word detection model to enable users to conveniently activate the AI Informatics system 120 by continuously monitoring for one or more wake-words associated with AI Informatics System 120. At a first stage of the wake-word detection model, the rendering device 107 may receive audio user input (e.g., frames of voice data). If a wireless connection between the rendering device 107 and the companion device 108 is available, the application on the rendering device 107 may communicate the received audio user input to the companion application on the companion device 138 via the wireless connection. At a second stage of the wake-word detection model, the companion application on the companion device 108 may process the received audio user input to detect a wake-word associated with the AI Informatics System 120. The companion application on the companion device 108 may then communicate the detected wake-word to a server associated with the AI Informatics System 120 via wireless network 150. At a third stage of the wake-word detection model, the server associated with the AI Informatics System 120 may perform a keyword verification on the detected wake-word to verify whether the user intended to activate the user intended to activate and receive assistance from the AI Informatics System 120. In alternative embodiments, any of the processing, detection, or keyword verification may be performed by the rendering device 107 and/or the companion device 108. In particular embodiments, when the AI Informatics System 120 has been activated by the user, an application on the rendering device 107 may be configured to handle user inputs (e.g., user requests) received by the application on the rendering device 107. In particular embodiments, the rendering device 107 and the companion device 108 may be associated with each other (i.e., paired) via one or more wireless communication protocols (e.g., Bluetooth).

The following example workflow illustrates how a rendering device 107 and a companion device 108 may handle a user input provided by a user. In this example, an application on the rendering device 107 may receive a user input comprising a user request directed to the rendering device 107. The application on the rendering device 107 may then determine a status of a wireless connection (i.e., tethering status) between the rendering device 107 and the companion device 108. If a wireless connection between the rendering device 107 and the companion device 108 is not available, the application on the rendering device 107 may communicate the user request (optionally including additional data and/or contextual information available to the rendering device 107) to the AI Informatics System 120 via the network 150. The AI Informatics System 120 may then generate a response to the user request and communicate the generated response back to the rendering device 107. The rendering device 107 may then present the response to the user in any suitable manner. Alternatively, if a wireless connection between the rendering device 107 and the companion device 108 is available, the application on the rendering device 107 may communicate the user request (optionally including additional data and/or contextual information available to the rendering device 107) to the companion application on the companion device 108 via the wireless connection. The companion application on the companion device 108 may then communicate the user request (optionally including additional data and/or contextual information available to the companion device 108) to the AI informatics system 120 via the network 150. The AI informatics system 120 may then generate a response to the user request and communicate the generated response back to the companion device 108. The companion application on the companion device 108 may then communicate the generated response to the application on the rendering device 107. The rendering device 107 may then present the response to the user in any suitable manner. In the preceding example workflow, the rendering device 107 and the companion device 108 may each perform one or more computations and/or processes at each respective step of the workflow. In particular embodiments, performance of the computations and/or processes disclosed herein may be adaptively switched between the rendering device 107 and the companion device 108 based at least in part on a device state of the rendering device 107 and/or the companion device 108, a task associated with the user input, and/or one or more additional factors. As an example and not by way of limitation, one factor may be signal strength of the wireless connection between the rendering device 107 and the companion device 108. For example, if the signal strength of the wireless connection between the rendering device 107 and the companion device 108 is strong, the computations and processes may be adaptively switched to be substantially performed by the companion device 108 in order to, for example, benefit from the greater processing power of the GPU of the companion device 108. Alternatively, if the signal strength of the wireless connection between the rendering device 107 and the companion device 138 is weak, the computations and processes may be adaptively switched to be substantially performed by the rendering device 107 in a standalone manner. In particular embodiments, if the client system 101 does not comprise a companion device 108, the aforementioned computations and processes may be performed solely by the rendering device 107 in a standalone manner.

In particular embodiments, an AI Informatics System 120 may assist users with various informatics and/or research-related tasks. The AI Informatics System 120 may interact with the media storage and/or publishing and/or communications system 140 and/or the third-party AI System 130 when executing these informatics and/or research-related tasks.

In particular embodiments, the media storage/publishing/communications system 140 may generate, store, receive, and send media and publication and communications data, such as, for example, media files (such as video, audio, text, or documents with embedded media), live chat streaming data (such as video, audio, or text), citation network, or other suitable data related to the third-party storage or publishing or communications system 140. The media storage/publishing/communications system 140 may be accessed by the other components of network environment 100 either directly or via a network 150. As an example and not by way of limitation, a client system 101 may access the media storage/publishing/communications system 140 using a web browser 102 or a native application associated with the media storage/publishing/communications system 140 (e.g., a mobile storage application, a messaging application, a news application, a reference management application, another suitable application, or any combination thereof) either directly or via a network 150. In particular embodiments, the media storage/publishing/communications system 140 may include one or more servers 141. Each server 141 may be a unitary server or a distributed server spanning multiple computers or multiple datacenters. As an example and not by way of limitation, each server 141 may be a web server, a news server, a mail server, a message server, a file server, an application server, an exchange server, a database server, a proxy server, another server suitable for performing functions or processes described herein, or any combination thereof. In particular embodiments, each server 141 may include hardware, software, or embedded logic components or a combination of two or more such components for carrying out the appropriate functionalities implemented or supported by server 141. In particular embodiments, the media storage/publishing/communications system 140 may include one more data stores 142. Data stores 142 may be used to store various types of information. In particular embodiments, the information stored in data stores 142 may be organized according to specific data structures. In particular embodiments, each data store 142 may be a relational, columnar, correlation, filesystem, or other suitable database. Although this disclosure describes or illustrates particular types of databases, this disclosure contemplates any suitable types of databases. Particular embodiments may provide interfaces that enable a client system 101, a media storage/publishing/communications system 140, an AI informatics system 120, or a third-party system 130 to manage, retrieve, modify, add, or delete, the information stored in data store 142.

In particular embodiments, the media storage/publishing/communications system may provide users may store one or more citation graphs in one or more data stores 142. In particular embodiments, a citation graph may include multiple nodes (each corresponding to a particular author) or multiple document nodes (each corresponding to a particular publication)—and multiple edges connecting the nodes. The media storage/publishing/communications system 140 may provide users of the media/storage/publishing system the ability to communicate and share media with other users. In particular embodiments, users may join the media storage/publishing/communications network via the media storage/publishing/communications system 140 and then add connections (e.g., relationships or new publications) to a number of others users of the media storage/publishing/communications system 140 whom they want to communicate with. Herein, the term "connection" may refer to any other user of the media storage/publishing/communications system 140 with whom a user has formed a connection, association, or relationship via the media storage/publishing/communications system 140.

In particular embodiments, the media storage/publishing/communications system 140 may be capable of linking a variety of entities. As an example, and not by way of limitation, the media storage/publishing/communications system 140 may enable users to interact with each other as well as to receive content from other third-party systems 140 or other entities, or to allows users to interact with these entities through an application programming interface (API) or other communication channels.

In particular embodiments, the media storage/publishing/communications system 140 may also include user-generated content objects, which may enhance a user's interactions with the media storage/publishing/communications system 140. User-generated content may include chat a user can have with one or more other users, or anything a user can add, upload, send, or "post" to the media storage/publishing/communications system 140. As an example and not by way of limitation, a user communicates posts to the media storage/publishing/communications system 140 from a client system 101. Posts may include data such as news articles, files or other textual data, photos, videos, links, podcasts, audio or other similar data or media. Content may also be added to the media storage/publishing/communications system 140 by a third-party through a "communication channel," such as a newsfeed or stream.

In particular embodiments, the Media Storage/Publishing/Communications system 140 may include a variety of servers, sub-systems, programs, modules, logs, and data stores. In particular embodiments, the Media Storage/Publishing/Communications system 140 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The Media Storage/Publishing/Communications system 140 may also include suitable components such as network interfaces, security mechanisms, load balancers, failover servers, management-and-network-operations consoles, other suitable components, or any suitable combination thereof. In particular embodiments, the Media Storage/

Publishing/Communications system 140 may include one or more profile stores for storing user and/or author profiles. A profile may include, for example, biographic information, demographic information, behavioral information, social information, or other types of descriptive information, such as work experience, educational history, preferences, interests, affinities, or location. Interest information may include interests related to one or more categories. Categories may be general or specific. As an example and not by way of limitation, if a user "likes" or "uploads" an article about financial news the category may be the company, sector, or general category of "finance" or "news." A connection store may be used for storing connection information about users and authors. The connection information may indicate users or authors who have similar or common work experience, group memberships, interests, educational history, or are in any way related or share common attributes. The connection information may also include user-defined connections between different users/authors and content (both internal and external). A web server may be used for linking the Media Storage/Publishing/Communications system 140 to one or more client systems 101, or one or more other Media Storage/Publishing/Communications systems 140 via a network 150. The web server may include a mail server or other messaging functionality for receiving and routing messages between the Media Storage/Publishing/Communications system 140 and one or more client systems 101. An API-request server may allow, for example, an AI informatics system 140 or another third-party media storage/publishing/communications system 140 to access information from another Media Storage/Publishing/Communications system 140 by calling one or more APIs. An action logger may be used to receive communications from a web server about a user's actions on or off the Media Storage/Publishing/Communications system 140. A notification controller may provide information regarding content objects to a client system 101. Information may be pushed to a client system 130 as notifications or files, or information may be pulled from a client system 101 responsive to a user input comprising a user request received from a client system 101. Authorization servers may be used to enforce one or more privacy settings of the users of the Media Storage/Publishing/Communications system 140. A privacy setting of a user may determine how particular information associated with a user can be shared. The authorization server may allow users to opt in to or opt out of having their actions logged by the Media Storage/Publishing/Communications system 140 or shared with other systems such as another Media Storage/Publishing/Communications system 140, such as, for example, by setting appropriate privacy settings. Third-party-content-object stores may be used to store content objects received from third parties, such as a third-party Media Storage/Publishing/Communications system 140. Location stores may be used for storing location information received from client systems 101 associated with users and/or authors.

In FIG. 1, the AI informatics system 120, the optional 3$^{rd}$ party AI system(s) 130 and the 3$^{rd}$ party media/communication system(s) 140 may each be implemented using one or more computing hardware resources that execute a plurality of lines of computer code/instructions so that one or more processors are configured to perform each operation/processes of each of the systems 120, 130 and 140 as described elsewhere. The one or more computing hardware resources, for each system 120-140, may be various cloud computing resources such as provided by Amazon web services (AWS) or Microsoft Azure, a server computer, an application server, a database server, a blade server and/or cloud computing processing resources and the like and the implementation of each system 120-140 is not limited to any particular configuration of the one or more cloud computing resources.

1. AI Informatics Processing

Figure 2A:
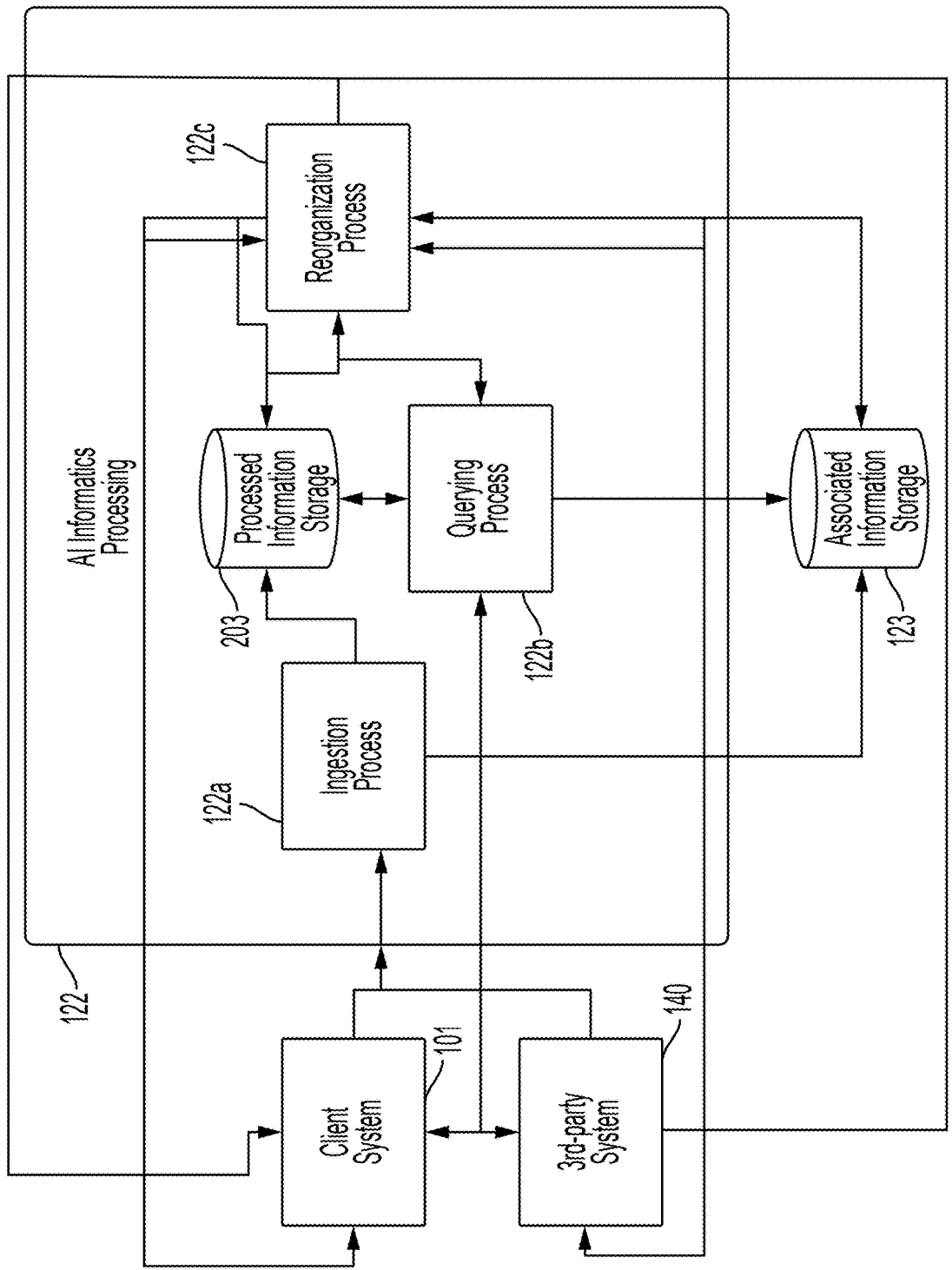
FIG. 2a illustrates a high-level process flow diagram of more details of the AI informatics processing 122 that may be performed using various systems such as the system shown in FIG. 1.

FIG. 2a illustrates a high-level process flow diagram of AI Informatics Processing 122. The processes and operation shown in FIG. 2A (that may include each/some/all of the novel processes shown in Table 2 above) may be implemented using the system with the architecture in FIG. 1 in which those processes are performed by a back end system remote from the client system. However, the processes and operation shown in FIG. 2A (that may include each/some/all of the novel processes shown in Table 2 above) also may be implemented in a system in which a combination of the client system 101 and backend system elements (120-140 collectively) perform the various processes disclosed below. In some embodiments, it may be possible that the processes for a particular use case may be entirely performed by the client system 101. Thus, in the disclosed system, the novel process or one or more processes may be performed using various hardware components.

In particular embodiments of AI Informatics Processing 122, a client system 101 and/or 3rd-party systems 140 feeds one or more pieces of content into an ingestion process 122a. In one embodiment, each piece of content may be called a "document" wherein the document in this disclosure may be a video file, an audio file, a text file or a file with a combination of any of the above types of content. This ingestion process 122a breaks down the documents, annotates them, and stores them in processed information storage 203 and associated information storage 123. In particular embodiments, a client system 101 and/or 3rd party systems 140 also may send queries to a querying process 122b which access the information in processed information storage 203 and associated information storage 123 and then process that information using querying process 122b to generate a response before sending that response back to either client system 101 or 3rd-party systems 140 or both. In particular embodiments, a client system 101 or 3rd-party systems 140 or both may configure or initiate manual, semi-automatic, or automatically reorganization processes 122c, which may fetch data from processed information storage 203 and/or associated information storage 123 along with making queries of querying process 122b in order to create new information which may then be stored in processed information storage 203 and/or associated information storage 123. Reorganization process 122c may then send that information back out to either a client system 101 or 3rd-party systems 140 or both. These processes are discussed in more detail below with respect to the DRAG and DROP processes.

In one example but not by way of limitation, a client system 101 and/or 3rd-party systems 140 may automate the generation of new training data for LLMs or other generative AI processes by sending the initial training corpus to the ingestion process 122a. This ingestion process 122a breaks down the documents within the initial training corpus into outlines and knowledge graphs and stores them in processed information storage 203 and associated information storage 123. The reorganization process 122c may generate new documents (optionally using querying process 122b) and sends the new documents back to client system 101 and/or 3rd-party systems 140 to add to the training corpus.

In another example but not by way of limitation, a client system 101 and/or 3rd-party systems 140 may automate the testing, refactoring, and translation of code from one language to another by sending the initial code base and documentation to the ingestion process 122a. This ingestion process 122a breaks down the documents within the initial code base and documentation into language-dependent and/or language-independent outlines and knowledge graphs and stores them in processed information storage 203 and associated information storage 123. The reorganization process 122c may generate new documents such as automated tests, refactored code files, new documentation, and/or a new code base translated into a new language (optionally using querying process 122b) and sends them back to client system 101 and/or 3rd-party systems 140.

In another example but not by way of limitation, a client system 101 and/or 3rd-party systems 140 may automate the generation of new training data for LLMs or other generative AI processes by sending the initial training corpus to the ingestion process 122a. This ingestion process 122a breaks down the documents within the initial training corpus into outlines and knowledge graphs and stores them in processed information storage 203 and associated information storage 123. The reorganization process 122c may generate new documents (optionally using querying process 122b) and sends the new documents back to client system 101 and/or 3rd-party systems 140 to add to the training corpus.

In another example but not by way of limitation, a client system 101 and/or 3rd-party systems 140 may automate the generation of new educational material by sending an educational text corpus of all of the desired information for a student or students to learn to the ingestion process 122a. This ingestion process 122a breaks down the documents within the educational material into outlines and knowledge graphs and stores them in processed information storage 203 and associated information storage 123. The reorganization process 122c may generate new documents (optionally using querying process 122b, and either self-guided or guided by configurations from a client system 101 and/or 3rd-party systems 140) and sends the new documents back to client system 101 and/or 3rd-party systems 140 for educational use.

In another example but not by way of limitation, a client system 101 and/or 3rd-party systems 140 may automate the generation of compacted outlines or documents for the purpose of increasing the rate of information processing and comprehension by individuals or to reduce tokens to fit within limits required by an AI process by sending the initial documents to the ingestion process 122a. This ingestion process 122a breaks down the documents within the compacted outlines or documents into outlines and knowledge graphs and stores them in processed information storage 203 and associated information storage 123. The reorganization process 122c may generate new condensed versions of the old documents along with outlines of the original documents (optionally using querying process 122b) and sends the new condensed versions of the old documents with outlines back to client system 101 and/or 3rd-party systems 140.

In another example but not by way of limitation, a client system 101 and/or 3rd-party systems 140 may automate the detection of novel information within a document or documents by sending these documents in which novelty is to be detected along with a control corpus of documents whose information is not to be considered novel to the ingestion process 122a. This ingestion process 122a breaks down the documents outlines and knowledge graphs and stores them in processed information storage 203 and associated information storage 123 after first doing this for the control corpus. The degree of new entries added to the knowledge graph determines the degree of novelty of the documents in question, which can be determined by using the querying process 122b and sends the answers back to client system 101 and/or 3rd-party systems 140.

In another example but not by way of limitation, a client system 101 and/or 3rd-party systems 140 may automate the validation of blueprints, contracts, and other documents against legal regulations or client specifications by sending the documents alongside a legal or client specification corpus to the ingestion process 122a. This ingestion process 122a breaks down the documents into outlines and knowledge graphs and stores them in processed information storage 203 and associated information storage 123. The reorganization process 122c may generate new documents that contain the validation status of each aspect of the blueprints, contracts, or other documents with the help of querying process 122b and sends those new documents back to client system 101 and/or 3rd-party systems 140.

In another example but not by way of limitation, a client system 101 and/or 3rd-party systems 140 may automate the outlining and facilitate the querying of live meetings, conversations, audio notes, and podcasts by sending them in a streaming or batched fashion to the ingestion process 122a. This ingestion process 122a breaks down the documents into outlines and knowledge graphs and stores them in processed information storage 203 and associated information storage 123. The reorganization process 122c may generate outlines in the original order and reorganized topically (optionally using querying process 122b to answer user questions) and sends those outlines back to client system 101 and/or 3rd-party systems 140.

In another example but not by way of limitation, a client system 101 and/or 3rd-party systems 140 may automate the generation of background review articles and sections for papers and grants by sending the relevant corpus to the ingestion process 122a. This ingestion process 122a breaks down the documents within the initial corpus into outlines and knowledge graphs and stores them in processed information storage 203 and associated information storage 123. The reorganization process 122c may generate new documents (optionally using querying process 122b) and sends the new documents back to client system 101 and/or 3rd-party systems 140 to add to the training corpus.

In another example but not by way of limitation, a client system 101 and/or 3rd-party systems 140 may automate the generation of news review articles or entire papers and track misinformation and disinformation by sending articles and related documents to the ingestion process 122a. This ingestion process 122a breaks down the articles and documents within the initial corpus into outlines and knowledge graphs and stores them in processed information storage 203 and associated information storage 123. The reorganization process 122c may generate new documents that describe the way the story or stories have unfolded over time and/or are described by various papers or using the querying process 122b determines the original source of particular claims and sends the new documents, etc. back to client system 101 and/or 3rd-party systems 140.

In another example but not by way of limitation, a client system 101 and/or 3rd-party systems 140 may generate accurate simulations for education, entertainment, and/or commercial use by sending an initial training corpus to the ingestion process 122a. This ingestion process 122a breaks down the documents within the initial corpus into outlines and knowledge graphs and stores them in processed information storage 203 and associated information storage 123. The client system 101 and/or 3rd-party systems 140 may use the querying process 122b to answer questions about next possible outcomes in the simulation given the current state and send the next possible outcomes back to client system 101 and/or 3rd-party systems 140 for use in generating the next outcome within the simulation.

In another example but not by way of limitation, the client system 101 and/or 3rd-party systems 140 may automate the validation of citation and reference integrity and check for plagiarism by sending the appropriate documents and/or a corpus to check against to the ingestion process 122*a*. This ingestion process 122*a* breaks down the documents into outlines and knowledge graphs and stores them in processed information storage 203 and associated information storage 123. Using querying process 122*b* and reorganization process 122*c*, the system may determine whether the cited facts match the contents of the reference documents and sends them back to client system 101 and/or 3rd-party systems 140 where that information can be either used directly or used to prune the citation graph or disqualify particular articles and remove them from the knowledge graph stored by processed information storage 203 and associated information storage 123.

In all of the above examples, the benefits of using this AI processing system shown in FIG. 2*a* over typical LLMs include minimization of hallucinations, the ability to create, validate, and/or process documents and corpuses that are vastly larger than the size of the context window, and query or condense information across multiple documents and reorganize that information in any combination of user-specified and/or automated manner taking into account a corpus of documents that is much larger than the LLMs' context window sizes.

2. AI Informatics System

Figures 1, 2B:
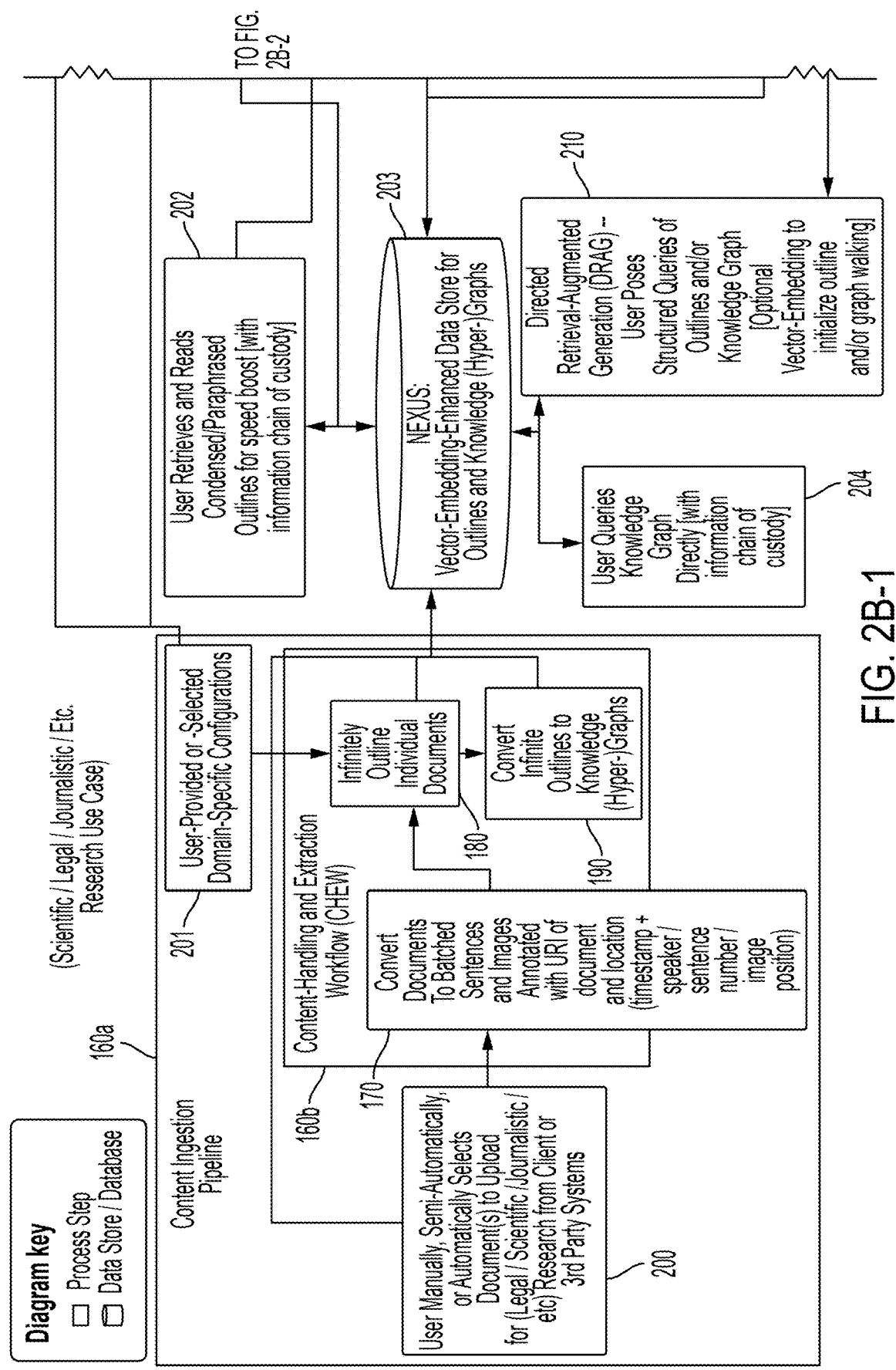
FIG. 2b illustrates an example process flow diagram of a particular embodiment of the research use case for the AI informatics processing.
Figures 2, 2B:
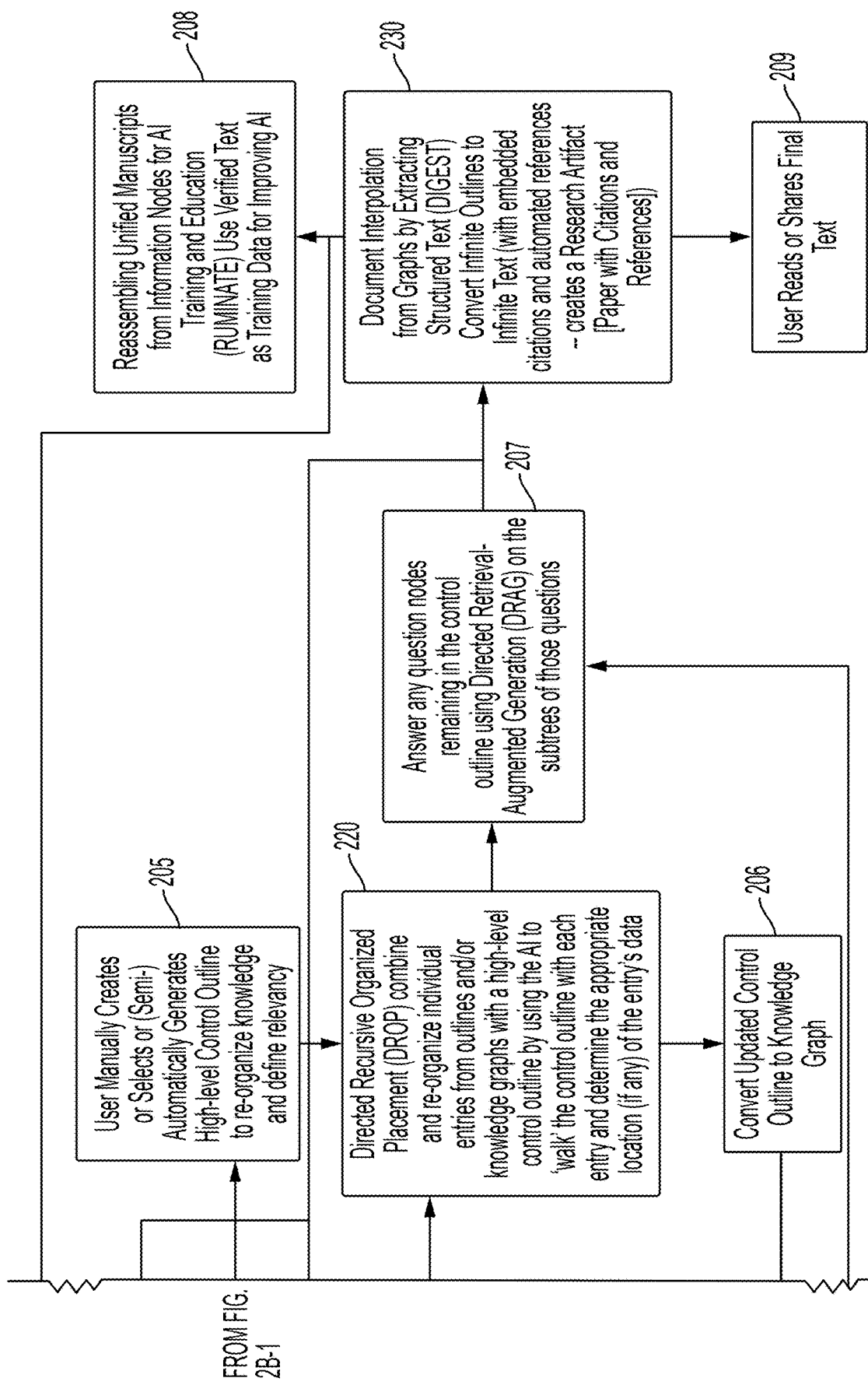

FIG. 2*b* illustrates an example process workflow diagram of a particular embodiment of the research use case that may be performed using the system and methods in FIGS. 1 and 2*a*, but also may be implemented in other manners. Note that a simple example of the data for these processes is shown in FIG. 17. The various novel processes noticeable improve the usual, known AI process is that much larger sized data can be handled. Each of the methods/workflow and/or AI models in FIG. 2*b* discussed below, may be implemented in various manners. For example, each method/workflow may be a plurality of lines of computer code/instructions executed by a processor that is configured to perform the operations of the method/workflow/AI model described below. Alternatively, each method/workflow/AI model may be a module that may be hardware or software that perform the operations of the method/workflow/AI model described below. Still further, each method/workflow/AI model may be performed on a separate computer system and application programming interfaces (APIs) may be used to access the operation(s) of each each method/workflow/AI model.

Also note that the method processes in FIG. 2*b* may be performed for other use cases (the processes in FIG. 2*b* are not only limited to the research use case) but the content/document may be different. The research use case may include a method of selecting content objects 200 (hereafter each content object to be referred to as a document as defined above), a method of configuring the system dependent on the domain and document types 201, a content-handling and extraction workflow ("CHEW") 160*b*, a process for retrieving and displaying infinite outlines that have been condensed or paraphrased 202 by users of client system 101, a data store Nexus with optional vector-embedding enhancements for infinite outlines and infinite knowledge (hyper-)graphs 203 and a process of querying the Nexus data store 203 using a graph-querying language 204. The method may further include a process of querying the Nexus data store 203 using (optionally structured) natural language to be henceforth referred to as Directed Retrieval-Augmented Generation ("DRAG") 210, a process of generating and inputting manually or (semi-)automatically a high-level "control outline' 205 to reorganize the knowledge contained in the Nexus Data Store 203, a method for combining and re-organizing information from the Nexus Data Store 203 with a control outline that uses a combination of AI and algorithmic processes (shown and described in FIG. 17 and in the below disclosures for the DROP and DRAG processes) to "walk" the control outline with each entry to determine the appropriate location (if any) of the entry's data to be henceforth referred to as Directed Recursive Organizing Placement ("DROP") 220.

The processes may further include a method for converting the outline created by DROP 220 into an infinite knowledge graph 206, a method for answering specially questions within the infinite outline resulting from DROP 220 with data organized using DROP 220 beneath those questions in the infinite outline that resulted using DRAG on the subtrees of those questions 207 and a process for converting infinite outlines to infinite text (with embedded citations and automated references) to be henceforth referred to as Document Interpolation from Graphs by Extracting Structured Text ("DIGEST") 230. The processes in FIG. 2*b* may further include a process for the user of client system 101 to read and/or share the final resulting text 209 and a process of feeding back the verified texts resulting from DIGEST 230 to be henceforth referred to as Reassembling Unified Manuscripts from Information Nodes for AI Training and Education ("RUMINATE") 208. Although this document contemplates a particular embodiment encompassing all of the above steps, this disclosure contemplates any suitable arrangement of two or more of the above steps being used.

The following is an example but not by way of limitation demonstrating content ingestion pipeline 160*a* discussed with elements shown in FIGS. 1 and 2*b*. A user at client system 101 may interact with the process illustrated in FIG. 2*b* to accelerate and partially automate the research pipeline. Using a web browser 102, a user of client system 101 may select, add, or upload one or more documents for inclusion in the Nexus Data Store 203 that will be the source for their research activities. These documents may be stored in any combination of the client system 101, any number of third-party media storage/publishing/communications systems 140, and processed on any combination of the client system 101, the AI Informatics System 120, and any number of third-party AI systems 130, with the documents and results communicated via the network 150. A research activity (such as legal discovery form a corpus of documents, creating a scientific review article from source articles, or providing a historical account of a news story from a selection of news articles, etc.) may optionally require document-type-specific or domain-specific configurations 201 provided by a user through the client system 101. These documents selected from 200 and the configurations 201 are then combined and transferred via network 150 to process the documents using the content-handling and extraction workflow (CHEW) 160*b*. First the user-selected documents 200 are processed into a set of batched sentences and images 170. These batched sentences and images are then combined with user-specified configurations and the configurations 201 to infinitely outline individual documents 180. These outlines and the batched sentences and images 170 they came from are stored in the Nexus Data Store 203, which optionally vector-embeds each entry and sub-tree, and also feeds into a process for converting infinite outlines to knowledge (hyper-)graphs 190 which are also transferred via network 150 into the Nexus Data Store 203 after optionally vector-embedding every entry in the knowledge (hyper-)graph. This yields a nexus data store 203 which contains every tagged sentence in the original documents in-context, the infinite outlines resulting from those documents, and the infinite knowledge (hyper-)graphs resulting from those outlines, all of which has every single entry pointing back to the exact sentence(s) in the originating document(s). In a particular embodiment these may be retrieved and read 202 by the user of client system 101 on, for example but not by way of limitation, a rendering device 107 such as a tablet computer. In another example, but not by way of limitation, the user may use a companion device 108 such as a desktop computer to directly query the knowledge graph 190 and/or create a structured outline of queries to DRAG the requested answers 210 and render them on a rendering device such as an AR/VR headset 107. In another example but not by way of limitation, they may publish the retrieved infinite outlines 202 on a third-party media storage/publishing/communications system 140 using network 150. In another example but not by way of limitation, the documents to be processed may be live chats from audio streams from several third-party media storage/publishing/communications systems 140, transferred via network 150 to the AI informatics system 120 for processing, which may itself using network 150 to run several of the steps on a third-party AI system 130, which then stores the live intermediate results in the nexus data store 203 before transferring live-updated outlines of the conversations back to the third-party media storage/publishing/communications systems 140 via network 150 to the same currently-running chats that provided the audio and/or video and/or text chat streams in the first place, which are then streamed via network 150 back to client systems 101 for display within the media storage/publishing/communications application (s) 102. In another example but not by way of limitation the user creates a control outline 205 using client system 101 and uses a knowledge-graph of all of their previously read documents from the Nexus Data Store 203 to re-organize the relevant knowledge using DROP, discarding any knowledge that is not relevant to their control outline. This control outline may include questions which do not have direct answers in Nexus Data Store 203, but instead require synthesizing answers with DRAG 207 using subsets of the data determined by DROP 220. This new information may then be converted to an infinite knowledge graph via 206 and then stored back in the Nexus Data Store 203.

In particular embodiments, the user of client system 101 is aiming to publish new content to one or more third-party media storage/publishing/communications systems 140. The user may select condensed/paraphrased outlines 202 from nexus data store 203 and feed them into the DIGEST process step 230. This step then sends via network 150 the individual sub-component AI requests to be described later to any combination of local AI Process Model(s) 104 that the user of client system 101 has specifically trained for writing, third-party AI systems 130, and AI Informatics Processing System 120 as specified in the user-provided configuration 201. In an example not by way of limitation the resulting DIGEST text 220 is then sent via network 150 to media storage/publishing/communications system 140, where it is published. In another example, not by way of limitation, the resulting DIGEST text 220 is sent via network 150 to the client system 101 to train local AI processing model(s) 104 or and/or sold and sent to a third-party AI system 130 for training their model(s).

3. Content-Handling and Extraction Workflow (CHEW)

Figure 3A:
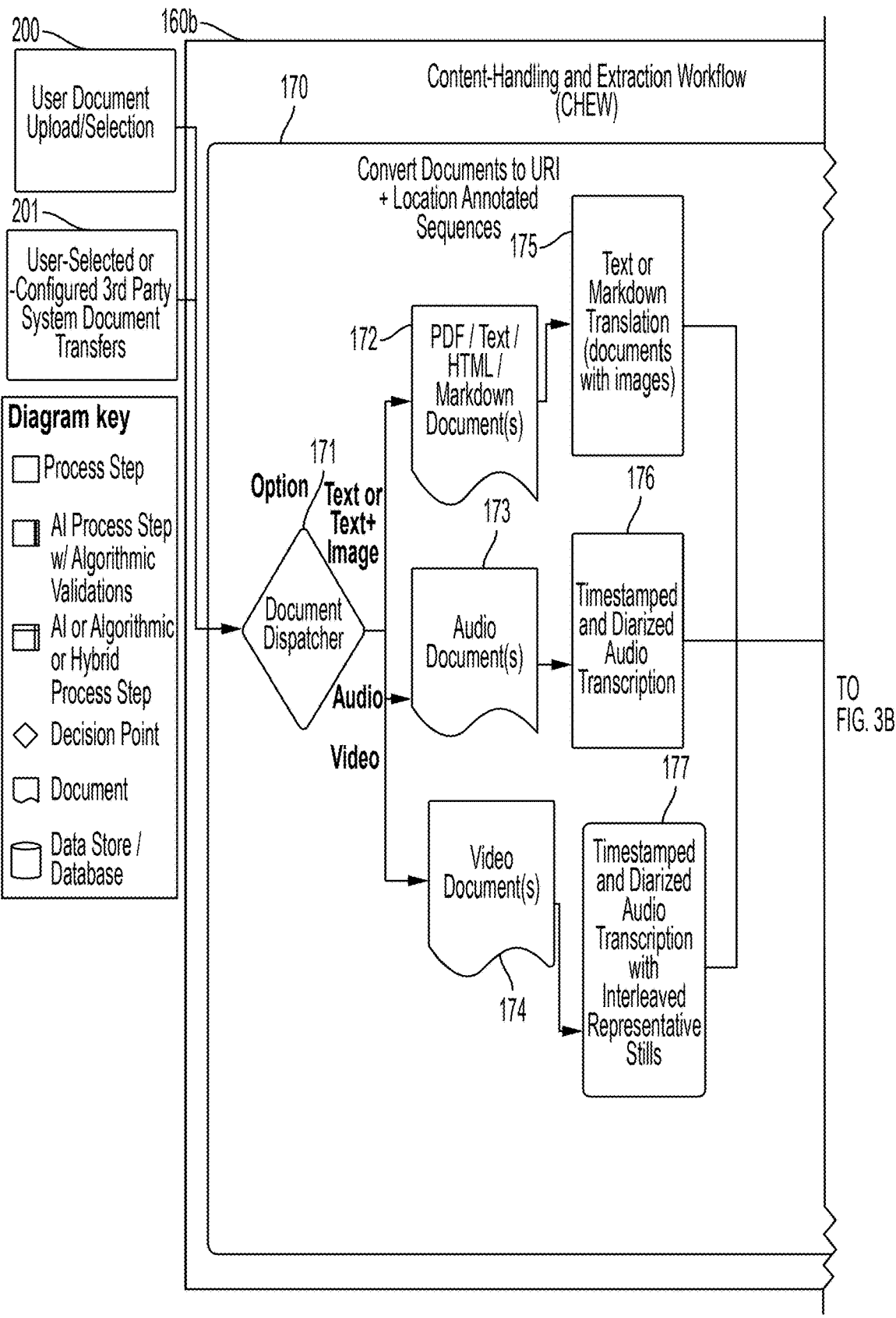
FIG. 3 illustrates a detailed process flow diagram for processing documents of various types into infinite outlines and knowledge graphs (CHEW) that is part of the AI informatics processing.
Figure 3B:
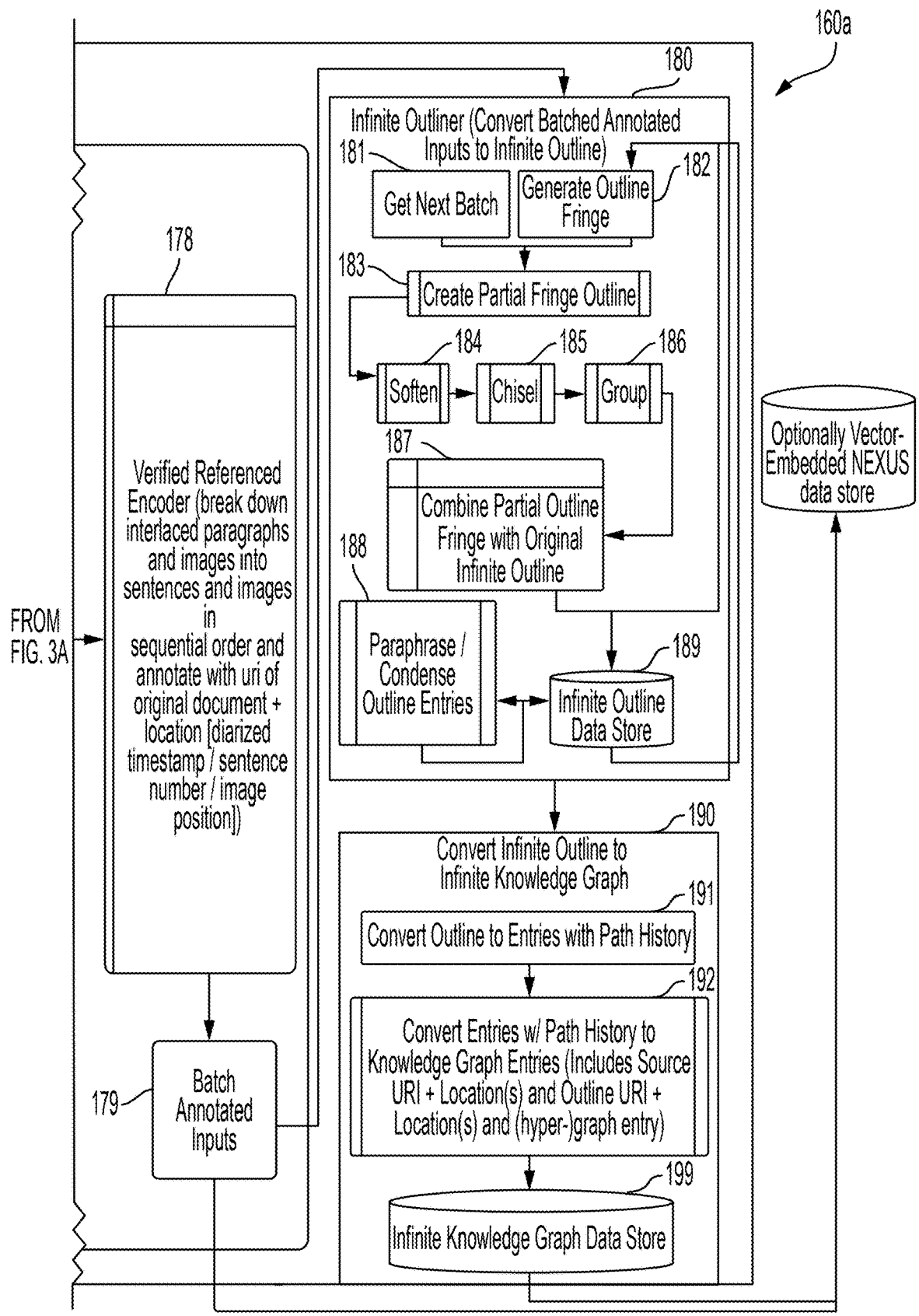

FIG. 3 illustrates particular embodiments of a Content Ingestion Pipeline 160a and the CHEW process for converting documents into infinite outlines and knowledge graphs that contain dramatically reduce or eliminate hallucinations, can handle documents that are much larger than the context window of an AI system such as an LLM or multi-model generative AI, and allow for citations and references down to the level of the individual sentence(s) in the document(s) from which the information originated.

In particular embodiments of the content ingestion pipeline 160a, the user of a client system 101 has uploaded, as an example but not by way of limitation, a PDF document for content-handling and extraction 160b. A document dispatcher 171 determines the document type (PDF, text, audio, video, etc.) and dispatches the document to a handler process that is specific to each document type and each handler process may convert the particular document type into text and other files that may be used by the system. For example, for a document with a PDF/text/HTML type, that document is sent to a PDF/Text/HTML/Markdown Document handler 172. The PDF/Text/HTML/Markdown Document handler 172 converts the document to text or optionally markdown 175 to keep the images with the text. In another example but not by way of limitation, the user has uploaded an audio file 200 or has configured their audio chats to stream an audio file from a third-party media storage/publishing/communications system 201. This audio file is passed through the document dispatcher 171, which determines that it is an audio document handler 173 and passes it to a speech-to-text system to be timestamped and optionally diarized into a streaming audio transcription 176. In yet another example, the user has configured a third-party media storage/publishing/communications system 201 to upload each new CSPAN video as each is made and each video may be sent to the document dispatcher 171, which determines that it is a video file 174 and sends it to a service that provides an audio transcription that is timestamped and optionally diarized and interleaves this transcription with representative stills from the video. In any of these examples, the resulting text+images generated for each document type are then passed to a Verified Referenced Encoder 178, which is a hybrid programmatic and AI process. The Verified Referenced Encoder 178 may break down resulting text and/or images into a machine-readable format (such as but not limited to JSON, YAML, XML, or any other suitable representation) of a list of sentences and images annotated with the uniform resource identifier (uri) of the original document plus the location in the document that each sentence came from (the sentence/image number) plus, in the case of the images, the text of what is in the image as determined by an known AI process. The machine readable format data for each input document may be batched into groups of annotated sentenced 179 such that each batch, when combined with any of the prompts in an infinite outliner 180 along with the partial outline fringe 183, will both not exceed half of the prompt context window and not exceed 85% of the maximum length of the AI model's output. These batches are then fed into the infinite outliner 180, where it is processed a batch at a time. Until each batch is processed by the infinite outliner 180 conversion process until all of the batches are processed, it will get the next batch 181 and generate an outline fringe 182 of the outline so far, which is an outline which only contains the final entry of the outline so far and every parent required to reach that entry. Initially, this will be an empty outline. Next, it will combine these two outlines using an AI process to create a partial outline fringe 183 which are described in more detail below.

As an example but not by way of limitation, any AI process may henceforth may be executed by sending the inputs combined with the prompt via network 150 or directly without network 150 to one or more of a 3rd-party AI system 130, an AI Informatics System 120, or local AI model(s) 104 for processing on any device within a client system 101. Any AI process may also be understood to optionally verify the output and retain any verified input/output pairs for further training and refinement of any of these AI models, and to dispatch to one or more of the other models upon failure to verify for any of the given models. These models may then directly without network 150 or via network 150 send their responses back to the AI Informatics System 120 or AI Informatics Application 106 for use in the next step of the process.

In this example, having created the partial fringe outline 183, the infinite outliner 180 may then pass the partial outline to the AI process soften 184, in which outline entries which contain more than one piece of information and are not leaves in the outline will transformed into an entry with a single piece of information, and one or more leaf children (entries with no children) to the left of any pre-existing children such that when flattened the original order of the information is maintained. The resulting outline may then be passed to the AI process chisel 185, which takes a partial outline with leaf entries which have more than one piece of information in them and converts those entries into subtrees where each entry has only a single piece of information and such that the original ordering of information is maintained if the sub-tree is flattened. The resulting outline may then be optionally passed to the AI process group 186, which takes every entry with more than the maximum branching factor of children 201 and inserts grouping nodes whose entry is a summary of the entire contents of the group beneath it, and whose children, the number of which does not exceed a maximum branching factor. The maximum branching factor of the infinite outline (as form of a tree) is a highest number of children entries/nodes in the outline and may be known as a a degree of the node/entry. A higher branching factor results in a more computationally complex AI mode. The value of the maximum branching factor may be determined by the context window in various embodiments of the system disclosed herein.

The resulting partial outline fringe is then combined via AI process with the original infinite-outline-so-far 187 and stored in an infinite outline data store 189. An outline fringe 172 is then generated from this new infinite outline-so-far and the next batch 181 is processed with it in a loop until all batches are processed, at which point the complete outline from the infinite outline data store 189 is converted into a data structure and walked so that every entry may be paraphrased and/or condensed. This condensed outline is also stored in the infinite outline data store, and then both are sent either directly without network 150 or via network 150 to the nexus data store 203, where they are optionally vector-embedded for each entry and each sub-tree.

In particular embodiments, these outlines may also be sent to convert the infinite outlines generated by the infinite outliner 180 to convert the infinite outlines to infinite knowledge graphs 190. This first takes the outline and, for every entry in the outline, converts to entries with path history 191, which is the entry along with every parent required in sequence to traverse to that entry. This allows for context to be taken into account during the knowledge graph entry-generation process 192. As an example but not by way of limitation, an article on the history of the United States may discuss a number of events that happened in the year 1776. Thus, contextual information such as the location of the event and the year 1776 may end up as parents within the path history of an entry such as the signature of the Declaration of Independence. This allows for nuanced and complex hyper-graphs to be generated and stored in the infinite knowledge graph data store 199 even when each entry only has a single piece of information within it, without needing to heavily duplicate the information required to fully enter each entry.

As shown in FIG. 3, the entries with the generated path history may be converted into: 1) knowledge graph entries (including source URI and location(s) and outline URI and location(s) and (hyper-) graph entry. For example, knowing that the context of a fact is within a particular period of time and place (due to the context provided by a higher level of the outline). When the entire knowledge graph is built from all of the entries in the infinite outline(s) being processed, it may then be sent to the nexus data store 203 for optional vector-embedding and storage for later retrieval and analysis.

The main benefits of CHEWing using the VRE are to systematically trace and tag the origins of every piece of knowledge that makes its way into the system and/or is used by the system to answer queries and produce further documents. This results is an improvement to known AI systems.

4. Directed Recursive Organizing Placement (of Information) (DROP)

Figure 4A:
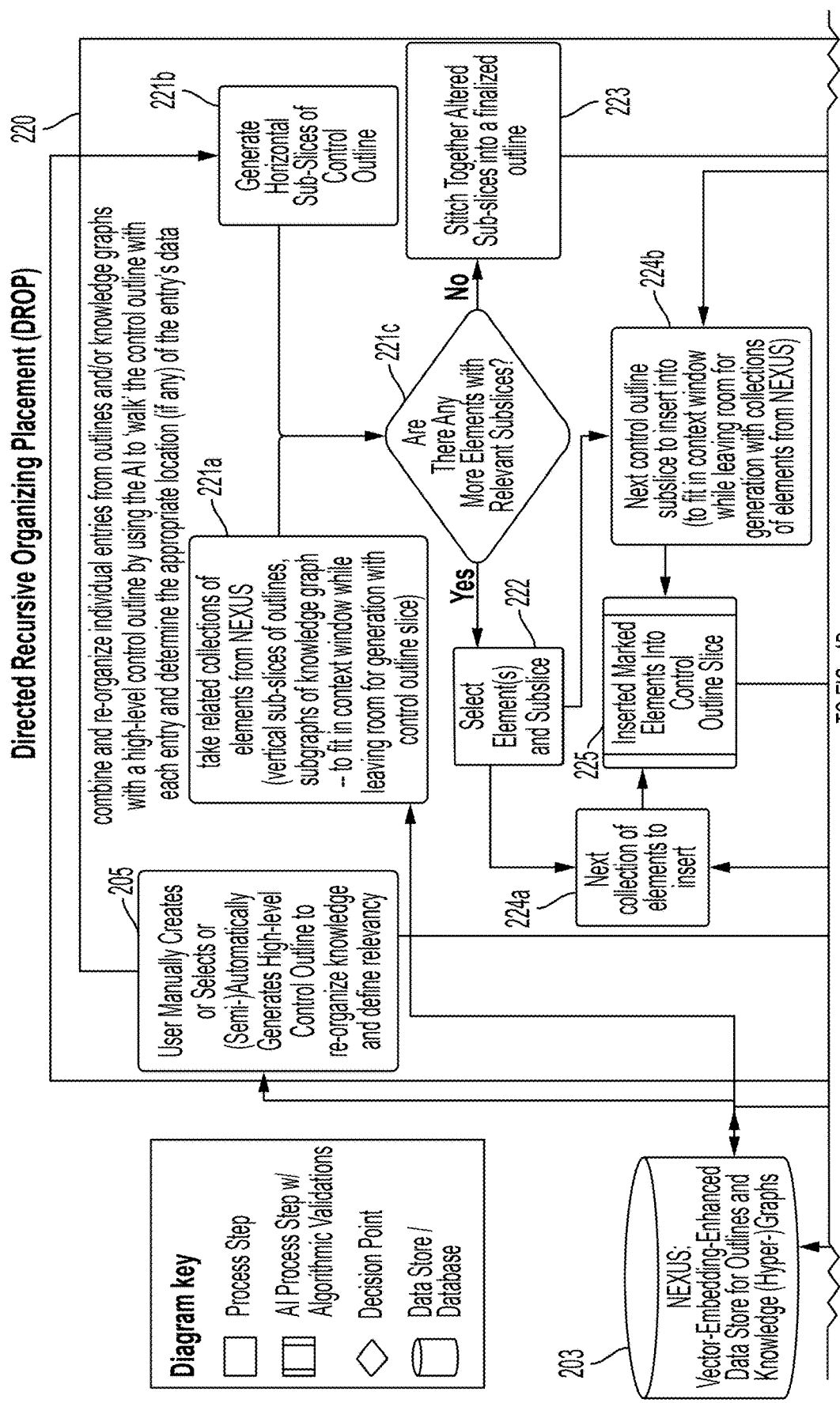
FIG. 4 illustrates a detailed process flow diagram for reorganizing the contents of one or more infinite outlines or knowledge graphs into a single infinite outline or knowledge graph using a control outline (DROP) that is part of the AI informatics processing.
Figure 4B:
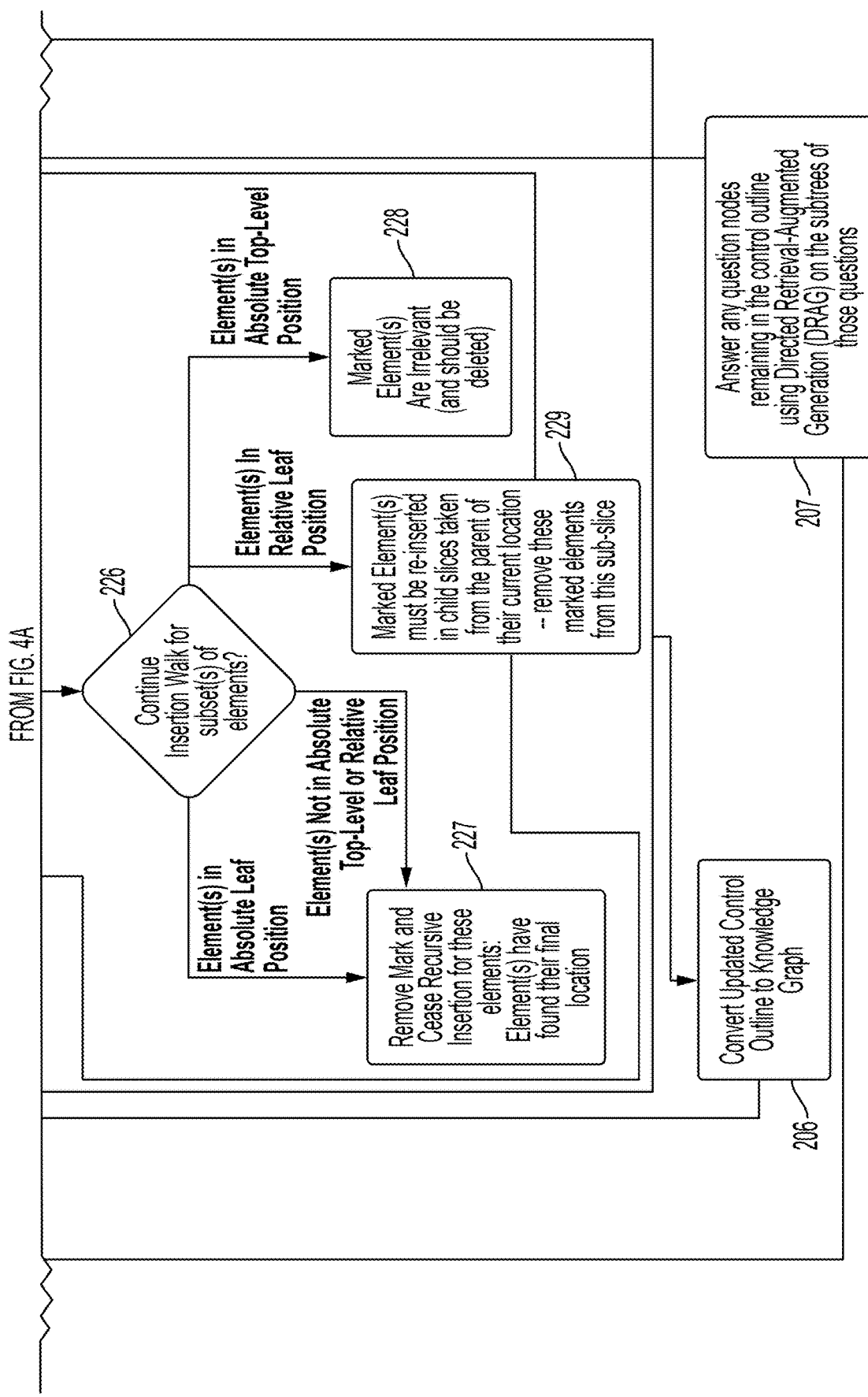

FIG. 4 illustrates a detailed process flow diagram for reorganizing the contents of one or more infinite outlines and/or knowledge graphs into a single infinite outline or knowledge graph using a control outline (DROP). In particular embodiments, one or more documents of one or more types has been processed by the content ingestion pipeline 160*a* into infinite outlines and knowledge graphs and stored within the nexus data store 203. In one example but not by way of limitation, the user is only interested in a subset of this information, and manually creates a high-level control outline that categorizes the information that is relevant 205 to user of client system 101 and sends it via network 150 to the AI Informatics System 120. In another example but not by way of limitation the user wishes to generate a review article that contains all of information within the articles that have been processed by the content ingestion pipeline 160*a* into the nexus data store 203, which has been previously configured 201 to automatically generate a high-level control outline via an AI process 205. In yet another example but not by way of limitation, the user has retrieved and skimmed the outlines of the articles 202 on a client system 101 that were processed by the content ingestion pipeline 160*a*, and then removed several of the top-level entries of the automatically generated control outline and added a number of questions that were not directly answered individually by any of the articles in ingested by the pipeline 160*a*. In all of these examples, the resulting control outline is then input into the directed recursive organizing placement (DROP) process 220, which is a process that combines and re-organizes individual entries from the outlines and/or knowledge graphs 221*a* from the nexus data store 203 by using a hybrid AI process to 'walk' the control outline with each entry in the infinite outlines and knowledge graphs and determine the appropriate location to DROP (if any) the information contained in the entry. The DROP process maintains the source tags that allow for precise citation and reference 220 by generating horizontal sub-slices of the control outline 221*b*. As long as there are more elements with relevant sub-slices 221*c*, it will select the elements and subslice 222 and pass the next collection of elements to insert 224*a* and the next control sub-slice to insert into 224*b* to an AI process to insert the elements into the control outline slice 225. These inserted elements will be tagged within that slice, and it will be determined for each inserted element whether to continue the insertion walk, leave the element in place and remove the mark, or remove the element entirely as irrelevant 226. If the element is in an absolute leaf position, meaning that it is now a leaf within the slice, and there are no children of the parent element within the larger control outline (there are no sub-slices that can begin with the parent), then it will remove the mark and cease recursive insertion for this element has found its final location 227. If the element is at the absolute top-level position (this is the top-most slice of the control outline which includes the root element and the element is inserted as a sibling of the root) then the marked element is irrelevant and should be discarded 228. If the element is in relative leaf position (it is a leaf within the current slice, but the parent of this new leaf itself has children within the original control outline), then the marked element must be re-inserted into the subslice rooted at the parent of this marked element after removing it from the current sub-slice 229. This element is placed in the next collection of elements to insert 224*a*, and the new sub-slice rooted in its current parent becomes the next control outline subslice to insert into 224*b*, and the process continues. Once there are no more elements with relevant subslices 221*c*, the altered sub-slices are stitched together into a penultimate outline 223. Then, any tagged question nodes are answered via DRAG on the subtrees of data associated with that question node 207 and the finalized outline is then inserted into the nexus data store 203 after optionally vector-embedding each entry and sub-tree. This outline may also be converted into a knowledge graph 206 via the same process described by step 290 before being inserted into the nexus data store 203.

The main benefits of this approach are to allow systematically tagged and verified data to be organized at a scale greatly in excess of the capacity of the LLM into an answer or novel document that can programmatically be verified to lack hallucinations and that may also be much larger than the context window of the LLM itself.

5. Directed Retrieval-Augmented Generation (DRAG)

Figure 5A:
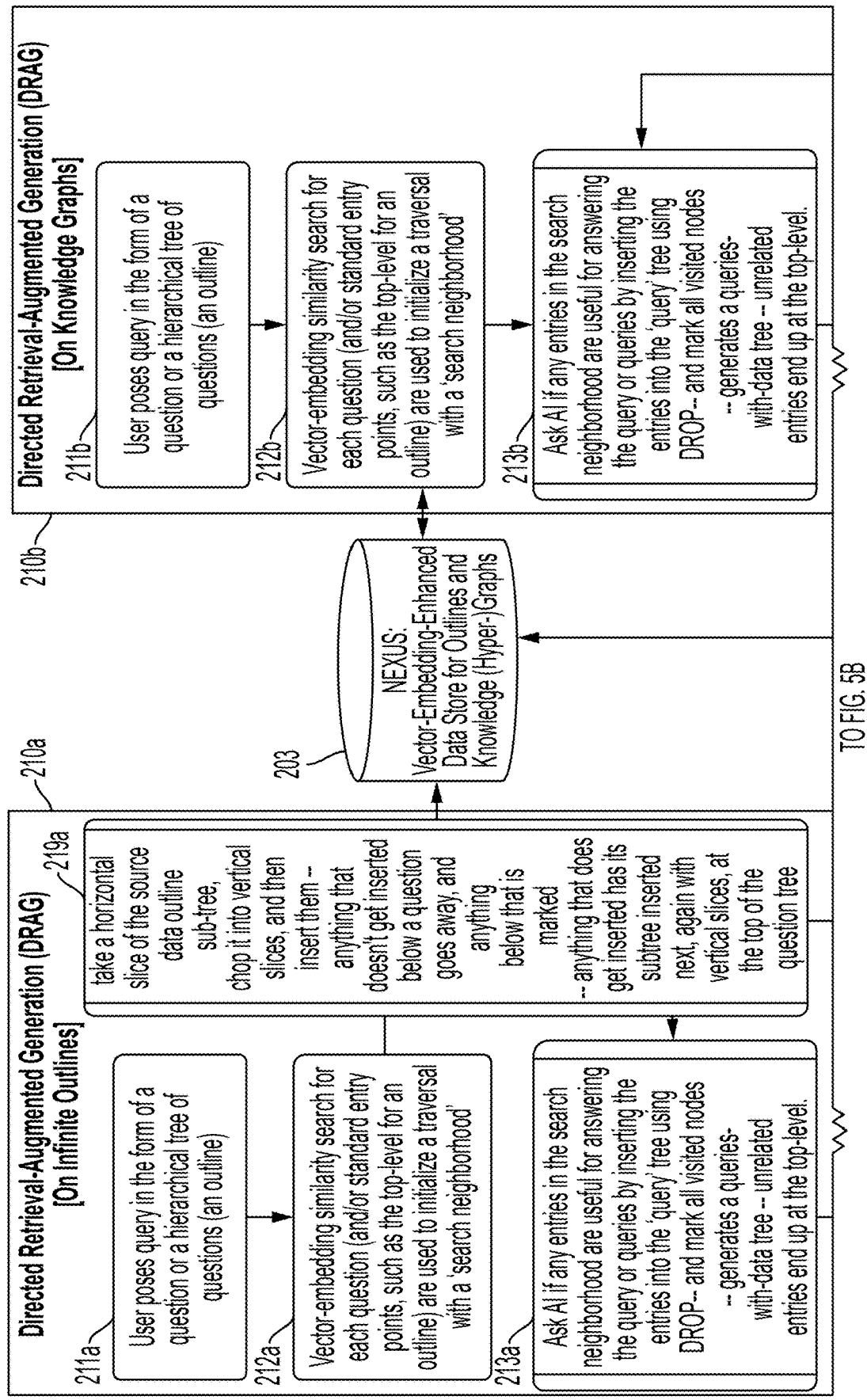
FIG. 5 illustrates a detailed process flow diagram for answering a query or queries using the infinite outlines and knowledge graphs created by the processes described in FIGS. 3 and/or 4 (DRAG) that is part of the AI informatics processing.
Figure 5B:
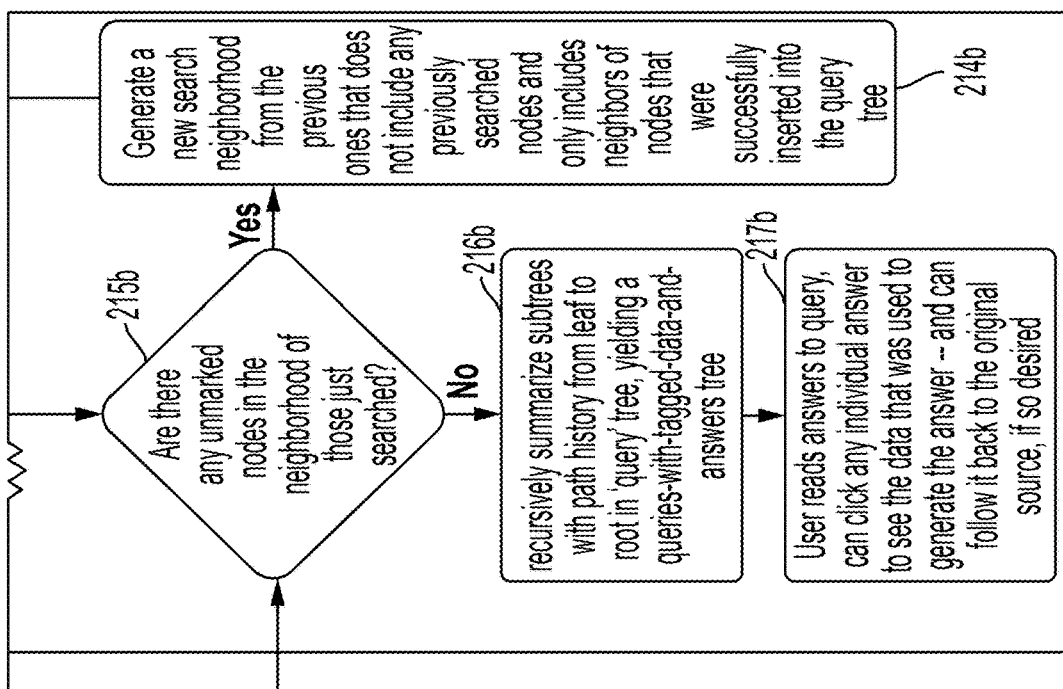
Figure 5B:
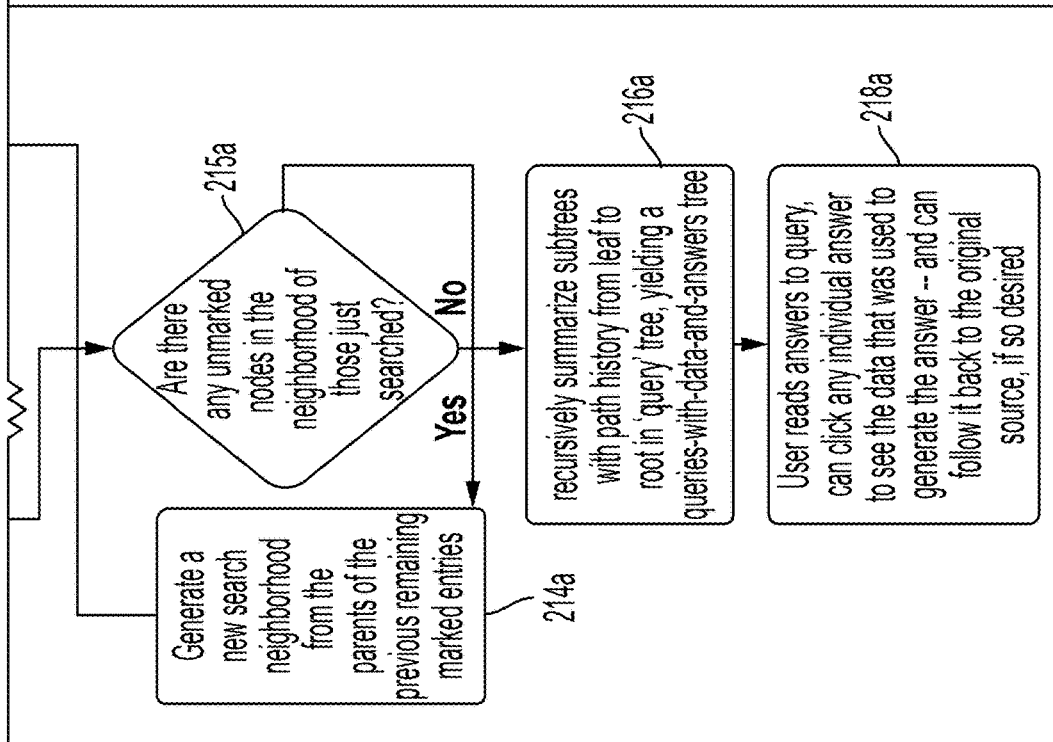

FIG. 5 illustrates a detailed process flow diagram for answering a query or queries using the infinite outlines and knowledge graphs created by the processes described in FIGS. 3 and/or 4 (DRAG). As shown in FIG. 5, DRAG may have a DRAG process for infinite outlines and a separate DRAG process for knowledge graphs and those processes stores their results in the NEXUS store 203. In particular embodiments, the user poses a query in the form of a question or a hierarchical tree of questions (an outline) 221*a* or 221*b*. In one example but not by way of limitation, the source data are infinite outlines, and vector-embedding similarity search for each question (and/or standard entry points such as the top-level for each outline) are used to initialize a traversal with a search neighborhood 212*a*. Take a horizontal slice of the source data outline sub-tree, chop it into vertical slices, and then insert them Using a hybrid AI process—anything that doesn't get inserted below a question goes away, and anything below that is marked—anything that does get inserted has its subtree inserted next, again with vertical slices, at the top of the question tree 219*a*. Then ask the AI if any entries in the search neighborhood are useful for answering the query or queries by inserting the entries into the 'query' tree using DROP—and mark all visited nodes—generates a queries-with-data tree—unrelated entries end up at the top-level. 213*a*.

The method may determine if there any unmarked nodes in the neighborhood of those just searched 215*a*? If there are unmarked nodes, the method may generate a new search neighborhood from the parents of the previous remaining marked entries 214*a*, feed them into the sub-slice process 219*a*, and continue the iteration. If there are not any unmarked nodes in the neighborhood, the process may recursively summarize subtrees with path history from leaf to root in 'query' tree, yielding a queries-with-tagged-data-and-answers tree 216*a*. This is sent via network 150 to the AI Informatics Application 106 on client system 101 The user then reads answers to query, can click any individual answer to see the data that was used to generate the answer—and can follow it back to the original source, if so desired 218*a*.

In another example but not by way of limitation, the user is performing DRAG on infinite knowledge graphs 210*b*. The User poses query in the form of a question or a hierarchical tree of questions (an outline) 211*b*. A Vector-embedding similarity search for each question (and/or standard entry points, such as the top-level for an outline) is used to initialize a traversal with a 'search neighborhood' 212*b*. The method may then ask the AI process being used by the user if any entries in the search neighborhood are useful for answering the query or queries by inserting the entries into the 'query' tree using DROP—and mark all visited nodes—generates a queries-with-data tree—unrelated entries end up at the top-level 213*b*. Like above, the process may determine if there are unmarked nodes in the neighborhood of those just searched 215*b*? If there are unmarked nodes, the process may generate a new search neighborhood from the previous ones that does not include any previously searched nodes and only includes neighbors of nodes that were successfully inserted into the query tree 214*b*. The newly generated search neighborhood may be passed to the AI process 213*b* iteratively until there are no longer any unmarked nodes in the neighborhood of those just searched 215*b*. The process may then recursively summarize subtrees with path history from leaf to root in 'query' tree, yielding a queries-with-tagged-data-and-answers tree 216*b*. This is sent via network 150 to the AI Informatics Application 106 on client system 101 The user then reads answers to query, can click any individual answer to see the data that was used to generate the answer—and can follow it back to the original source, if so desired 217*b*. The main benefits of this approach are to use the full power of the LLM at every step of the question-answering process to systematically search the space of verified data to produce answers without losing semantic understanding due to the dimensionality reduction of vector-embedding techniques, all while maintaining coherence and validity and avoiding hallucination in a programmatically verifiable way by maintaining the chain of custody of information throughout.

6. Document Interpolation from Graphs by Extraction of Text (DIGEST)

Figure 6:
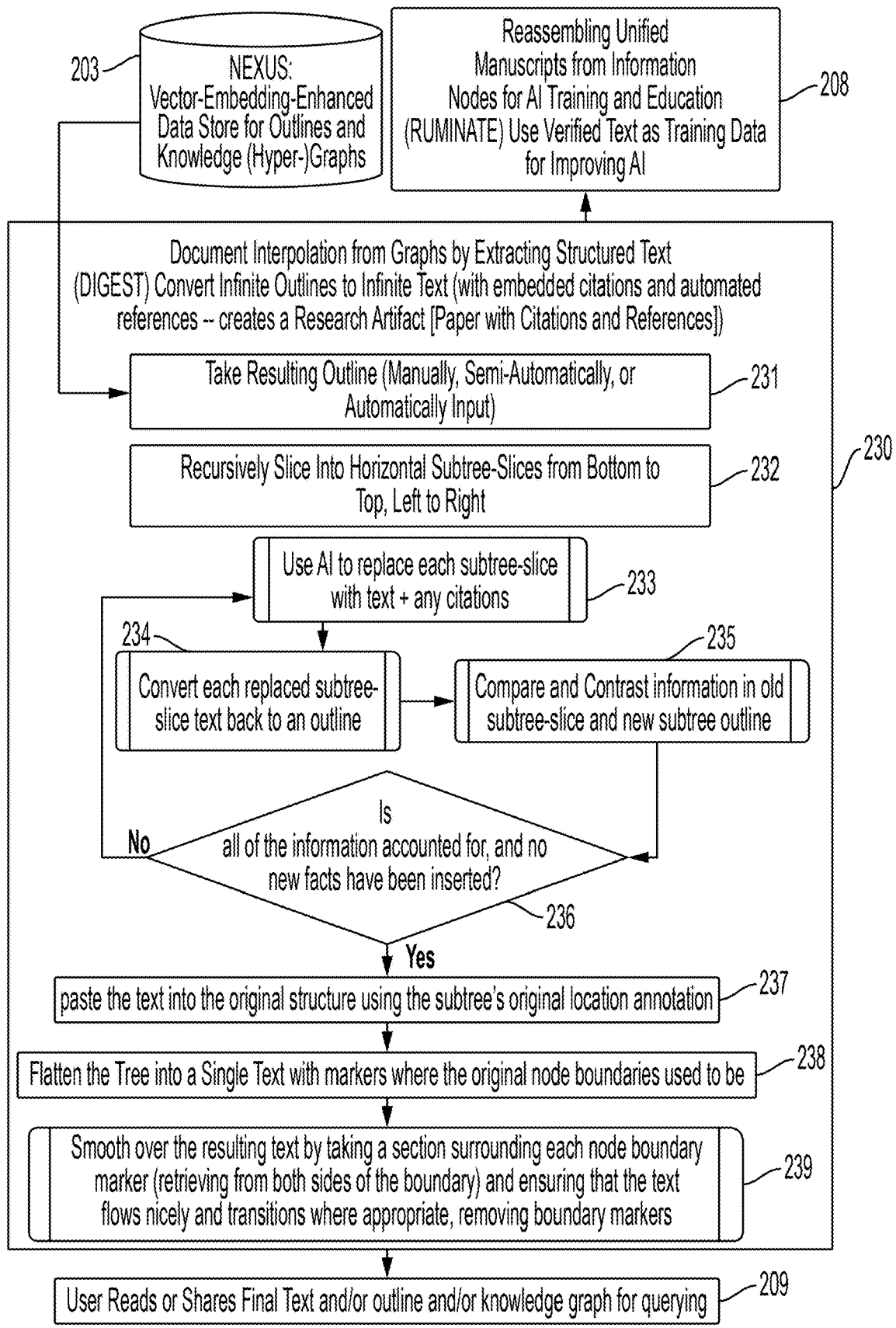
FIG. 6 illustrates a detailed process flow diagram for generating new documents from the information contained in one or more infinite outlines and knowledge graphs (DIGEST) that is part of the AI informatics processing.

FIG. 6 illustrates a detailed process flow diagram for generating new documents from the information contained in one or more infinite outlines and/or knowledge graphs (DIGEST). In particular embodiments, a generated outline contained in the Nexus Data Store 203 is selected 231 for conversion into a full text document. The outline is recursively sliced into horizontal subtree-slices 232 which are then converted by an unique AI process into text with citations and an adjacent references list 233. Each text thus resulting is then converted back into an outline 234 where the information contained within is compared and contrasted with the subtree-slice that was the source of the text newly outlined 235. If not all of the information is accounted for and/or new facts have been inserted 236, the process loops back 233. Otherwise, if all of the information is accounted for and no new facts have been inserted 236, then it pastes the text into the original structure using the subtree's origin location annotation 237. The final tree of texts+references is then flattened into a single text with markers where the original node boundaries used to be and an accompanying reference list 238. The text with node markers is then smoothed over by taking a section surrounding each node boundary marker (retrieving from both sides of the boundary) and using an AI process to ensure that the text flows nicely and transitions where appropriate while removing the boundary markers 239. In particular embodiments, the user may read, share, and/or publish the resulting text.

As an example and not by way of limitation, the final text generated by DIGEST process 230 may be published as a review article of a scientific field or news story aggregated from multiple papers or sources 209. In another example, the results of the DIGEST process 230 may be included as the Background Review section of a grant proposal 209. In another example but not by way of limitation, the results of the DIGEST process 230 may be the shared synthesis of the results of a legal discovery process 209. In another example but not by way of limitation, the text may be synthetic data—reassembled unified manuscripts from information nodes for AI training and education (RUMINATE) used to extend the data-set for improving an AI from an initial corpus 208.

7. Verified Referenced Encoder (VRE)

Figure 7:
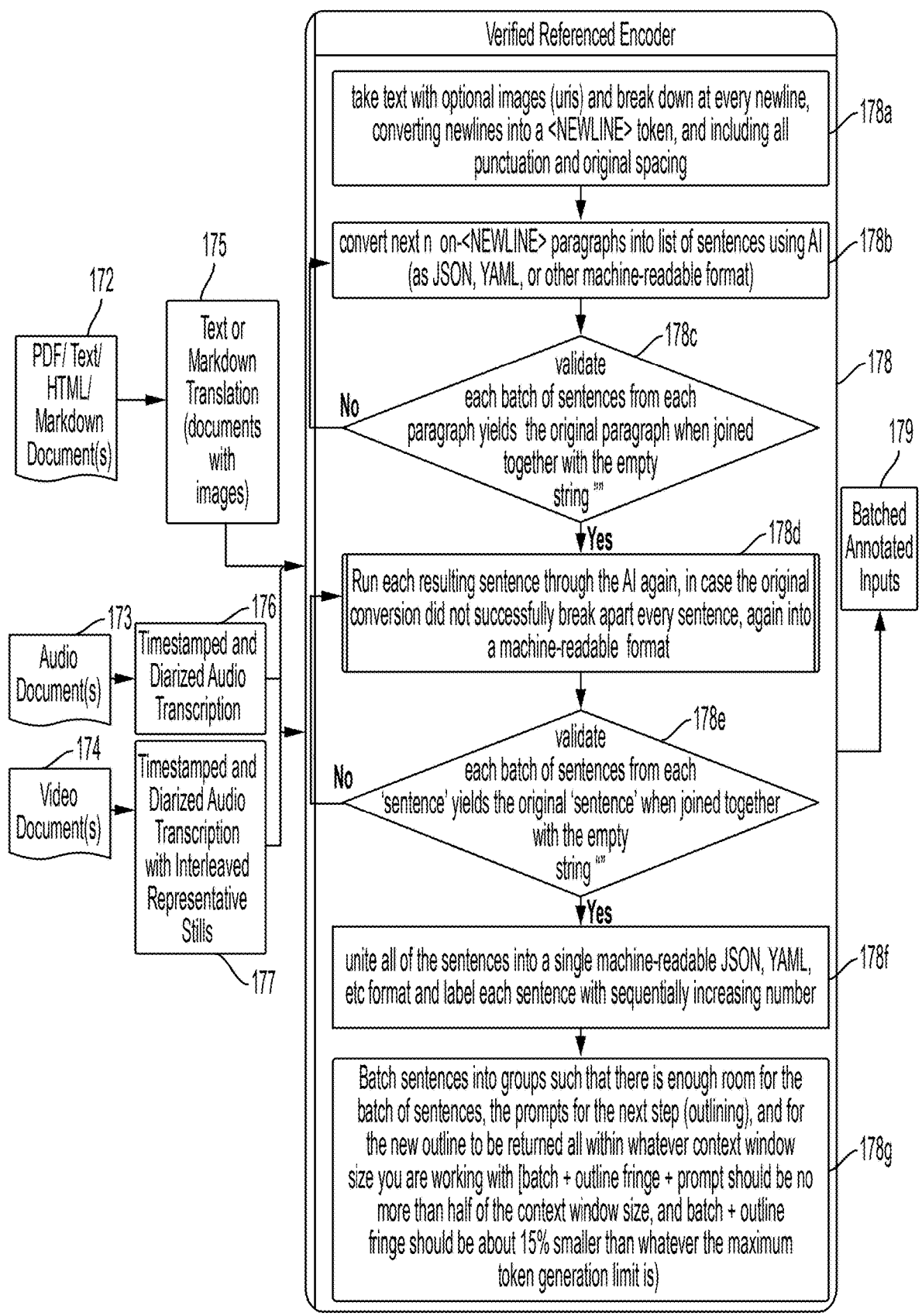
FIG. 7 illustrates a detailed process flow diagram for converting a document into a sequence of cited, referenceable sentences in machine-readable format useful for producing infinite outlines and knowledge graphs in a manner such that every piece of information can be linked back to its original source(s) without hallucination (The Verified Referenced Encoder, or VRE) that is part of the AI informatics processing.

FIG. 7 illustrates a detailed process flow diagram for converting a document (such as PDF/Text/HTML/Markdown 172, Audio 173, or Video 174) into a sequence of cited and referenceable sentences in machine-readable format useful for producing infinite outlines and knowledge graphs in a manner such that every piece of information can be linked back to its original source(s) without hallucination (The Verified Referenced Encoder, or VRE) 178. The VRE process 178 thus reduces hallucinations that may otherwise occur in AI and LLMs.

In one example but not by way of limitation, a video 174 has been processed into its timestamped and diarized audio transcription with interlaced representation stills 177 and passed to the verified referenced encoder 178. In another example but no by way of limitation, an audio document 173 has been processed into timestamped and diarized audio transcription 176 and passed to the verified referenced encoder 178. In another example but not by way of limitation, a PDF/Text/HTML/Markdown document 173 has been processed into raw text or markdown with image URIs 175 and passed to the verified referenced encoder 178. In particular embodiments, the verified referenced encoder 178 takes any of these texts with optional images (URIs) and breaks it down at every newline, converting remaining newlines into <NEWLINE> tokens, and including all punctuation and original spacing 178a. The VRE process 178 then converts each next non-<NEWLINE> paragraphs into a list of sentences using unique AI described above or elsewhere. The process may convert the data into various well known data formats, for example but not by way of limitation, JSON, YAML, or other machine-readable format) 178b.

The VRE process 178 then validates that each batch of sentences from each paragraph yields the original paragraph when joined together with the empty string " " 178c. If the validation fails, the VRE process 178 re-attempts the conversion 178b. If validation 178c passes, then it runs each resulting 'sentence' through the AI again, in case the original conversion did not successfully break apart every sentence into actual sentences, again into a machine-readable format 178d. The VRE process 178 then validates that each batch of sentences from each 'sentence' yields the original 'sentence' when joined together with the empty string " " 178e. If the validation fails, the process 178 re-runs that 'sentence' back through the sentence-splitting AI process 178d. If the process validates that the original 'sentence' is produced 178e, then it unites all of the sentences into a single machine-readable JSON, YAML, etc. format and labels each sentence with sequentially increasing numbers 178f. Finally, the VRE process 187 batches sentences into groups such that there is enough room for the batch of sentences and the prompts for the next step (outlining) and for the new outline to be returned all within whatever context window size you are working with such that the batch+outline fringe+prompt should be no more than half of the context window size and the batch+outline fringe should be about 15% smaller than whatever the maximum token generation limit is 178g. The result of the process are batched annotated inputs 179.

8. Infinite Outlines and Knowledge (Hyper-) Graphs

Figure 8A:
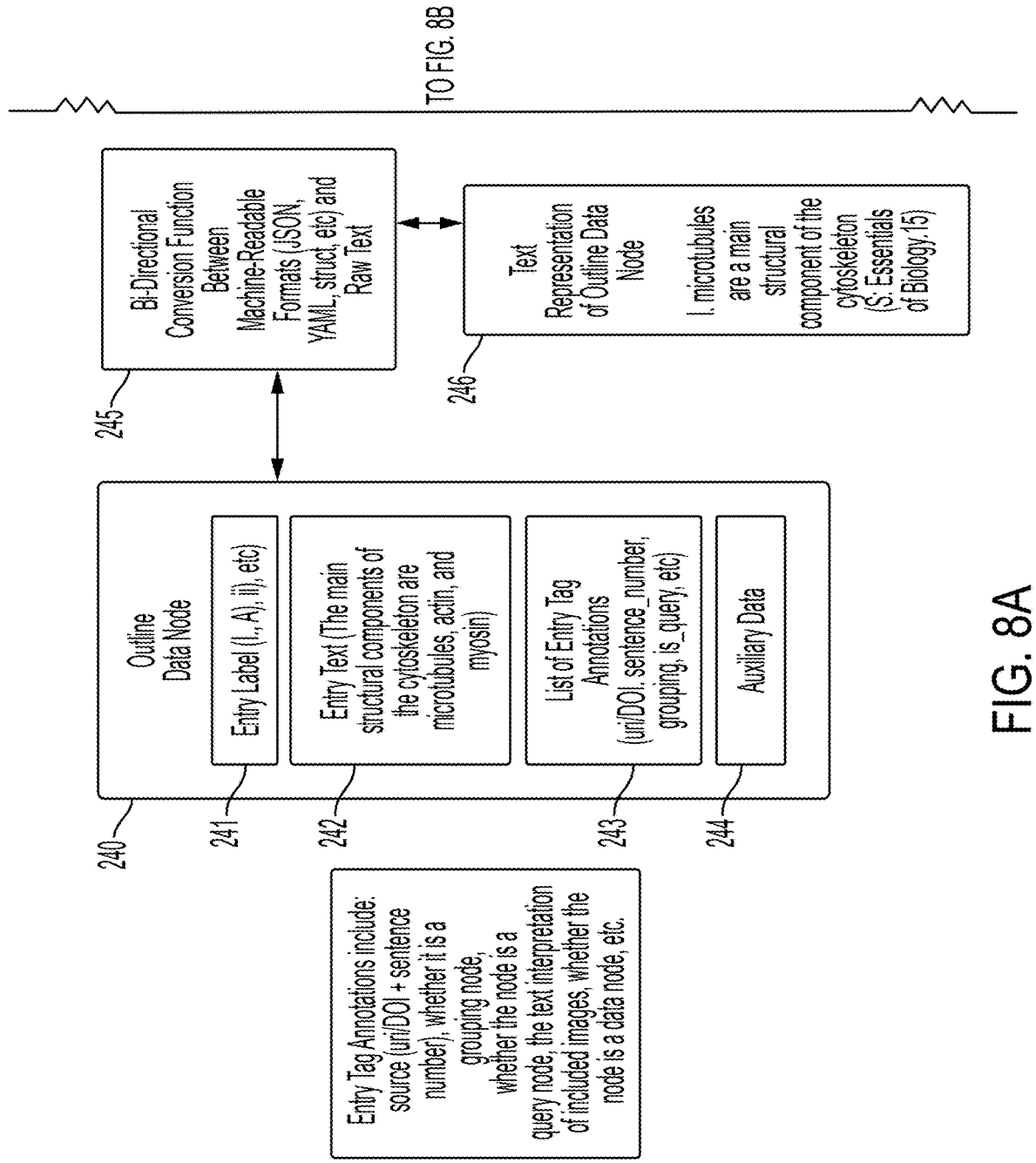
FIG. 8 is a block diagram illustrating a particular embodiment of the infinite outline data structure, the structure of an individual node, and its bi-directional conversion to and from raw text.
Figure 8B:
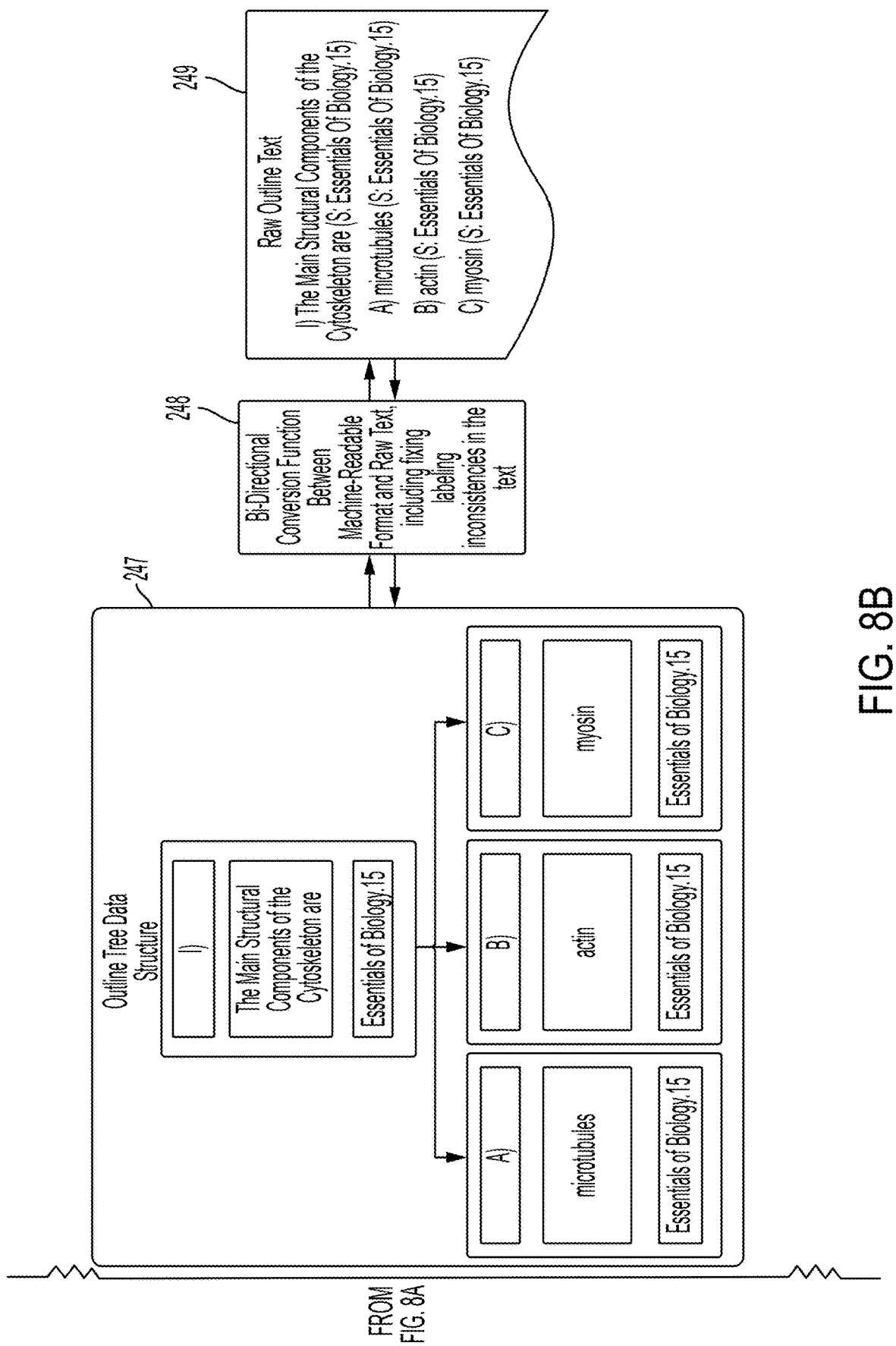

FIG. 8 is a block diagram illustrating a particular embodiment of the infinite outline data structure, the structure of an individual node, and its bi-directional conversion to and from raw text. In particular embodiments an outline data node 240 is composed of an entry label 241, entry text 242, a list of entry tag annotations (such as URI/DOI.sentence_number, grouping, whether it is_query, etc) 243 and any auxiliary data 244. These nodes may be processed by a bi-directional conversion function between machine-readable formats (such as JSON, YAML, struct, etc) and raw text 245 into a text representation of the outline data node 246 and back again.

In particular embodiments, the outline data structure itself may a structured collection of such nodes (such as a list, a tree, a directed acyclic graph, or a network graph) 247. This outline data structure may be processed by a bi-directional conversion function between machine-readable format and raw text that fixes any inconsistencies in the labeling of the text 248 using bi-directional conversion function 245 into the raw outline text 249. As an example but not by way of limitation, a tree-shaped outline in JSON format 247 may be processed by a bi-directional conversion function 248 into a text outline 249. In another example but not by way of limitation, a directed acyclic graph in JSON format 247 may be processed by a bi-directional conversion function 248 into a text outline 249.

9. Vertical Sub-Slicing

Figure 9A:
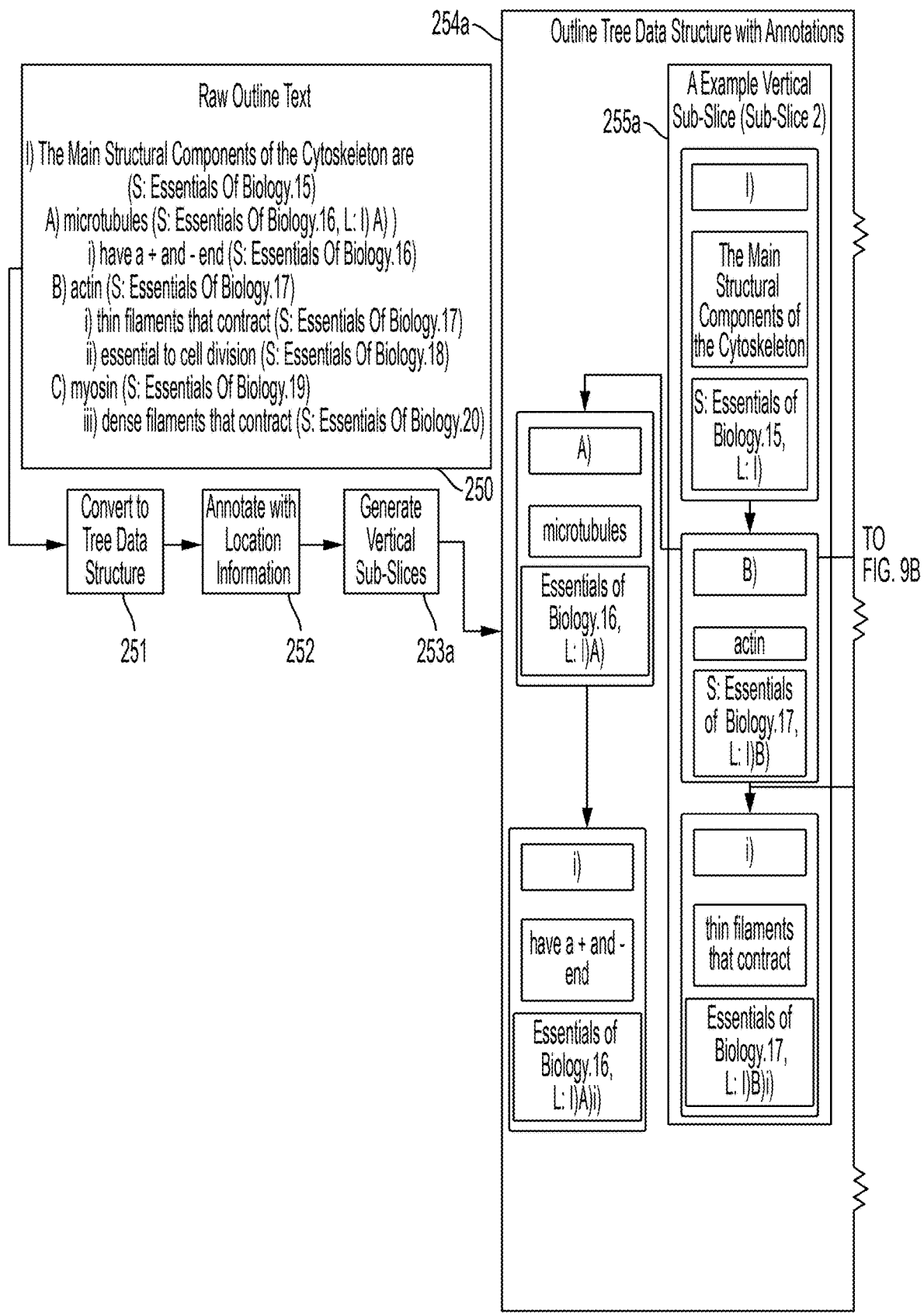
FIG. 9 is a block diagram illustrating the nature and process of converting a raw text outline into a data structure, vertically slicing it, and converting it back to text.
Figure 9B:
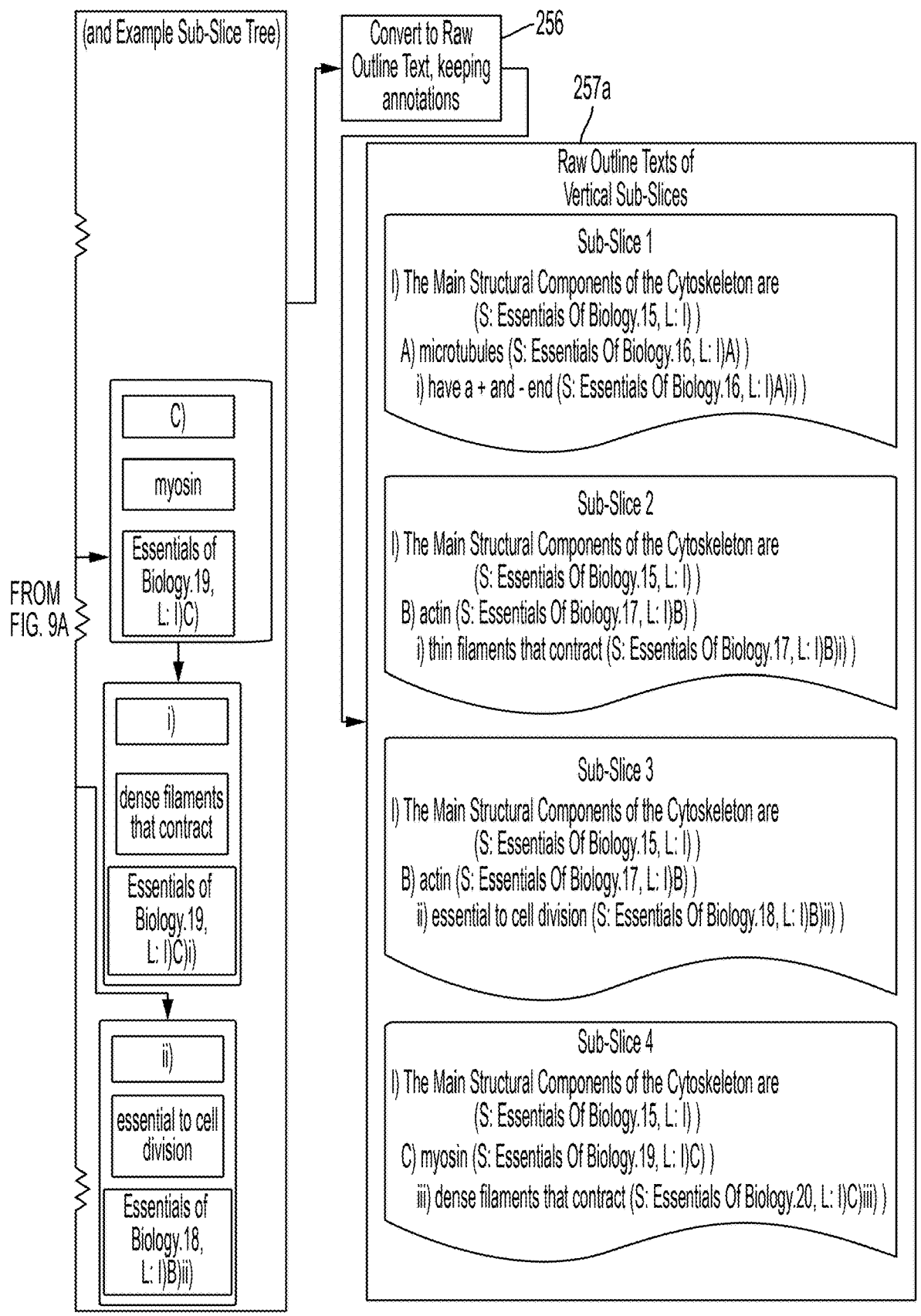

FIG. 9 is a block diagram illustrating the nature and process of converting a raw text outline into a data structure, vertically slicing it, and converting it back to text. In particular embodiments, raw outline text 250 is converted into a tree data structure 251, annotated with location information 252, and then sliced vertically into sub-slices 253a such that every sub-slice contains the full path from one or more leaf-nodes to the root note 254a. These slices may then be converted in a fashion that maintains annotations 256 into raw outline texts 257a. In one example but not by way of limitation, generating vertical sub-slices 253a is done in a left-to-right manner. In another example but not by way of limitation, generating vertical sub-slices 253*a* is done in a right-to-left manner.

10. Horizontal Sub-Slicing

Figure 10A:
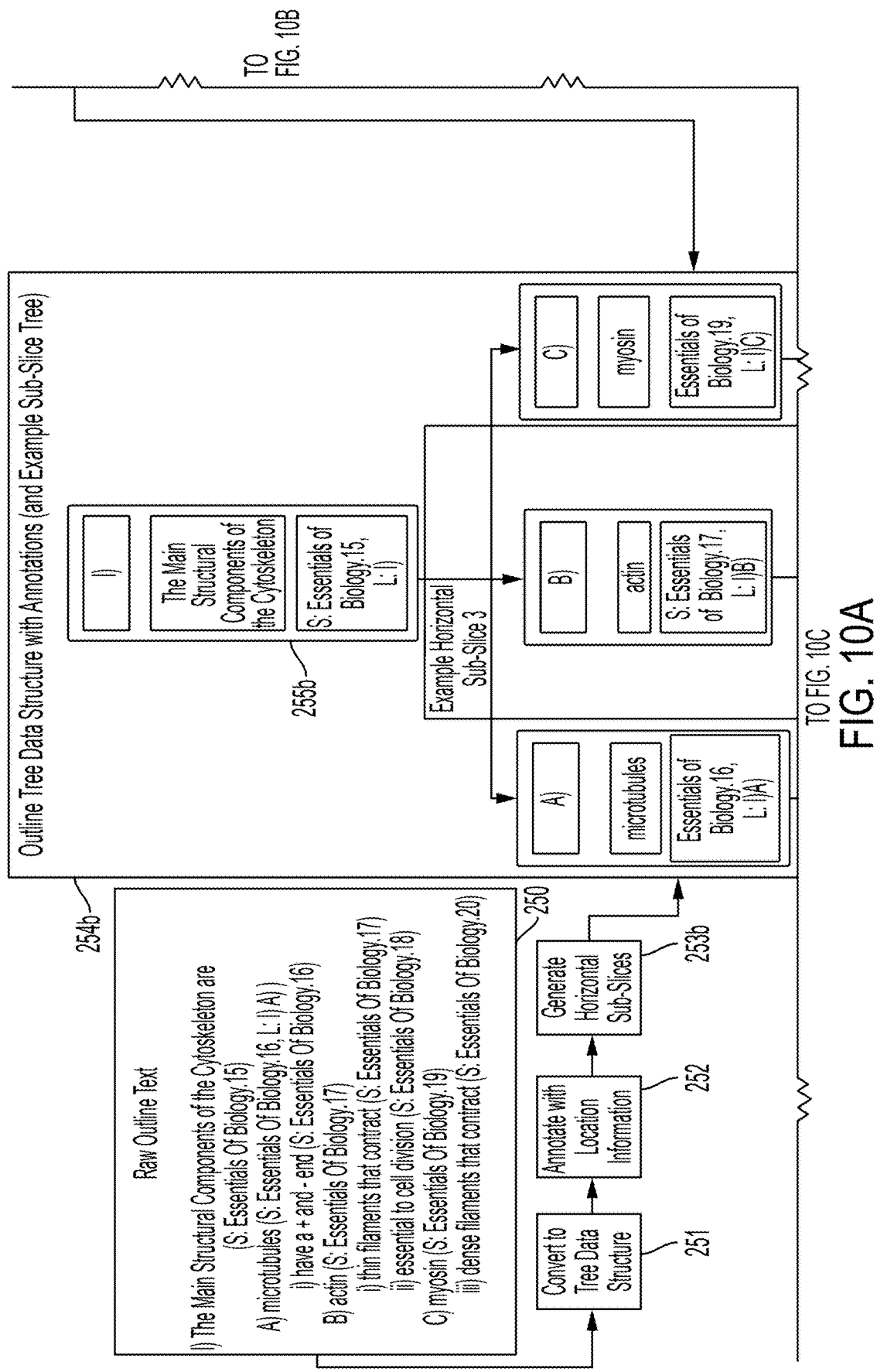
FIG. 10 is a block diagram illustrating the nature and process of converting a raw text outline into a data structure, horizontally slicing it, and converting it back to text.
Figure 10B:
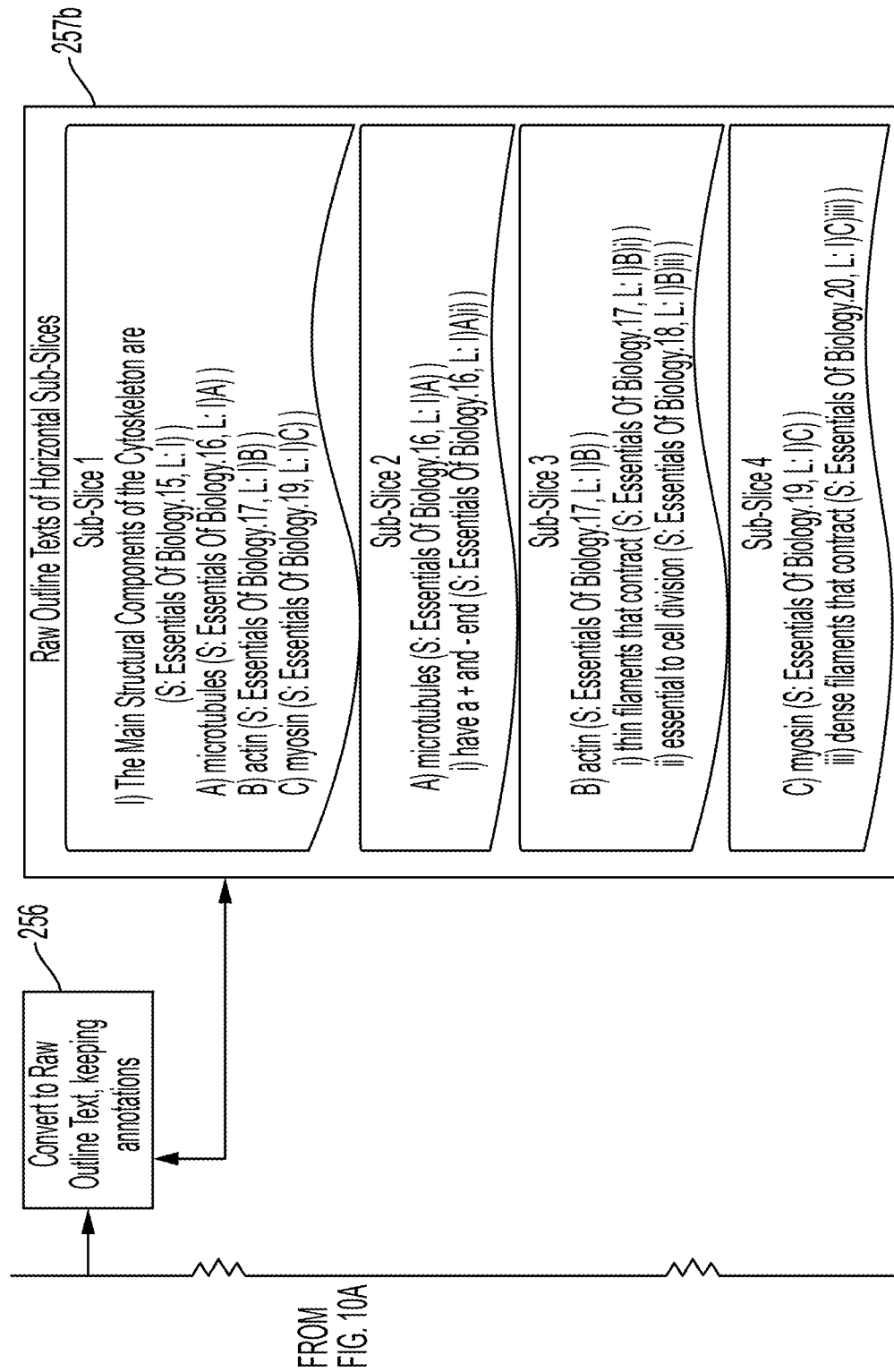
Figure 10C:
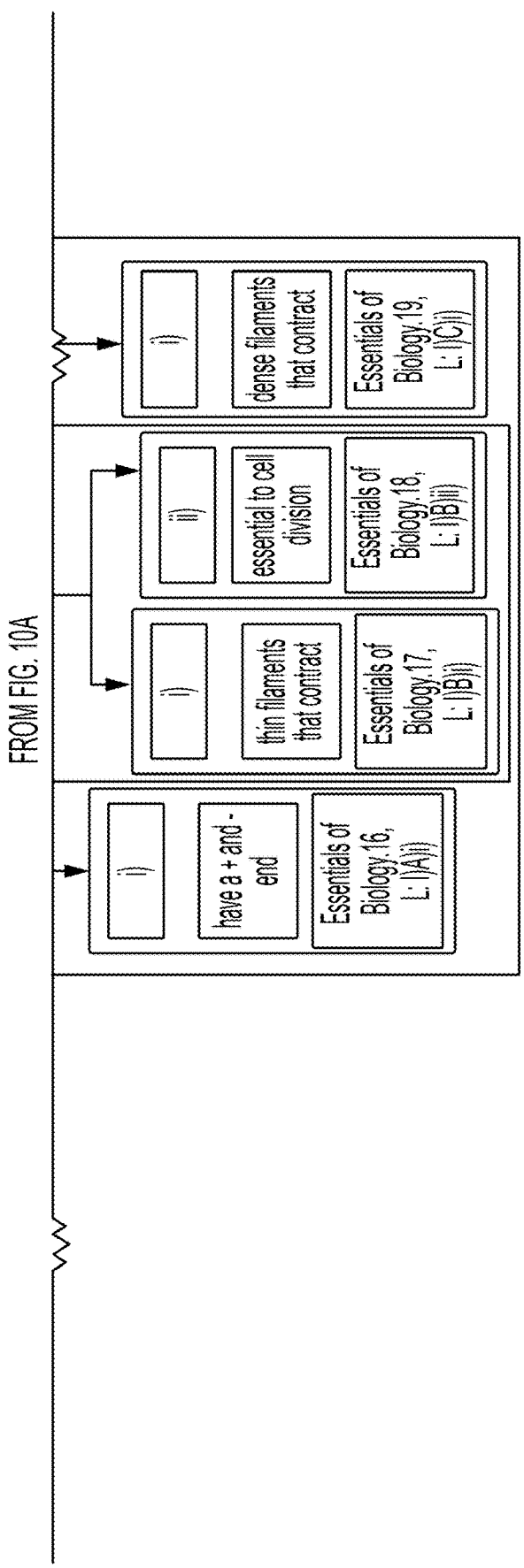

FIG. 10 is a block diagram illustrating the nature and process of converting a raw text outline into a data structure, horizontally slicing it, and converting it back to text. In particular embodiments, an outline text 250 is converted into a tree data structure 251, annotated with location information 252, and then sliced horizontally into sub-slices 253*b* such that the entire structure is covered via the sub-slices 254*b*. These slices may then be converted in a fashion that maintains annotations 256 into raw outline texts 257*b*. In one example but not by way of limitation, generating horizontal sub-slices 253*b* is done in a bottom-to-top, left-to-right manner. In another example but not by way of limitation, generating horizontal sub-slices 253*b* is done in a bottom-to-top, right-to-left manner. In another example but not by way of limitation, generating horizontal sub-slices 253*b* is done in a top-to-bottom, left-to-right manner. In another example but not by way of limitation, generating horizontal sub-slices 253*b* is done in a top-to-bottom, right-to-left manner. In another example but not by way of limitation, generating horizontal sub-slices 253*b* is done for the top-most sub-slice first, and then the rest are taken in a bottom-to-top, left-to right manner.

11. Path-History Entries to Knowledge (Hyper-) Graphs

Figure 11A:
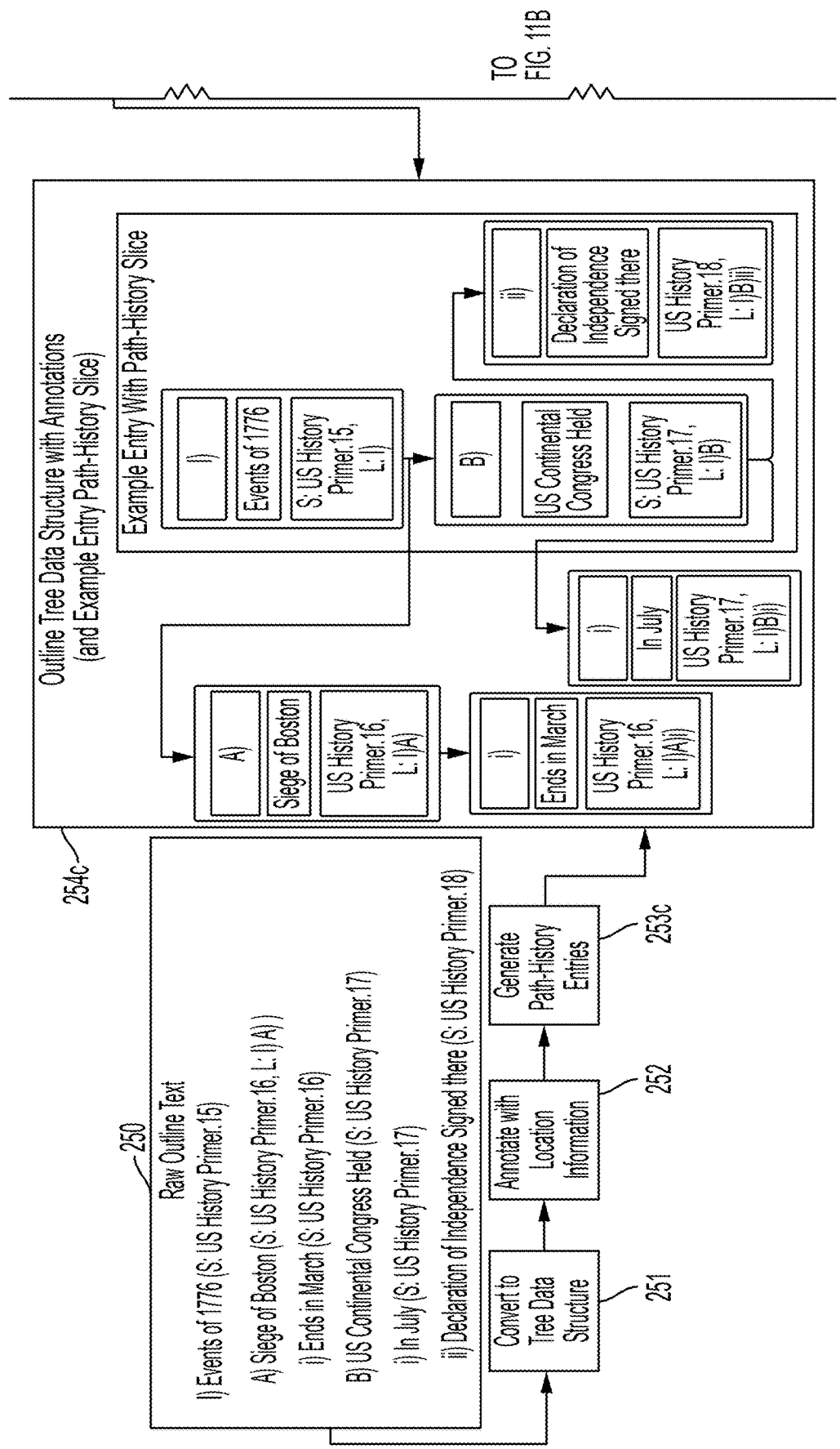
FIG. 11 is a block diagram illustrating the nature and process of converting a raw text outline into a data structure, generating a set of entries with path-histories, and then converting back to raw text.
Figure 11B:
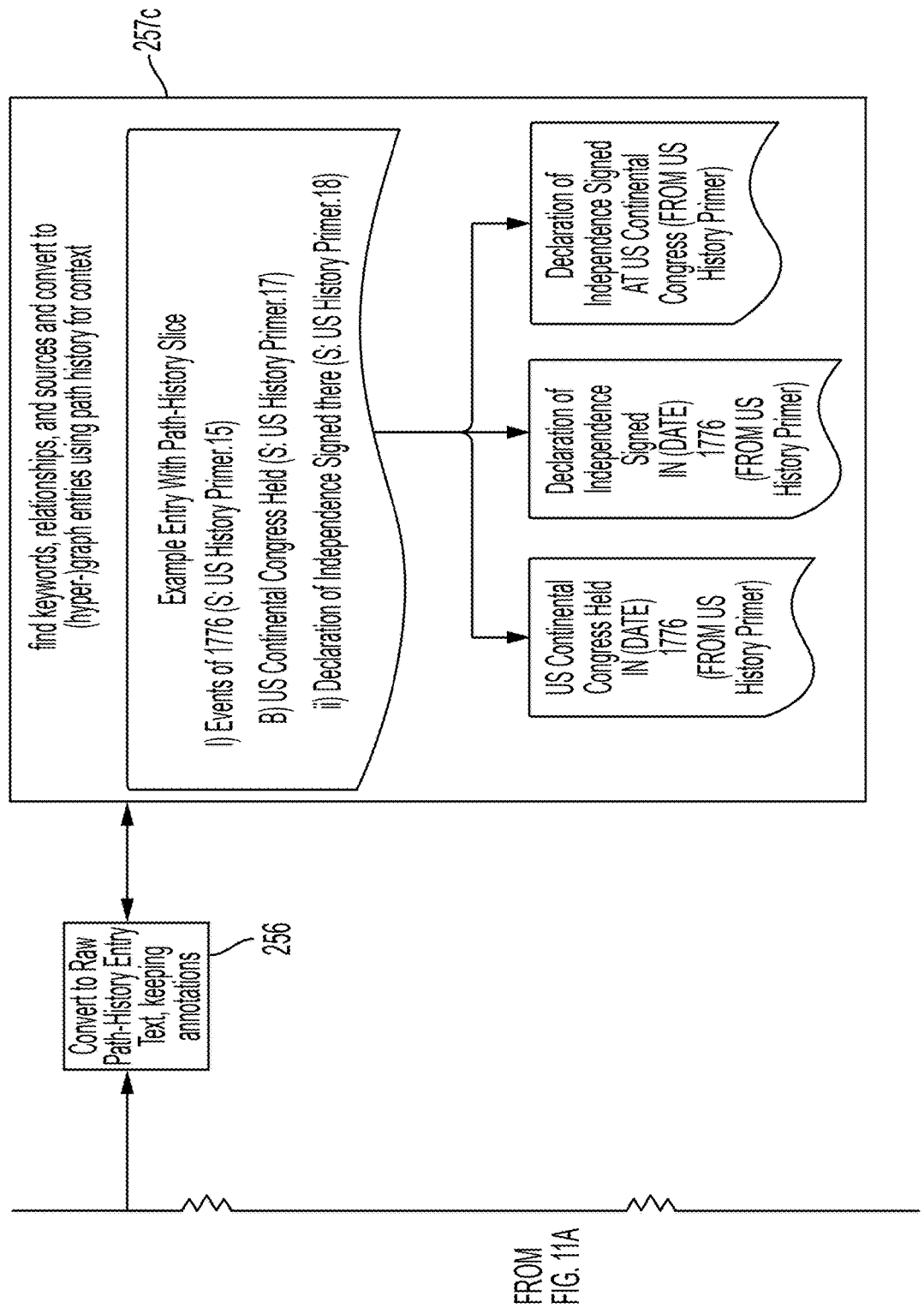
Figure 12A:
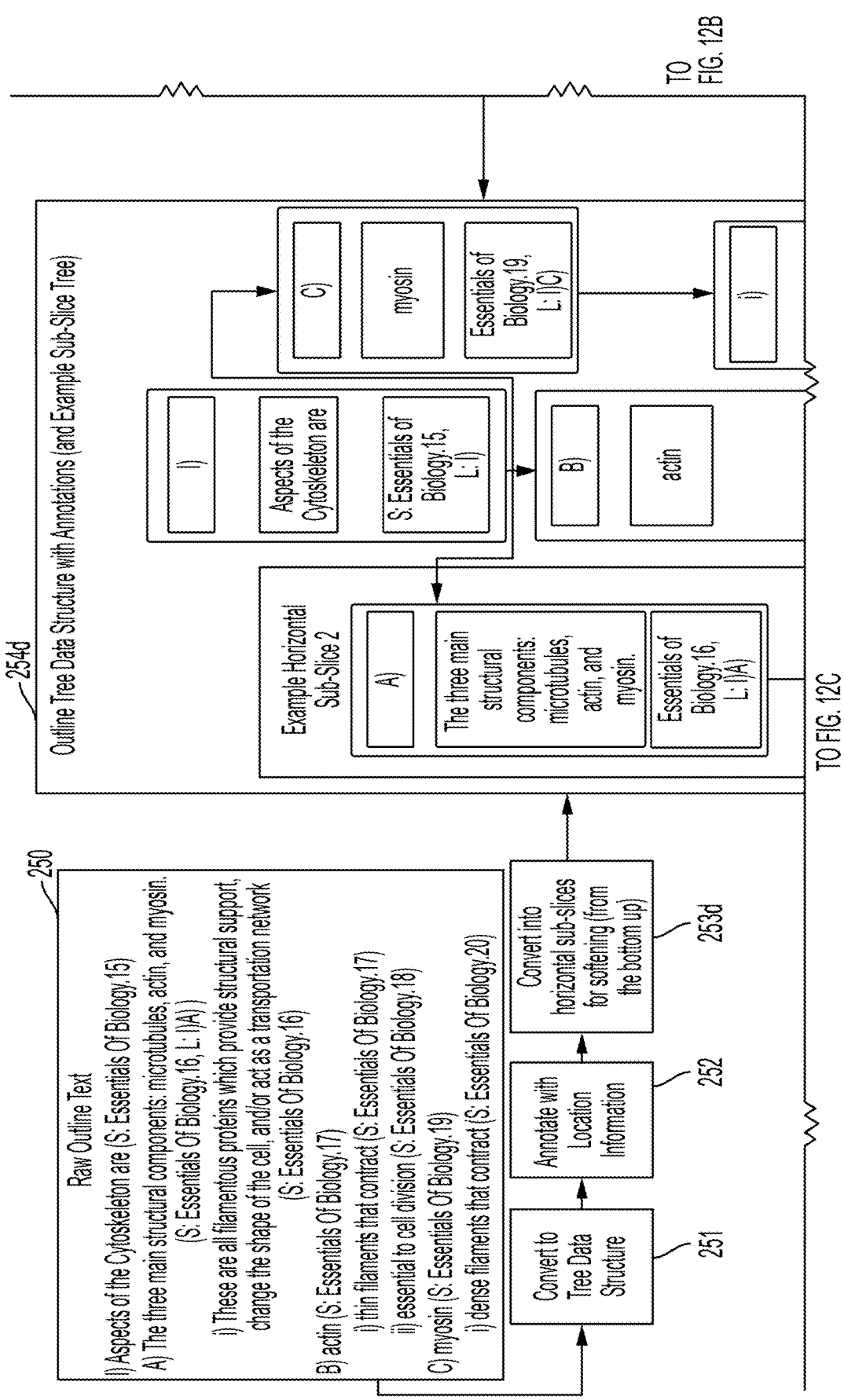
FIG. 12 is a block diagram illustrating the nature and process of softening an outline with larger internal entries so that they may be converted into entries with only a single piece of information each.
Figure 12B:
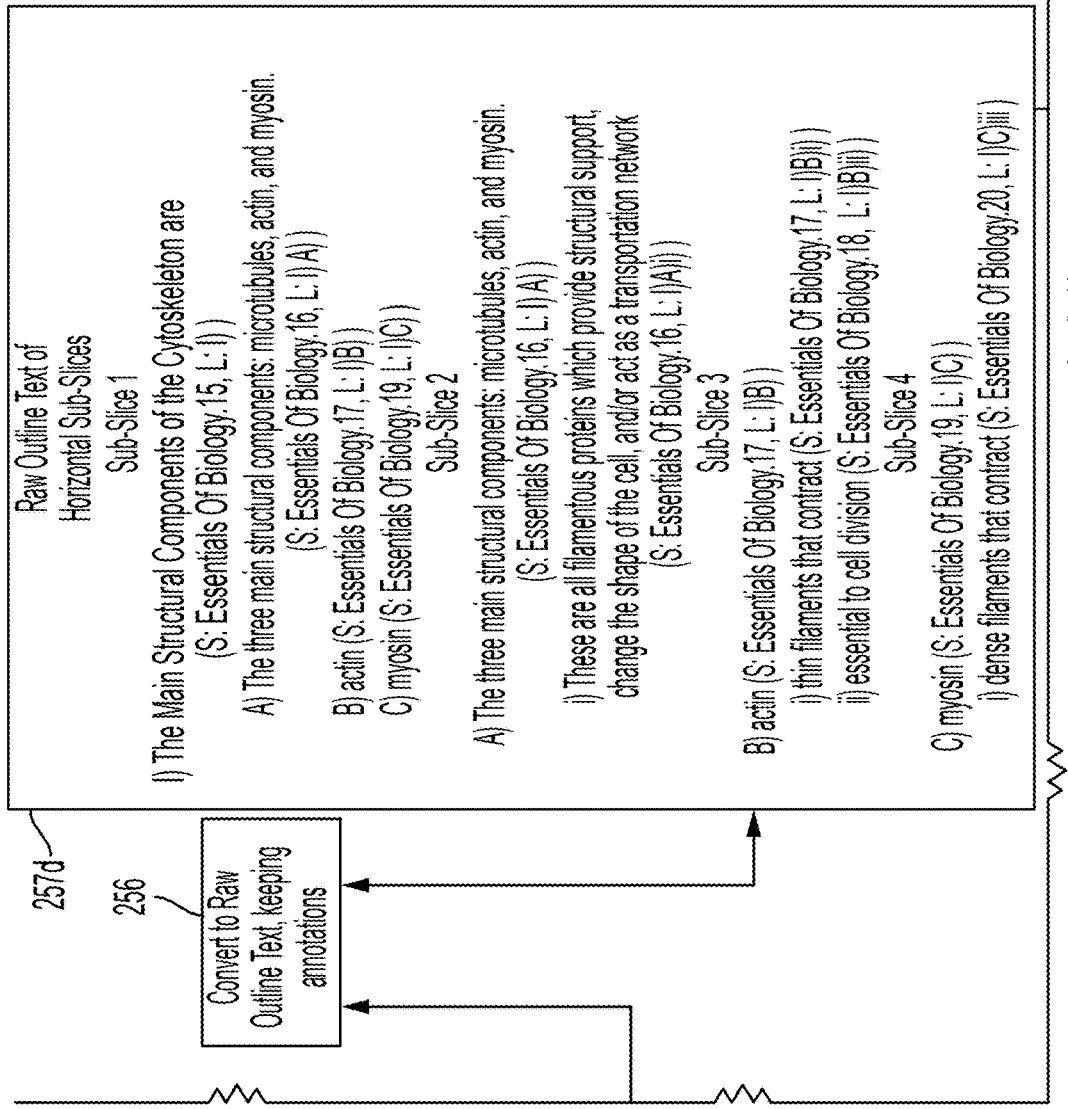
Figure 12C:
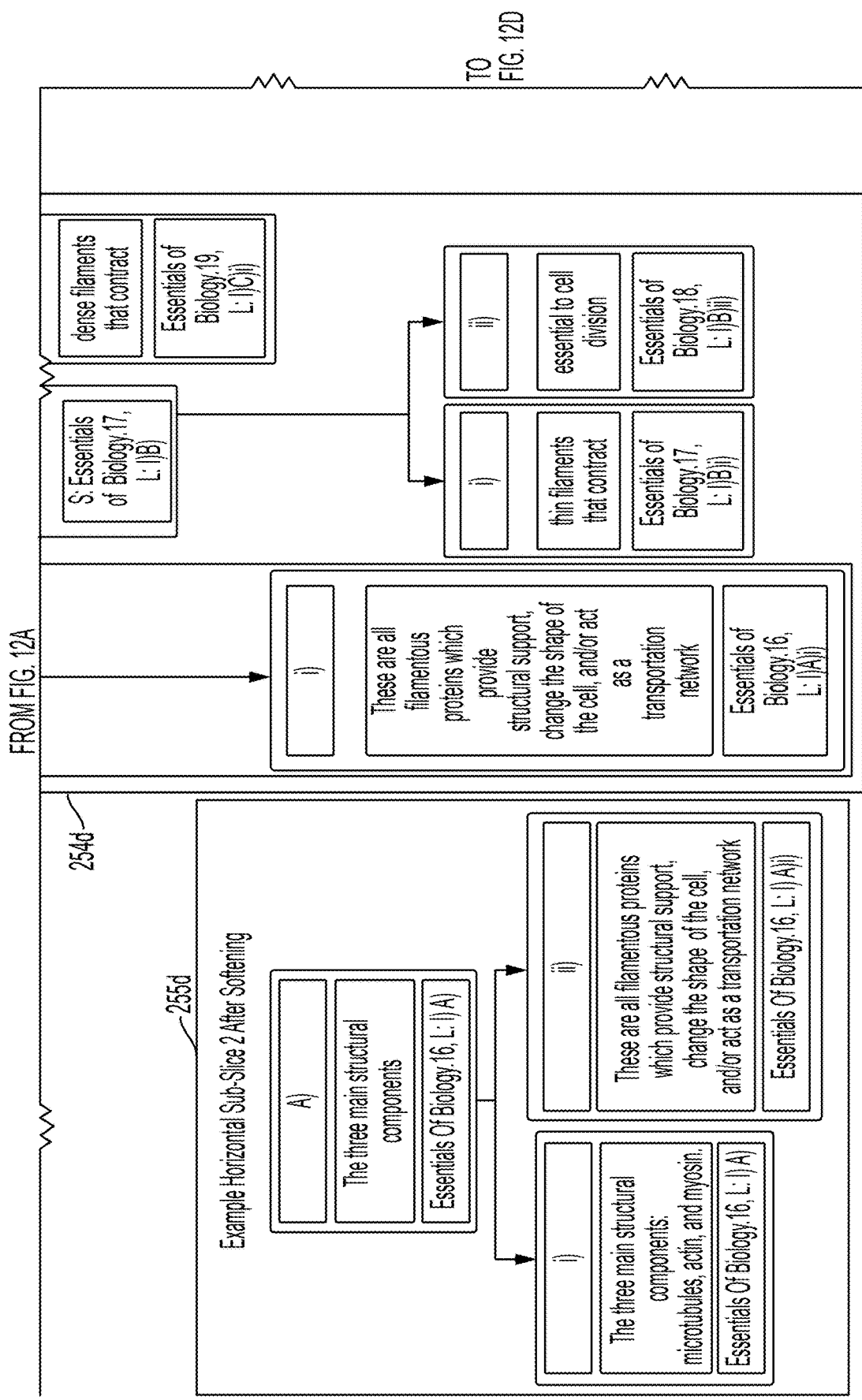
Figure 12D:
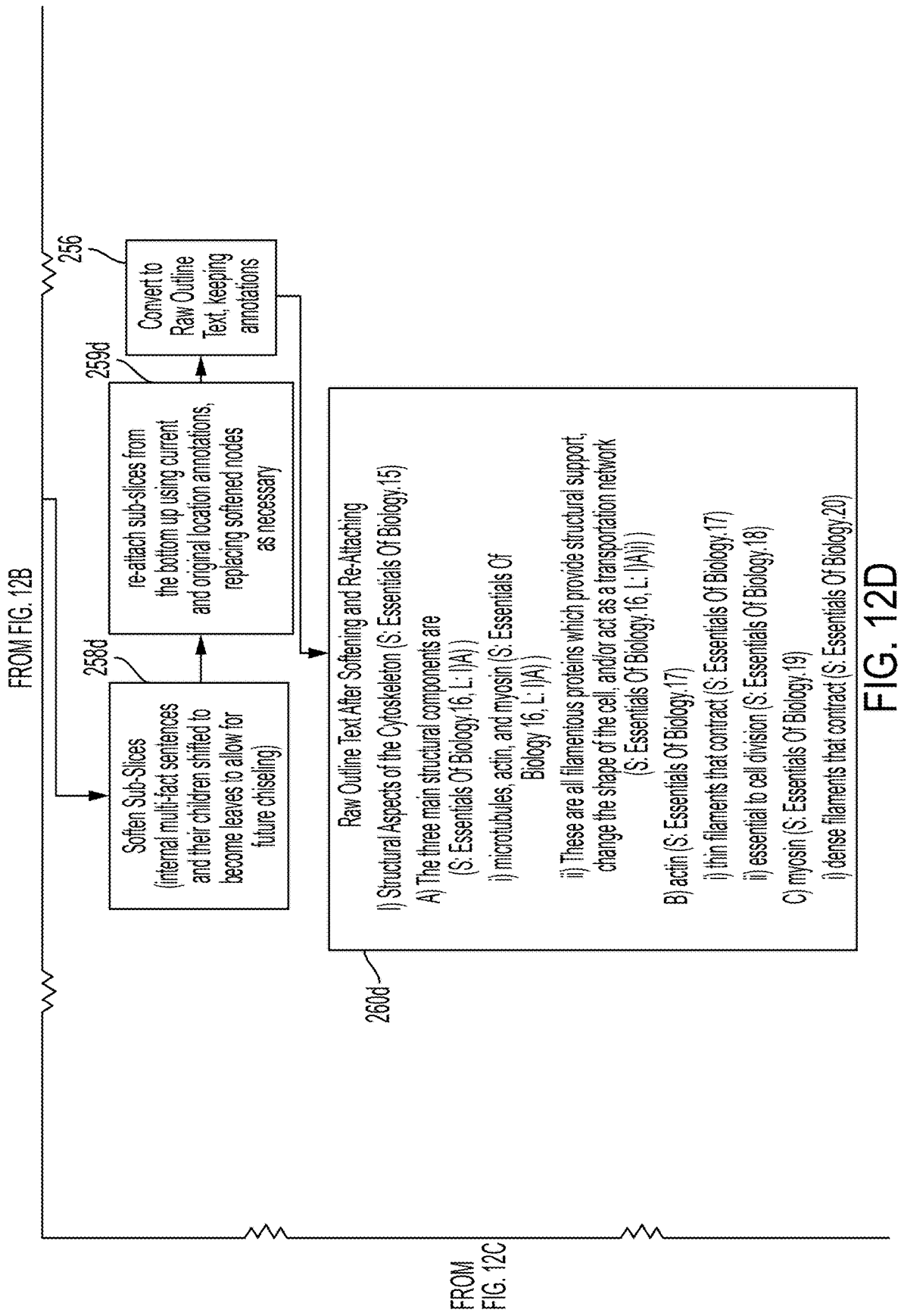
Figure 13A:
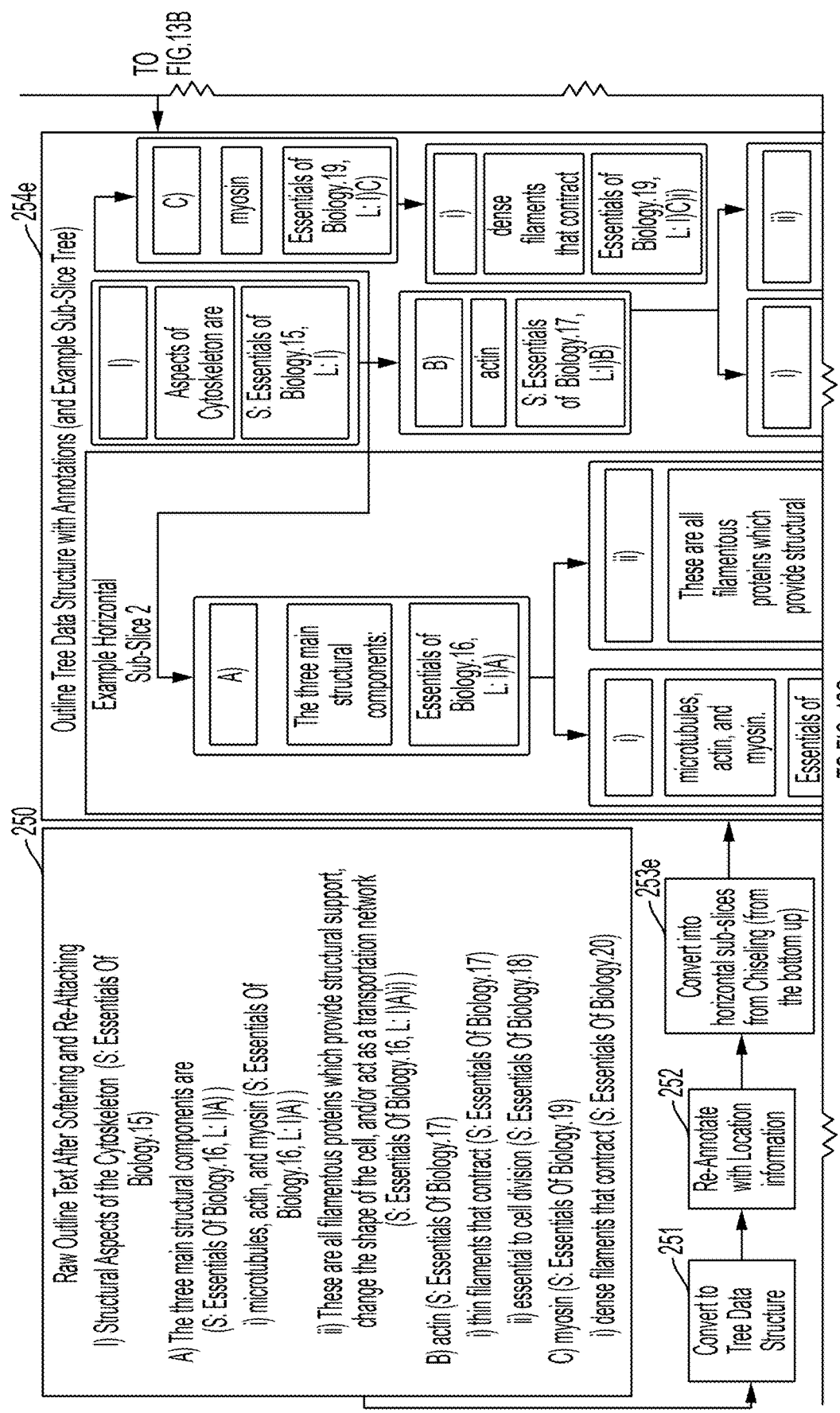
FIG. 13 is a block diagram illustrating the nature and process of chiseling an outline with large leaf entries so that they may be converted into subtrees such that each entry has only a single piece of information each.
Figure 13B:
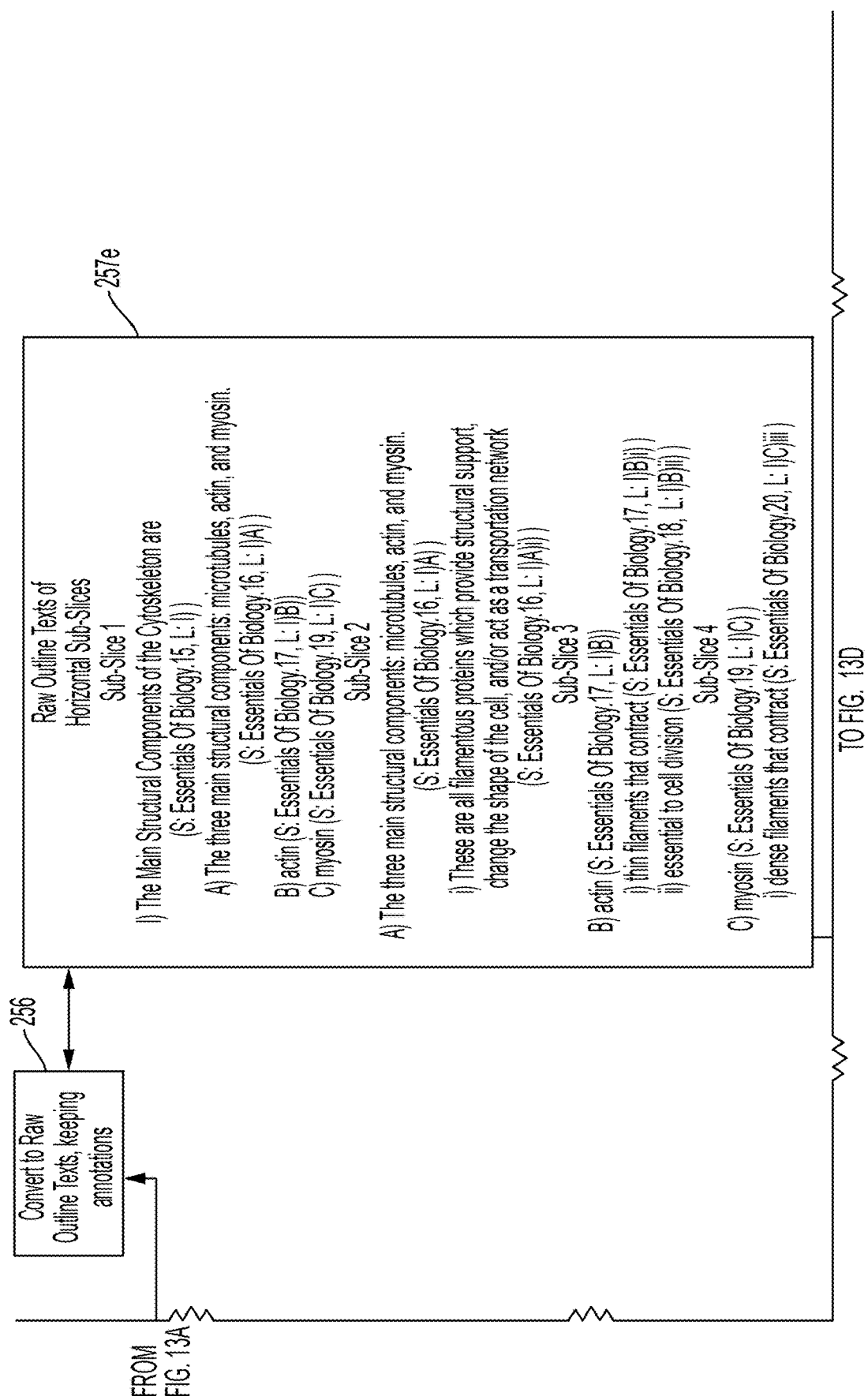
Figure 13C:
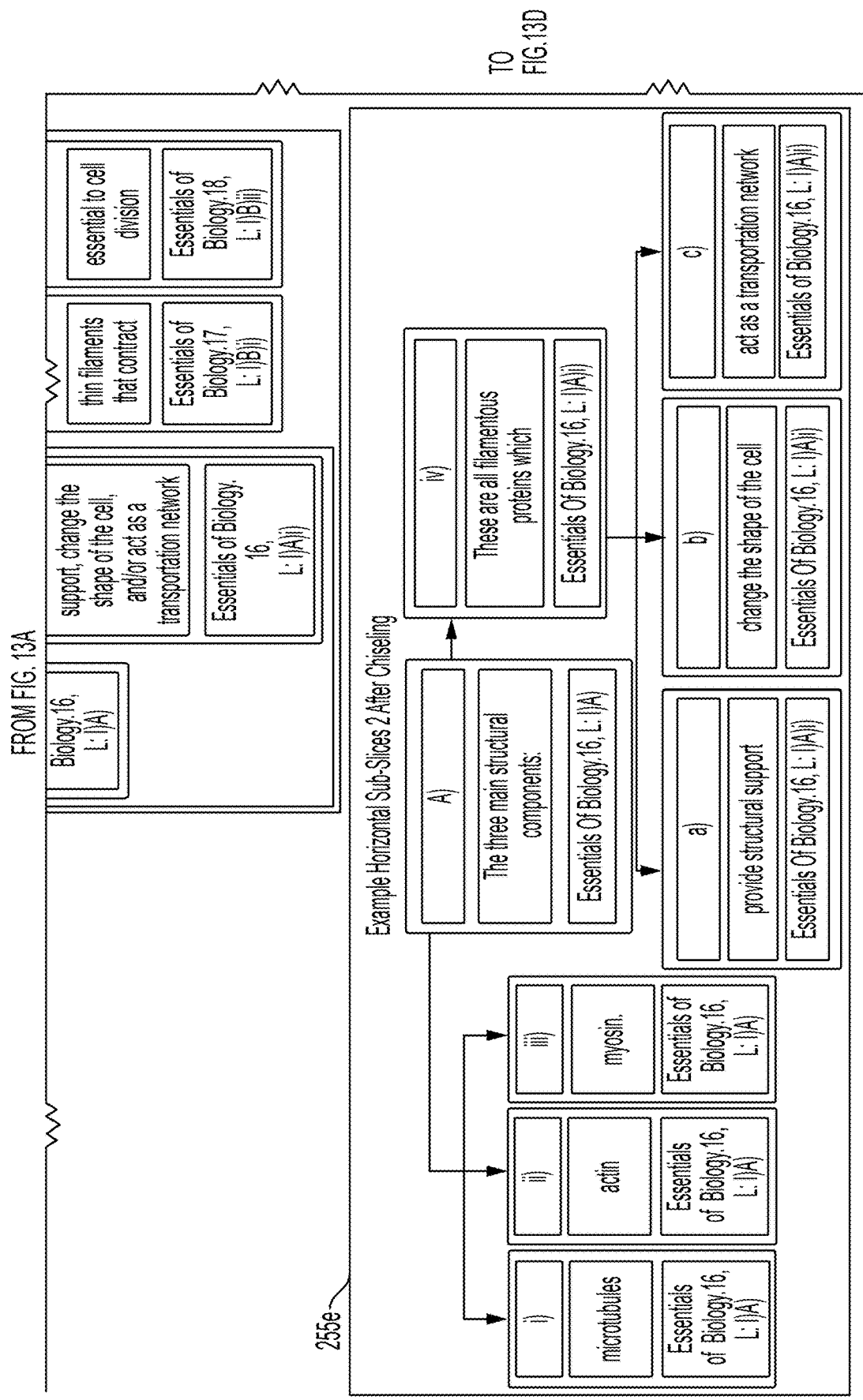
Figure 13D:
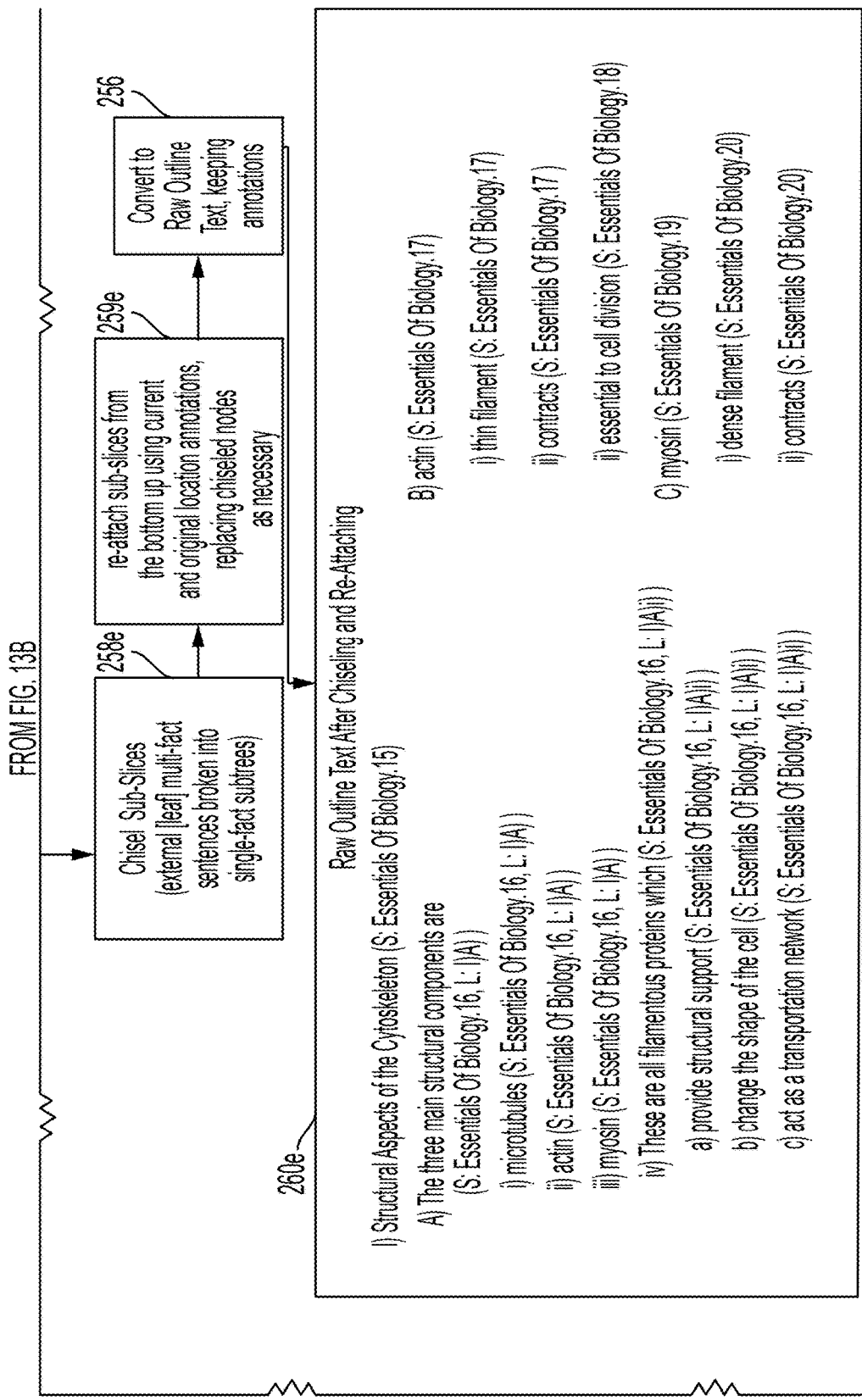

FIG. 11 is a block diagram illustrating the nature and process of converting a raw text outline into a data structure, generating a set of entries with path-histories, and then converting back to raw text. In particular embodiments, raw outline text 250 is converted into a tree data structure 251, annotated with location information 252, and then sliced vertically into path-history entries 253*c* such that every sub-slice contains the full path from each individual node to the root note 254*c*. These slices may then be converted in a fashion that maintains annotations 256 into raw outline texts 257*c*. In one example but not by way of limitation, generating path-history sub-slices 253*c* is done in a bottom-to-top, left-to-right manner. In another example but not by way of limitation, generating path-history sub-slices 253*c* is done in a bottom-to-top, right-to-left manner. In another example but not by way of limitation, generating path-history sub-slices 253*c* is done in a top-to-bottom, left-to-right manner. In another example but not by way of limitation, generating path-history sub-slices 253*c* is done in a top-to-bottom, right-to-left manner.

12. Softening Outlines

FIG. 12 is a block diagram illustrating the nature and process of softening an outline with larger internal entries so that they may be converted into leaf-entries that will later be chiseled to entries only a single piece of information each. In particular embodiments, an outline text 250 is converted into a tree data structure 251, annotated with location information 252, and then sliced horizontally into sub-slices 253*d* such that the entire structure is covered by the sub-slices 254*d*. These slices may then be converted in a fashion that maintains annotations 256 into raw outline texts 257*d*. In one example but not by way of limitation, generating horizontal sub-slices 253*d* is done in a bottom-to-top, left-to-right manner. In another example but not by way of limitation, generating horizontal sub-slices 253*d* is done in a bottom-to-top, right-to-left manner. In another example but not by way of limitation, generating horizontal sub-slices 253*d* is done in a top-to-bottom, left-to-right manner. In another example but not by way of limitation, generating horizontal sub-slices 253*d* is done in a top-to-bottom, right-to-left manner.

In particular embodiments, these sub-slices 257*d* are then softened (which takes internal multi-fact sentences and breaks them down and shifts any children such that the original ordering of the text remains if you were to flatten it and moves multi-fact partial sentences into leaf-node position) 258*d* and re-attached from the bottom up using the current and original location annotations 259*d*. These are converted back to raw outline text format keeping annotations 256 into the complete softened raw outline 260*d*. In an example but not by way of limitation horizontal sub-slice 2 in the diagram 254*d* is softened such that A) is split into A) and A)i) and the original A)i) is shifted to A)ii) 255*d*.

13. Chiseling Outlines

FIG. 13 is a block diagram illustrating the nature and process of chiseling an outline with large leaf entries so that they may be converted into subtrees such that each entry has only a single piece of information each. In particular embodiments, an outline text 250 is converted into a tree data structure 251, annotated with location information 252, and then sliced horizontally into sub-slices 253*e* such that the entire structure is covered by the sub-slices 254*e*. These slices may then be converted in a fashion that maintains annotations 256 into raw outline texts 257*e*. In one example but not by way of limitation, generating horizontal sub-slices 253*e* is done in a bottom-to-top, left-to-right manner. In another example but not by way of limitation, generating horizontal sub-slices 253*e* is done in a bottom-to-top, right-to-left manner. In another example but not by way of limitation, generating horizontal sub-slices 253*e* is done in a top-to-bottom, left-to-right manner. In another example but not by way of limitation, generating horizontal sub-slices 253*e* is done in a top-to-bottom, right-to-left manner.

In particular embodiments, these sub-slices 257*e* are then chiseled (which takes leaf-node multi-fact entries and breaks them down into a sub-tree of single-fact entries such that the original ordering of the text remains if you were to flatten it) 258*e* and re-attached from the bottom up using the current and original location annotations 259*e*. These are converted back to raw outline text format keeping annotations 256 into the complete chiseled raw outline 260*e*. In an example but not by way of limitation horizontal sub-slice 2 in the diagram 254*e* is chiseled such that A)i) is split into A)i), A)ii), and A)iii), and the original A)ii) becomes A)iv), A)iv)a), A)iv)b), and A)iv)c)) 255*e*.

14. Grouping and (Re-)Grouping Outlines

Figure 14A:
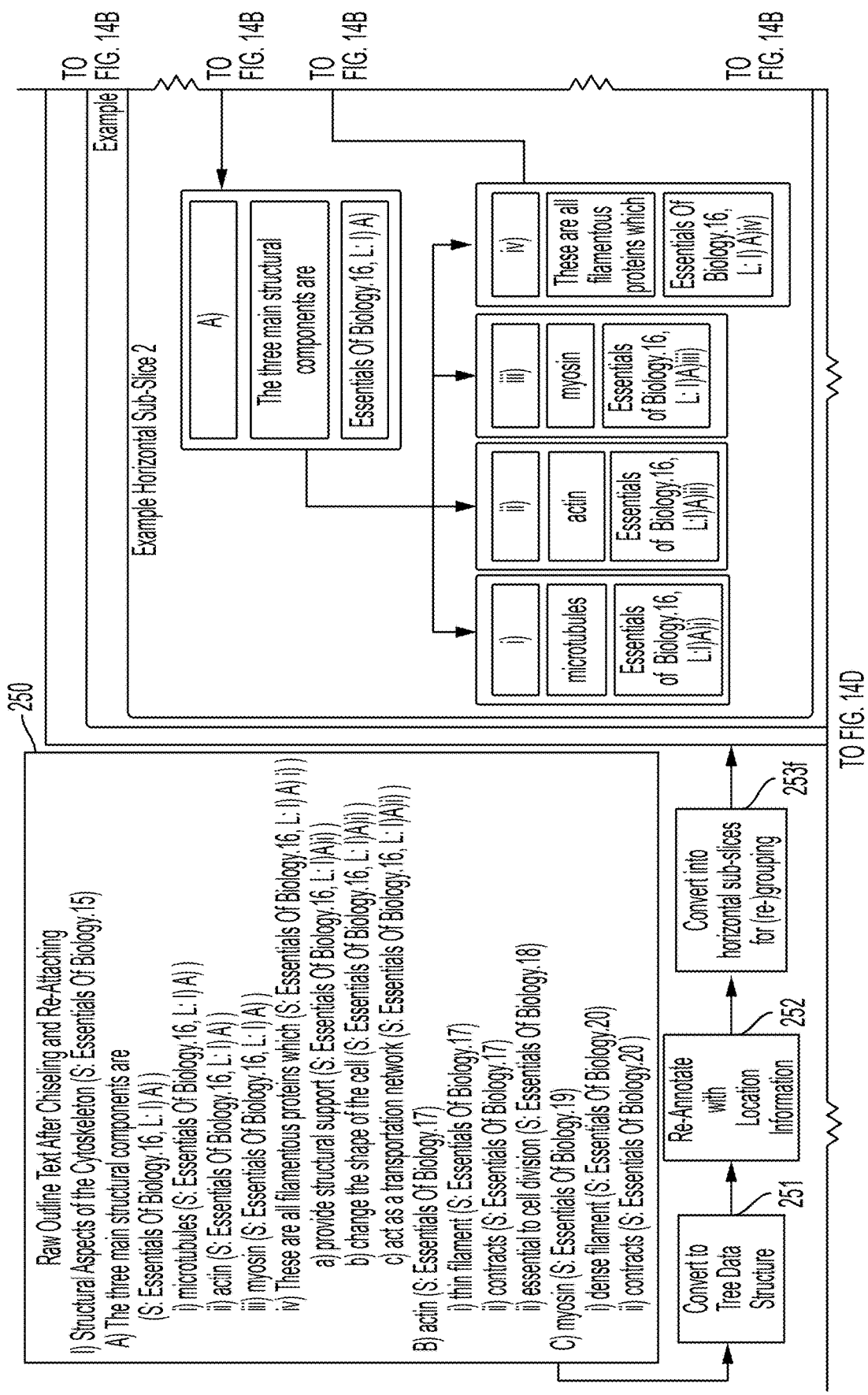
FIG. 14 is a block diagram illustrating the nature and process of grouping the children of nodes with a large branching factor such that it reduces the branching factor and gives an understanding of what information is in each new group.
Figure 14B:
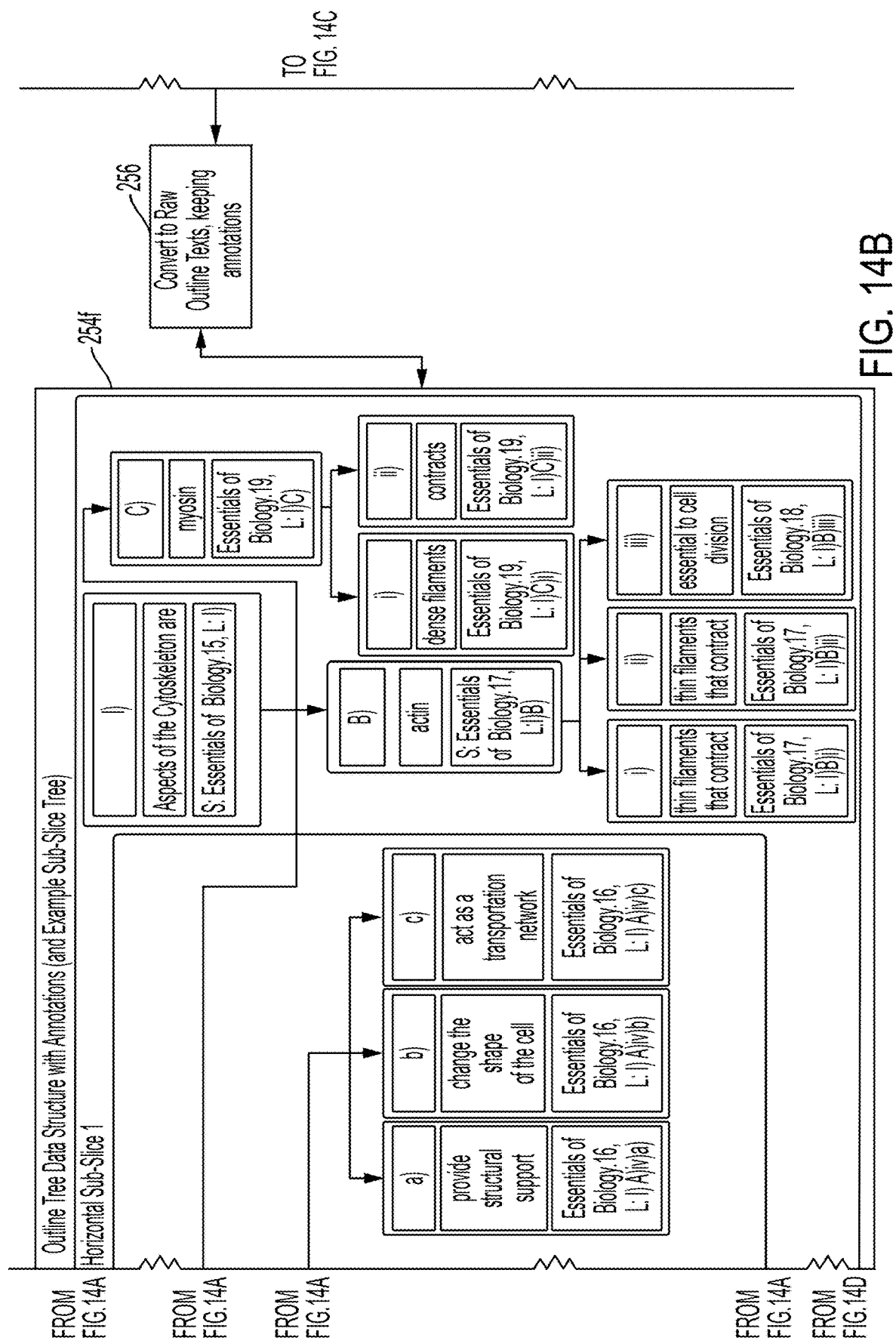

FIG. 14 is a block diagram illustrating the nature and process of grouping the children of nodes with a large branching factor such that it reduces the branching factor and gives an understanding of what information is in each new group or moving entries from one group to another. In particular embodiments, an outline text 250 is converted into a tree data structure 251, annotated with location information 252, and then sliced horizontally into sub-slices 253*f* such that the entire structure is covered by the sub-slices 254*f*. These slices may then be converted in a fashion that maintains annotations 256 into raw outline texts 257*f*. In one example but not by way of limitation, generating horizontal sub-slices 253*f* is done in a bottom-to-top, left-to-right manner. In another example but not by way of limitation, generating horizontal sub-slices 253*f* is done in a bottom-to-top, right-to-left manner. In another example but not by way of limitation, generating horizontal sub-slices 253*f* is done in a top-to-bottom, left-to-right manner. In another example but not by way of limitation, generating horizontal sub-slices 253*f* is done in a top-to-bottom, right-to-left manner.

In particular embodiments, these sub-slices 257f are then (re-)grouped (which takes nodes with more than a pre-set number of immediate children and inserts nodes in-between such that each new node has that pre-set number of children or less and the new node has a text entry that abstractly describes the grouping thus created, or moves entries from one grouping node to an adjacent one) 258f and re-attached from the bottom up using the current and original location annotations 259f. These are converted back to raw outline text format keeping annotations 256 into the complete (re-)grouped raw outline 260f. In an example but not by way of limitation horizontal sub-slice 2 in the diagram 254f is re-grouped such that A)iv) becomes B), with B) relabeled to C) and C) relabeled to D). In the same example but not by way of limitation horizontal sub-slice 1 in the diagram 254f is grouped such that the original B) and C) are children of new group node C) and become C)i) and C)ii) respectively 255f.

15. Combining Partial Fringe Outlines into Infinite Outlines Sequentially

Figure 15A:
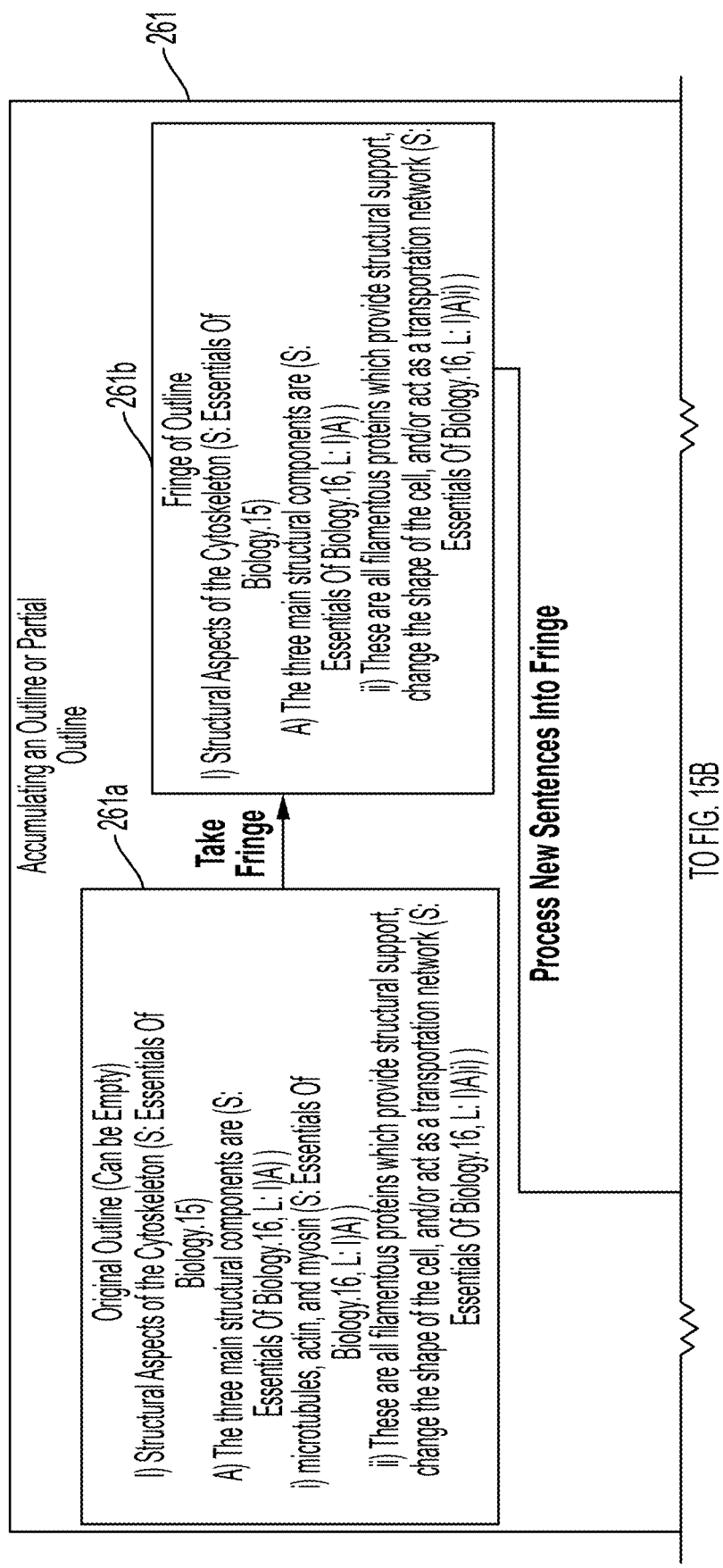
FIG. 15 is a block diagram illustrating the nature and process of combining the new outline built off of the original outline's fringe with the original outline in a linear fashion.
Figure 15B:
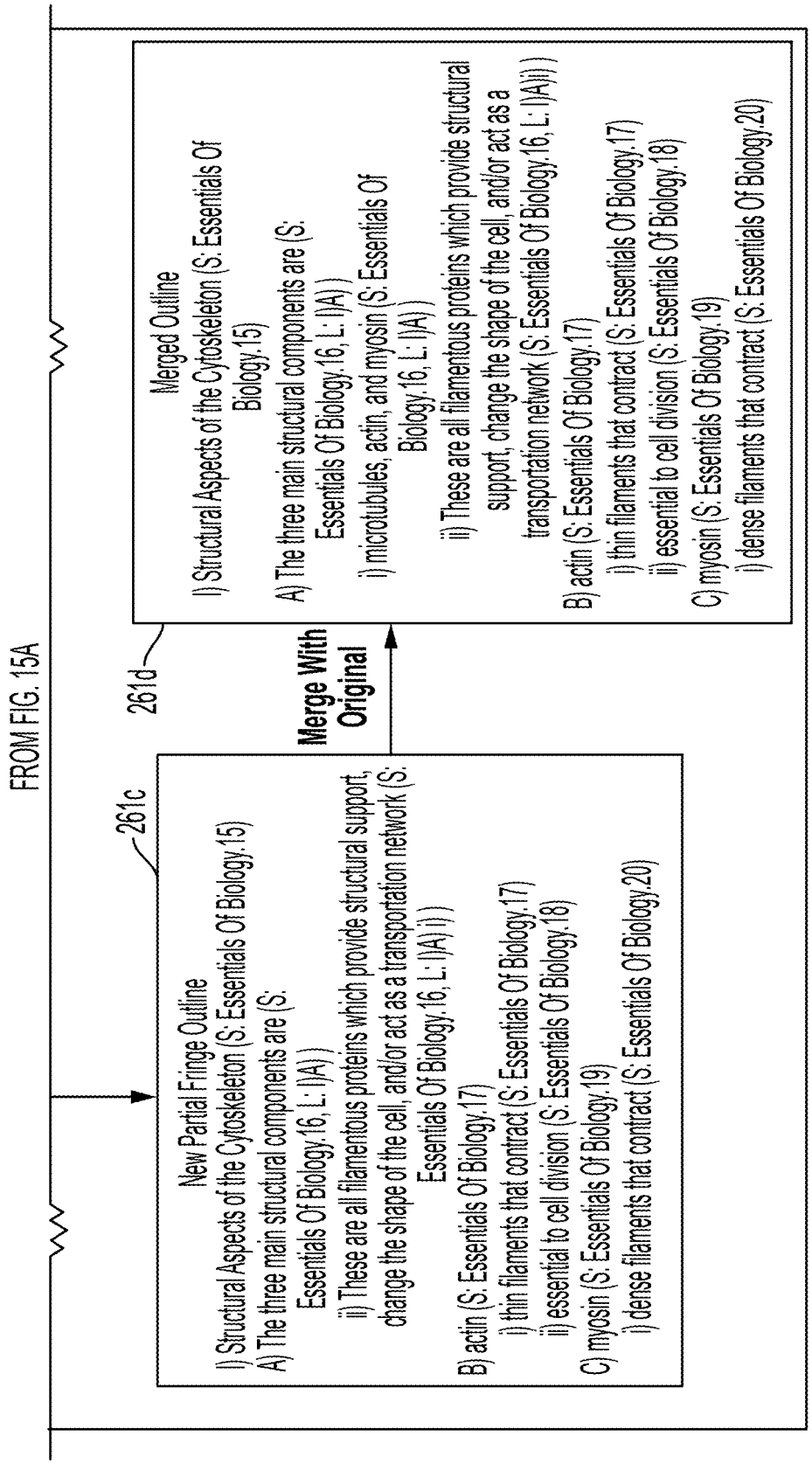

FIG. 15 is a block diagram illustrating the nature and process of combining the new outline built off of the original outline's fringe with the original outline in a linear sequential fashion 261. In particular embodiments of the process of accumulating an outline 261, the original outline may or may not be empty 261a. The outermost entry and its path-history are taken, generating the fringe of the outline 261b. This is combined with a batch of verified referenced sentences 179 from the verified referenced encoder 178 into a partial fringe outline 261c. This partial fringe outline 261c is then merged using the common fringe back onto the original outline yielding a merged outline 261d. This process is repeated until there are no more batches of verified referenced sentences 179.

16. Combining Partial Fringe Outlines into Infinite Outlines in Parallel

Figure 16:
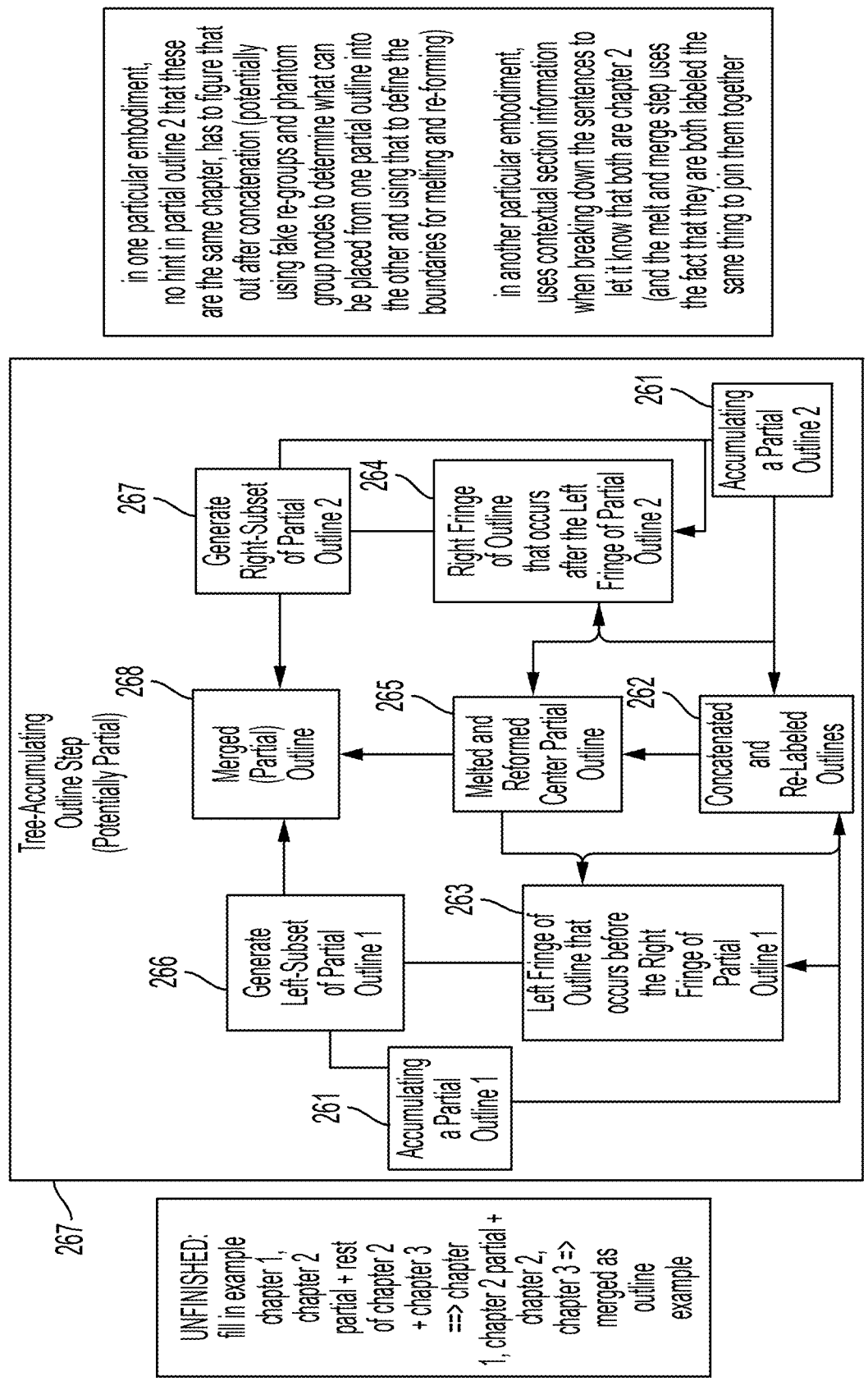
FIG. 16 is a block diagram illustrating the nature and process of combining new outlines built off of the original outline's fringes with the original outlines in a tree-merging fashion.
Figure 17A:
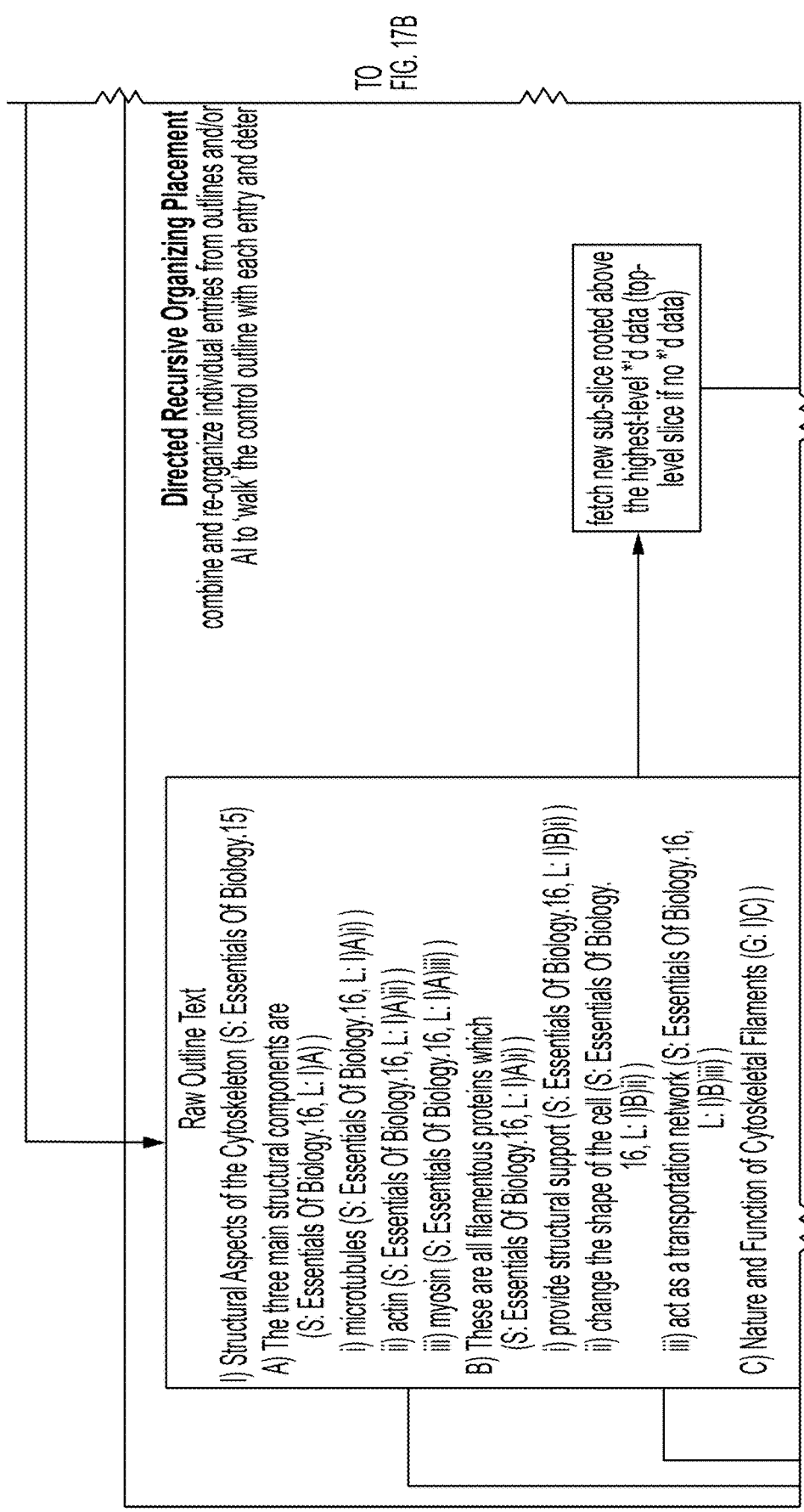
FIG. 17 is a block diagram illustrating the nature and process of inserting additional information into a pre-existing infinite outline.
Figure 17B:
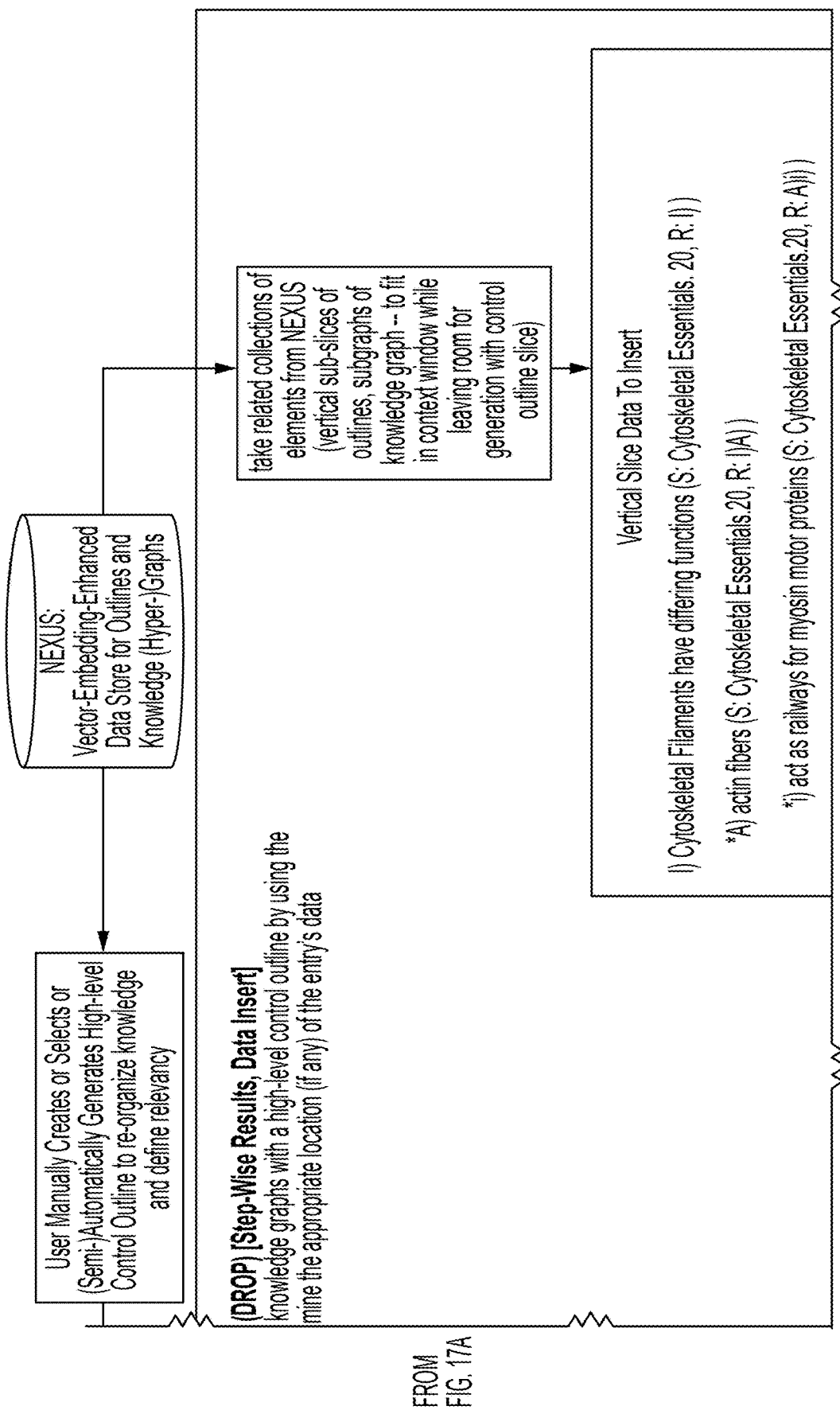
Figure 17C:
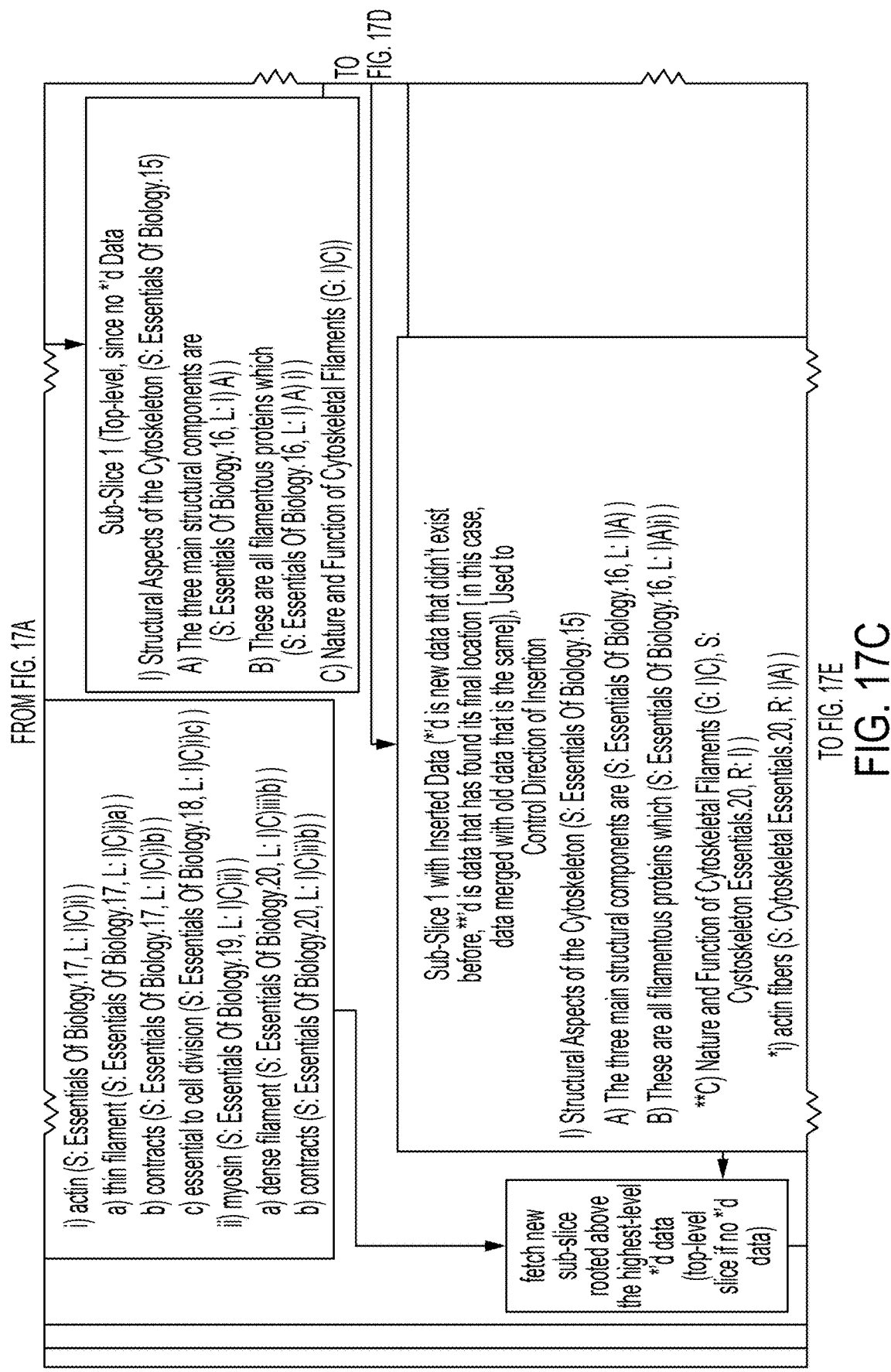
Figure 17D:
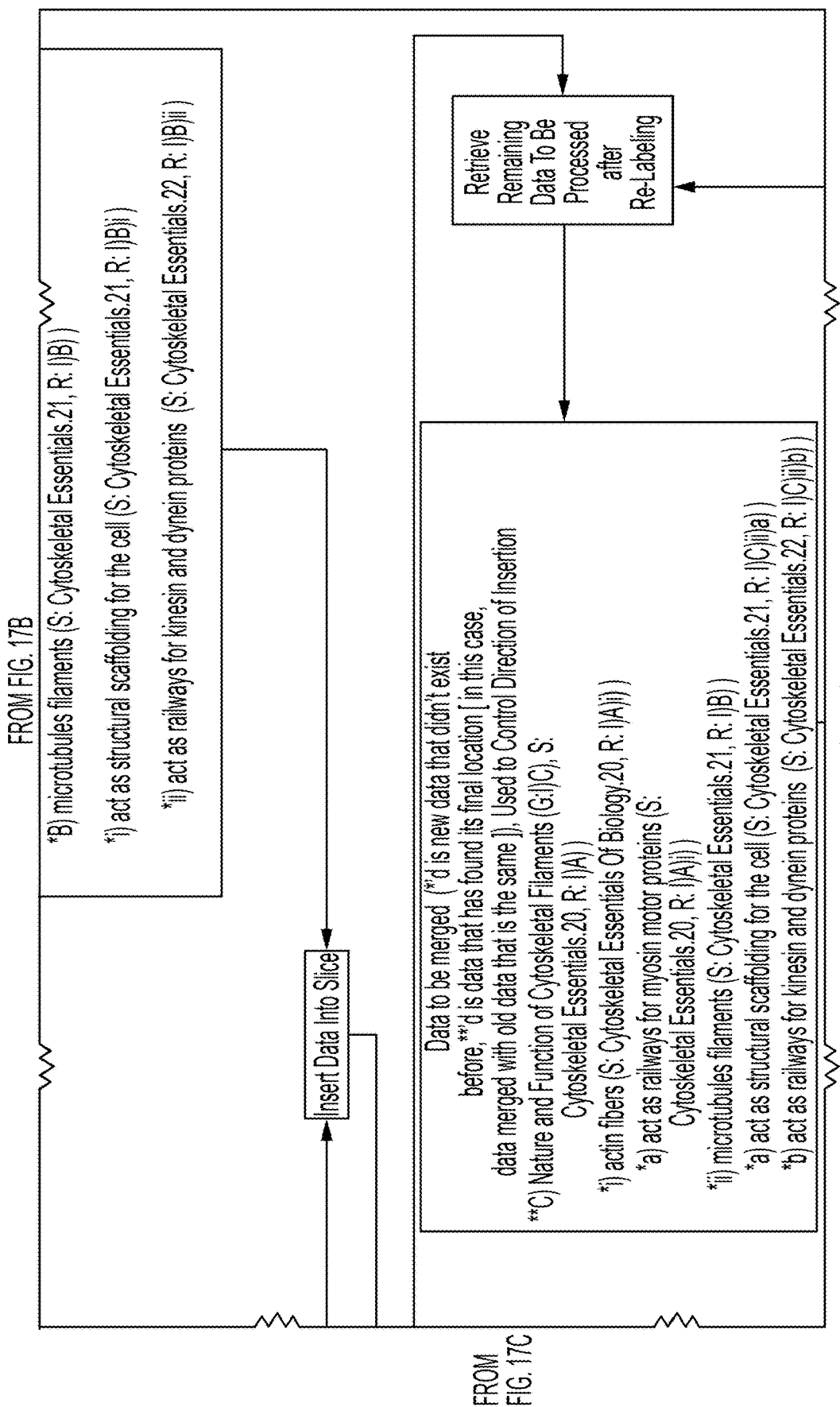
Figure 17E:
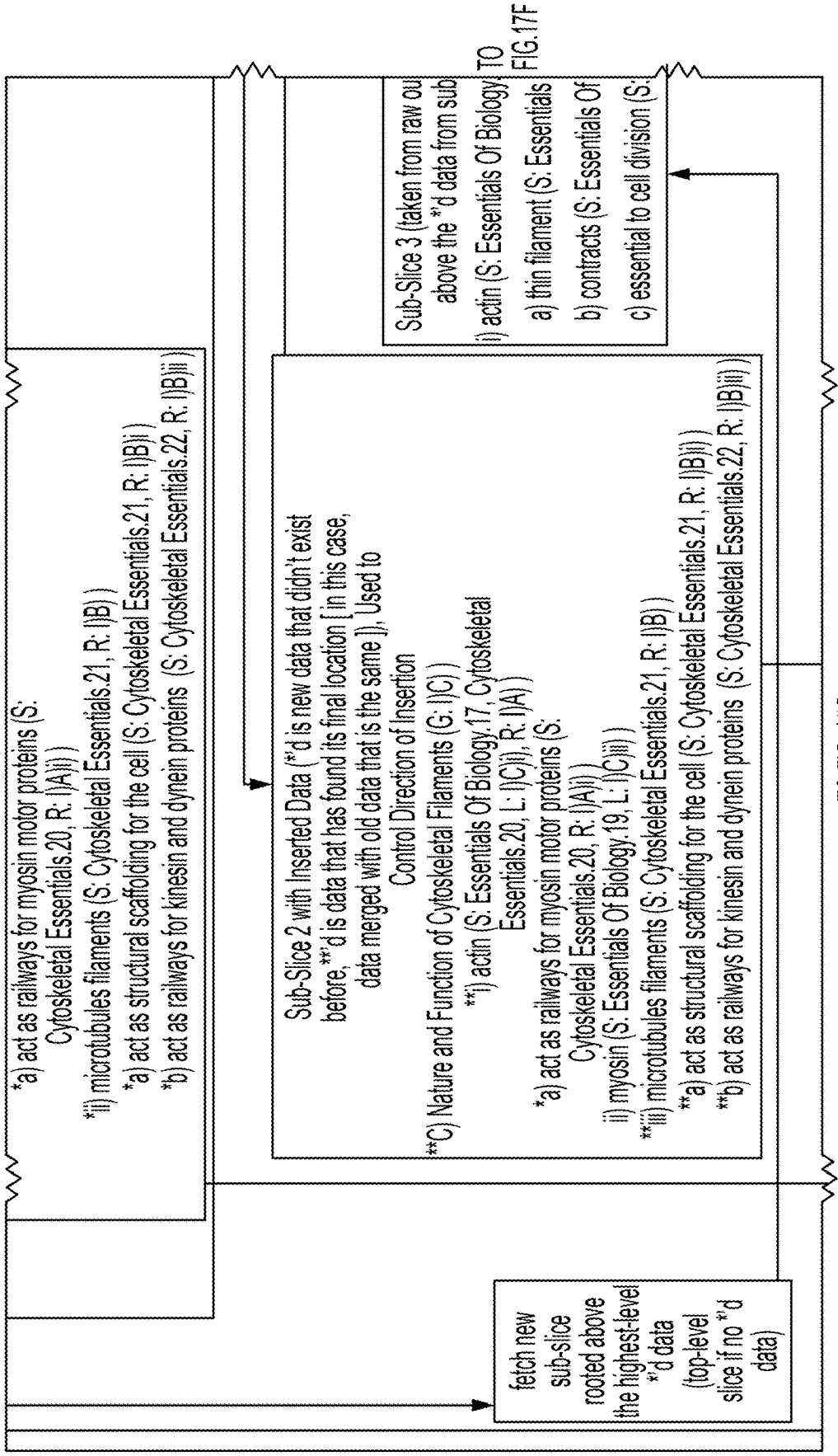
Figure 17F:
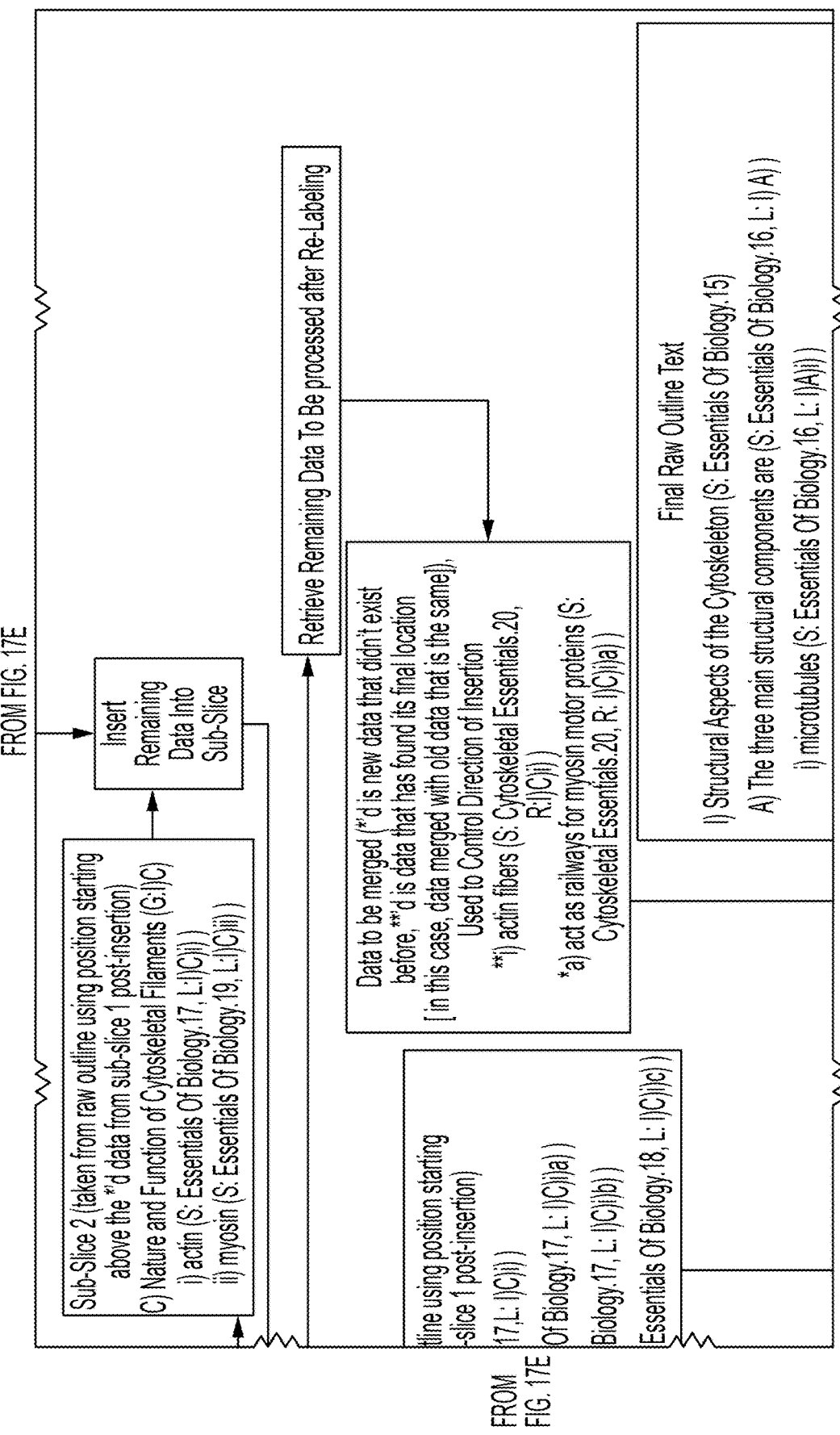
Figure 17G:
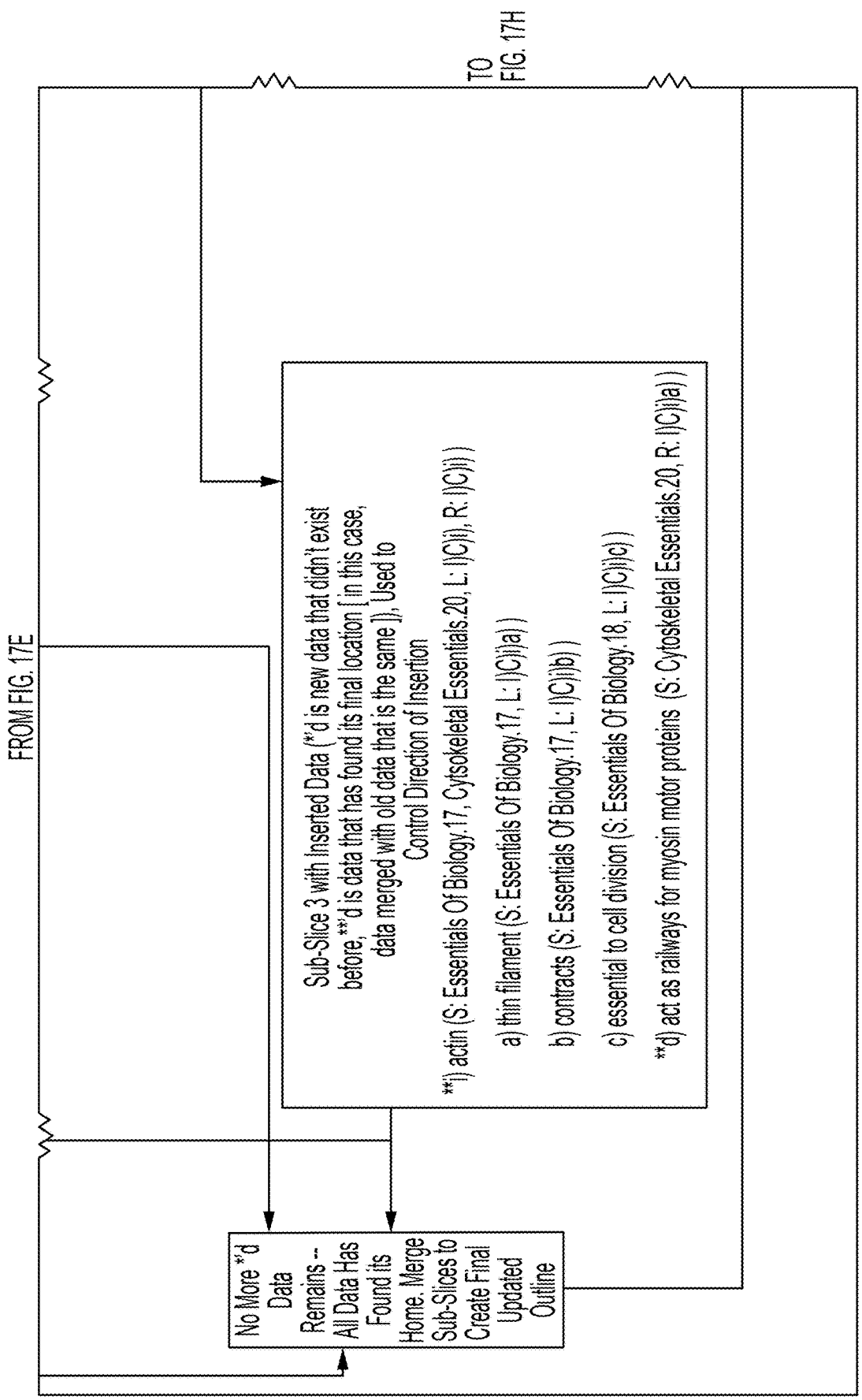
Figure 17H:
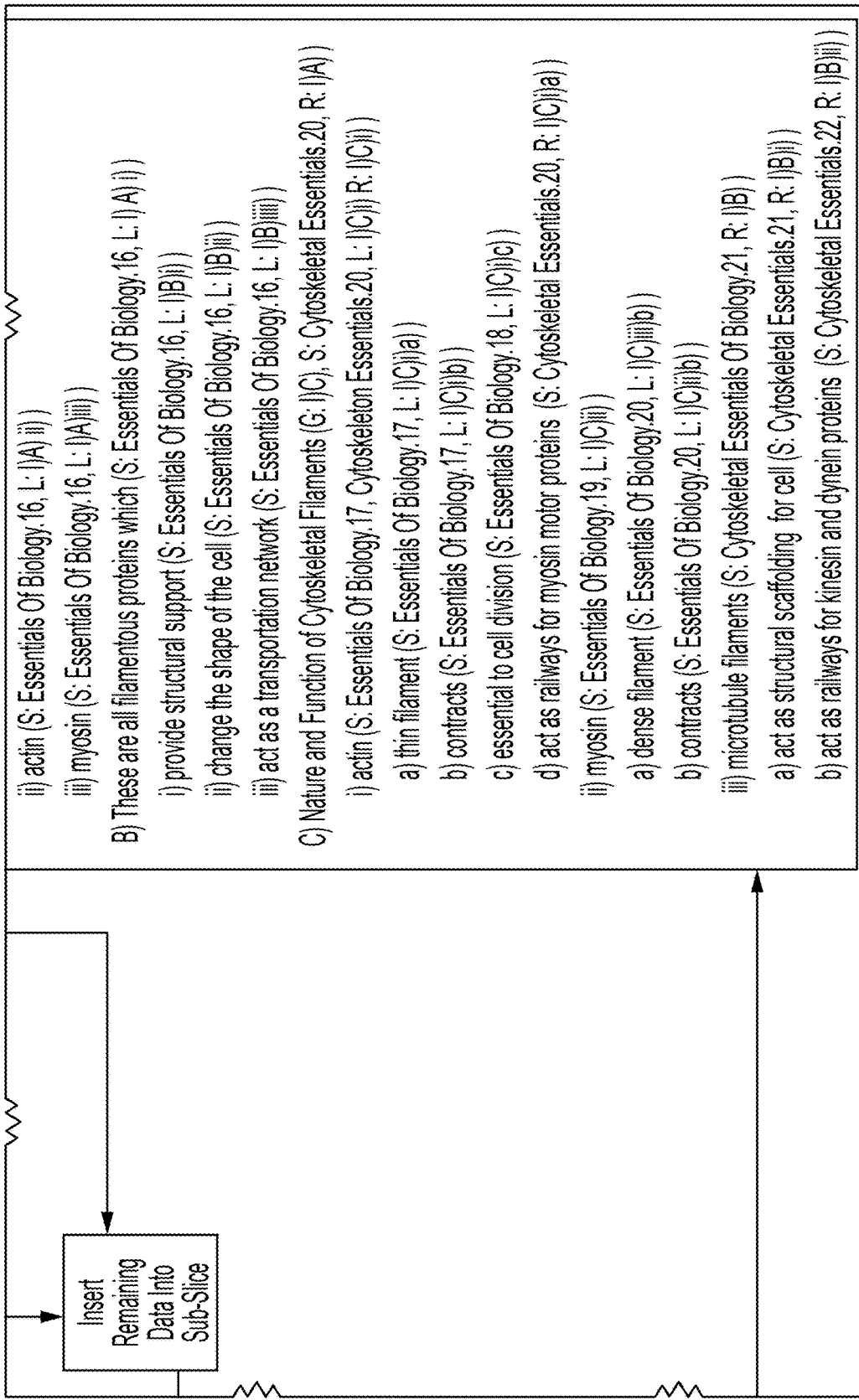

FIG. 16 is a block diagram illustrating the nature and process of combining new outlines built off of the original outline's fringes with the original outlines in a tree-merging parallel fashion 267. In particular embodiments of the process of accumulating an outline via tree-merging in parallel fashion 277 batches of sentences are individually sequentially accumulated in parallel 261. These are then grouped in pairs and concatenated and re-labeled 262. The left partial outline 1 has a fringe generated to the left (before) it's outer right fringe 263 while the right partial outline 2 has a fringe generated to the right (after) it's outer left fringe 264 such that the pair of fringe's 263 and 264 delineate a set of entries that straddles the boundary of partial outline 1 and partial outline 2 which is then melted (collapsed into raw text in its original ordering) and reformed into a center partial outline 265. The partial outline 1 and it's left fringe 263 are used to generate the left-subset of partial outline 1 266 while the partial outline 2 and it's left fringe 264 are used to generate the right-subset of partial outline 2 267, which are then merged with melted and reformed center partial outline 265 into the merged (partial) outline 268. This process is repeated recursively until there is only a single final outline.

FIG. 17 is a block diagram illustrating the nature and intermediate stages of the process of inserting additional information into a pre-existing infinite outline. At every stage new information (*'d) is processed using the DROP process described above, until it finds its final location (**'d).

In the above descriptions, RUMINATE is the process to, using the documents produced by DIGEST, to re-train the AI. RUMINATE provides a method of synthetic data production to guarantee validity of contents and allow for arbitrary content length.

17. Other Use Cases

Although the research use case was used for illustration purposes above, the novel processes and/or combination of processes may be used for a number of other user cases that benefit from the novel processes. For example, a client system 101 and/or 3rd-party systems 140 may automate the generation of new training data for LLMs or other generative AI processes by sending the initial training corpus to the ingestion process 122a. This ingestion process 122a breaks down the documents within the initial training corpus into outlines and knowledge graphs and stores them in processed information storage 203 and associated information storage 123. The reorganization process 122c may generate new documents (optionally using querying process 122b) and sends the new documents back to client system 101 and/or 3rd-party systems 140 to add to the training corpus.

In another example but not by way of limitation, a client system 101 and/or 3rd-party systems 140 may automate the testing, refactoring, and translation of code from one language to another by sending the initial code base and documentation to the ingestion process 122a. This ingestion process 122a breaks down the documents within the initial code base and documentation into language-dependent and/or language-independent outlines and knowledge graphs and stores them in processed information storage 203 and associated information storage 123. The reorganization process 122c may generate new documents such as automated tests, refactored code files, new documentation, and/or a new code base translated into a new language (optionally using querying process 122b) and sends them back to client system 101 and/or 3rd-party systems 140.

In another example but not by way of limitation, a client system 101 and/or 3rd-party systems 140 may automate the generation of new training data for LLMs or other generative AI processes by sending the initial training corpus to the ingestion process 122a. This ingestion process 122a breaks down the documents within the initial training corpus into outlines and knowledge graphs and stores them in processed information storage 203 and associated information storage 123. The reorganization process 122c may generate new documents (optionally using querying process 122b) and sends the new documents back to client system 101 and/or 3rd-party systems 140 to add to the training corpus.

In another example but not by way of limitation, a client system 101 and/or 3rd-party systems 140 may automate the generation of new educational material by sending an educational text corpus of all of the desired information for a student or students to learn to the ingestion process 122a. This ingestion process 122a breaks down the documents within the educational material into outlines and knowledge graphs and stores them in processed information storage 203 and associated information storage 123. The reorganization process 122c may generate new documents (optionally using querying process 122b, and either self-guided or guided by configurations from a client system 101 and/or 3rd-party systems 140) and sends the new documents back to client system 101 and/or 3rd-party systems 140 for educational use.

In another example but not by way of limitation, a client system 101 and/or 3rd-party systems 140 may automate the generation of compacted outlines or documents for the purpose of increasing the rate of information processing and comprehension by individuals or to reduce tokens to fit within limits required by an AI process by sending the initial documents to the ingestion process 122a. This ingestion process 122a breaks down the documents within the compacted outlines or documents into outlines and knowledge graphs and stores them in processed information storage 203 and associated information storage 123. The reorganization process 122c may generate new condensed versions of the old documents along with outlines of the original documents (optionally using querying process 122b) and sends the new condensed versions of the old documents with outlines back to client system 101 and/or 3rd-party systems 140.

In another example but not by way of limitation, a client system 101 and/or 3rd-party systems 140 may automate the detection of novel information within a document or documents by sending these documents in which novelty is to be detected along with a control corpus of documents whose information is not to be considered novel to the ingestion process 122a. This ingestion process 122a breaks down the documents outlines and knowledge graphs and stores them in processed information storage 203 and associated information storage 123 after first doing this for the control corpus. The degree of new entries added to the knowledge graph determines the degree of novelty of the documents in question, which can be determined by using the querying process 122b and sends the answers back to client system 101 and/or 3rd-party systems 140.

In another example but not by way of limitation, a client system 101 and/or 3rd-party systems 140 may automate the validation of blueprints, contracts, and other documents against legal regulations or client specifications by sending the documents alongside a legal or client specification corpus to the ingestion process 122a. This ingestion process 122a breaks down the documents into outlines and knowledge graphs and stores them in processed information storage 203 and associated information storage 123. The reorganization process 122c may generate new documents that contain the validation status of each aspect of the blueprints, contracts, or other documents with the help of querying process 122b and sends those new documents back to client system 101 and/or 3rd-party systems 140.

In another example but not by way of limitation, a client system 101 and/or 3rd-party systems 140 may automate the outlining and facilitate the querying of live meetings, conversations, audio notes, and podcasts by sending them in a streaming or batched fashion to the ingestion process 122a. This ingestion process 122a breaks down the documents into outlines and knowledge graphs and stores them in processed information storage 203 and associated information storage 123. The reorganization process 122c may generate outlines in the original order and reorganized topically (optionally using querying process 122b to answer user questions) and sends those outlines back to client system 101 and/or 3rd-party systems 140.

In another example but not by way of limitation, a client system 101 and/or 3rd-party systems 140 may automate the generation of background review articles and sections for papers and grants by sending the relevant corpus to the ingestion process 122a. This ingestion process 122a breaks down the documents within the initial corpus into outlines and knowledge graphs and stores them in processed information storage 203 and associated information storage 123. The reorganization process 122c may generate new documents (optionally using querying process 122b) and sends the new documents back to client system 101 and/or 3rd-party systems 140 to add to the training corpus.

In another example but not by way of limitation, a client system 101 and/or 3rd-party systems 140 may automate the generation of news review articles or entire papers and track misinformation and disinformation by sending articles and related documents to the ingestion process 122a. This ingestion process 122a breaks down the articles and documents within the initial corpus into outlines and knowledge graphs and stores them in processed information storage 203 and associated information storage 123. The reorganization process 122c may generate new documents that describe the way the story or stories have unfolded over time and/or are described by various papers or using the querying process 122b determines the original source of particular claims and sends the new documents, etc. back to client system 101 and/or 3rd-party systems 140.

In another example but not by way of limitation, a client system 101 and/or 3rd-party systems 140 may generate accurate simulations for education, entertainment, and/or commercial use by sending an initial training corpus to the ingestion process 122a. This ingestion process 122a breaks down the documents within the initial corpus into outlines and knowledge graphs and stores them in processed information storage 203 and associated information storage 123. The client system 101 and/or 3rd-party systems 140 may use the querying process 122b to answer questions about next possible outcomes in the simulation given the current state and send the next possible outcomes back to client system 101 and/or 3rd-party systems 140 for use in generating the next outcome within the simulation.

In another example but not by way of limitation, the client system 101 and/or 3rd-party systems 140 may automate the validation of citation and reference integrity and check for plagiarism by sending the appropriate documents and/or a corpus to check against to the ingestion process 122a. This ingestion process 122a breaks down the documents into outlines and knowledge graphs and stores them in processed information storage 203 and associated information storage 123. Using querying process 122b and reorganization process 122c, the system may determine whether the cited facts match the contents of the reference documents and sends them back to client system 101 and/or 3rd-party systems 140 where that information can be either used directly or used to prune the citation graph or disqualify particular articles and remove them from the knowledge graph stored by processed information storage 203 and associated information storage 123.

In all of the above examples, the benefits of using this AI processing system shown in FIG. 2a over typical LLMs include minimization of hallucinations, the ability to create, validate, and/or process documents and corpuses that are vastly larger than the size of the context window, and query or condense information across multiple documents and reorganize that information in any combination of user-specified and/or automated manner taking into account a corpus of documents that is much larger than the LLMs' context window sizes.

Although specific machine-learned models are described above, other types of machine-learned models can additionally or alternatively be used. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A method, comprising:
   receiving, by a computer system, a group of automatically annotated sentences and an initial infinite outline, each automatically annotated sentence including a sentence from a piece of content, a uniform resource indicator (URI) of the piece of content and a location of the sentence in the piece of content;
   generating, by the computer system, a partial outline fringe that is an outline containing one or more final entries based on the group of automatically annotated sentences and each parent in the outline of each final entry, the partial outline fringe having, for each automatically annotated sentence, a parent node and one or more leaf nodes wherein each node has an entry label, a piece of content contained in the node and a list of entry tag annotations and wherein each leaf node has a piece of content related to the piece of content in the parent node;
   performing, by the computer system, a chisel process on the partial outline fringe that convert a particular leaf node of the partial outline fringe with more than one piece of information into a subtree with one or more entries and each subtree entry having a single piece of information to generate a processed partial outline fringe;
   combining, by the computer system, the processed partial outline fringe with the initial infinite outline to generate an updated infinite outline;
   storing, in a store of the computer system, the updated infinite outline; and
   generating, using the updated infinite outline, a response to a query with no hallucination by an artificial intelligence system executed by the computer system.

2. The method of claim 1, wherein the group of annotated sentences is a batch and wherein the batch, one or more prompts and the partial outline fringe does not exceed half of a prompt context window and does not exceed 85 percent of a maximum length of an output of an AI model.

3. The method of claim 1 further comprising performing, by the computer system, a grouping process that converts an entry in the processed partial outline fringe having a maximum branching factor of children entries by inserting one or more grouping nodes to generate the processed partial outline fringe, wherein each grouping node contains a summary of a group of entries.

4. The method of claim 1 further comprising repeating, by the computer system for each new group of annotated sentences, the generating of the partial outline fringe, the performing of the chisel process and combining of the processed partial outline fringe with the updated infinite outline to generate a final infinite outline.

5. The method of claim 4 further comprising converting, by the computer system, each entry in the final infinite outline into an entry with a path history, wherein the path history for a particular final entry is the particular final entry with each parent to traverse the final infinite outline to the particular final entry, generating, by the computer system using the entries with the path history, a knowledge graph having one or more entries and storing the knowledge graph.

6. The method of claim 4 further comprising receiving, by the computer system, a document, converting, by the computer system, the document into one or more annotated sentences having the sentence in the document, the URI of the document and a location in the document for each sentence and batching the annotated sentences in the document into the group of annotated sentences.

7. The method of claim 6 further comprising breaking down, by the computer system, the URI of the document and the locations in the document for each annotated sentence into a machine readable format.

8. The method of claim 1 further comprising receiving, by the computer system, a document, converting, by the computer system, the document into one or more annotated sentences having the sentence in the document, the URI of the document and a location in the document for each sentence and batching the annotated sentences in the document into the group of annotated sentences.

9. The method of claim 8 further comprising breaking down, by the computer system, the URI of the document and the one or more locations in the document for each annotated sentence into a machine readable format.

10. The method of claim 9 further comprising converting, by the computer system, each entry in the final infinite outline into an entry with a path history, wherein the path history for a particular final entry is the particular final entry with each parent to traverse the final infinite outline to the particular final entry, generating, by the computer system using the entries with the path history, a knowledge graph having one or more entries and storing the knowledge graph.

11. The method of claim 1 further comprising performing, by the computer system, a soften process to transform a particular entry in the partial outline fringe that contains more than one piece of information and is not a leaf in the partial fringe outline into the particular entry with a single piece of information and one or more leaf children.

12. An apparatus, comprising:
a computer system having a content handling and extraction module that is executed by the computer system and is configured to:
receive a group of annotated sentences and an initial infinite outline, each annotated sentence including a sentence from a piece of content, a uniform resource indicator (URI) of the piece of content and a location of the sentence in the piece of content;
generate a partial outline fringe that is an outline containing one or more final entries based on the group of annotated sentences and each parent in the outline of each final entry, the partial outline fringe having, for each automatically annotated sentence, a parent node and one or more leaf nodes wherein each node has an entry label, a piece of content contained in the node and a list of entry tag annotations and wherein each leaf node has a piece of content related to the piece of content in the parent node;
perform a chisel process on the partial outline fringe that convert a particular leaf entry of the partial outline fringe with more than one piece of information into a subtree with one or more entries and each subtree entry having a single piece of information to generate a processed partial outline fringe;
combine the processed partial outline fringe with the initial infinite outline to generate an updated infinite outline;
store the updated infinite outline; and
generate, using the updated infinite outline, a response to a query with no hallucination by an artificial intelligence system.

13. The apparatus of claim 12, wherein the group of annotated sentences is a batch and wherein the batch, one or more prompts and the partial outline fringe does not exceed half of a prompt context window and does not exceed 85 percent of a maximum length of an output of an AI model.

14. The apparatus of claim 12, wherein the module is further configured to convert an entry in the processed partial outline fringe having a maximum branching factor of children entries by inserting one or more grouping nodes to generate the processed partial outline fringe, wherein each grouping node contains a summary of a group of entries.

15. The apparatus of claim 12, wherein the module is further configured to repeat, for each new group of annotated sentences, the generation of the partial outline fringe, the performance of the chisel process and the combination of the processed partial outline fringe with the updated infinite outline to generate a final infinite outline.

16. The apparatus of claim 15, wherein the module is further configured to convert each entry in the final infinite outline into an entry with a path history, wherein the path history for a particular final entry is the particular final entry with each parent to traverse the final infinite outline to the particular final entry, generate, using the entries with the path history, a knowledge graph having one or more entries and storing the knowledge graph.

17. The apparatus of claim 15, wherein the module is further configured to receive a document, convert the document into one or more annotated sentences having the sentence in the document, the URI of the document and a location in the document for each sentence and batch the each annotated sentence in the document into the group of annotated sentences.

18. The apparatus of claim 17, wherein the module is further configured to break down the URI of the document and the locations in the document for each annotated sentence into a machine readable format.

19. The apparatus of claim 12, wherein the module is further configured to receive a document, convert the document into one or more annotated sentences having the sentence in the document, the URI of the document and a location in the document for each sentence and batch the each annotated sentence in the document into the group of annotated sentences.

20. The apparatus of claim 19, wherein the module is further configured to break down the URI of the document and the one or more locations in the document for each annotated sentence into a machine readable format.

21. The apparatus of claim 20, wherein the module is further configured to convert each entry in the final infinite outline into an entry with a path history, wherein the path history for a particular final entry is the particular final entry with each parent to traverse the final infinite outline to the particular final entry, generate, using the entries with the path history, a knowledge graph having one or more entries and store the knowledge graph.

22. The apparatus of claim 12, wherein the module is further configured to perform a soften process to transform a particular entry in the partial outline fringe that contains more than one piece of information and is not a leaf in the partial fringe outline into the particular entry with a single piece of information and one or more leaf children.

\* \* \* \* \*